US011893409B2

(12) United States Patent
Han

(10) Patent No.: US 11,893,409 B2
(45) Date of Patent: *Feb. 6, 2024

(54) SECURING A MANAGED FORWARDING ELEMENT THAT OPERATES WITHIN A DATA COMPUTE NODE

(71) Applicant: Nicira, Inc., Palo Alto, CA (US)

(72) Inventor: Donghai Han, Beijing (CN)

(73) Assignee: Nicira, Inc., Palo Alto, CA (US)

(*) Notice: Subject to any disclaimer, the term of this patent is extended or adjusted under 35 U.S.C. 154(b) by 430 days.

This patent is subject to a terminal disclaimer.

(21) Appl. No.: 17/146,461

(22) Filed: Jan. 11, 2021

(65) Prior Publication Data

US 2021/0132983 A1 May 6, 2021

Related U.S. Application Data

(63) Continuation of application No. 14/954,485, filed on Nov. 30, 2015, now Pat. No. 10,891,144.

(Continued)

(51) Int. Cl.
*H04L 12/46* (2006.01)
*G06F 9/455* (2018.01)
(Continued)

(52) U.S. Cl.
CPC ...... *G06F 9/45558* (2013.01); *G06F 9/45537* (2013.01); *G06F 12/1009* (2013.01);
(Continued)

(58) Field of Classification Search
CPC ............. G06F 9/45558; G06F 9/45537; G06F 12/1009; G06F 12/109; G06F 2009/45583;
(Continued)

(56) References Cited

U.S. PATENT DOCUMENTS 7,555,562 B2 6/2009 See et al.
7,983,265 B1 7/2011 Dropps
(Continued)

FOREIGN PATENT DOCUMENTS

AU 2012340387 A1 4/2014
CA 2722300 A1 11/2008
(Continued)

OTHER PUBLICATIONS

Burtsev, Anton, et al., "Fido: Fast Inter-Virtual-Machine Communication for Enterprise Appliances," USENIX'09, Jun. 14-19, 2009, 14 pages, San Diego, California, USA.
(Continued)

*Primary Examiner* — Frank Duong
(74) *Attorney, Agent, or Firm* — Quarles & Brady LLP

(57) ABSTRACT

Some embodiments provide a method for a first managed forwarding element operating within a first data compute node (DCN) that executes on a host machine. From the first DCN, the method receives a packet destined for a second DCN that is logically connected to the first DCN through a set of logical forwarding elements of a logical network. The method performs forwarding processing on the packet in order to (i) identify a particular logical forwarding element in the set of logical forwarding elements, a logical port of which is coupled to the second DCN, and (ii) identify a second managed forwarding element that implements the logical port of the particular logical forwarding element. The method forwards the packet to the second managed forwarding element.

19 Claims, 21 Drawing Sheets

Related U.S. Application Data

(60) Provisional application No. 62/249,270, filed on Nov. 1, 2015.

(51) Int. Cl.
| | |
|---|---|
| *G06F 12/1009* | (2016.01) |
| *H04L 9/40* | (2022.01) |
| *H04L 69/22* | (2022.01) |
| *G06F 12/109* | (2016.01) |
| *H04L 67/1097* | (2022.01) |
| *H04L 45/745* | (2022.01) |
| *H04L 45/74* | (2022.01) |

(52) U.S. Cl.
CPC ........ *G06F 12/109* (2013.01); *H04L 12/4633* (2013.01); *H04L 63/029* (2013.01); *H04L 63/08* (2013.01); *H04L 63/126* (2013.01); *H04L 63/145* (2013.01); *H04L 63/1433* (2013.01); *H04L 67/1097* (2013.01); *H04L 69/22* (2013.01); *G06F 2009/45583* (2013.01); *G06F 2009/45587* (2013.01); *G06F 2009/45595* (2013.01); *G06F 2212/151* (2013.01); *G06F 2212/651* (2013.01); *H04L 45/74* (2013.01); *H04L 45/745* (2013.01)

(58) Field of Classification Search
CPC . G06F 2009/45587; G06F 2009/45595; G06F 2212/151; G06F 2212/651; H04L 12/4633; H04L 45/74; H04L 45/745; H04L 63/029; H04L 63/08; H04L 63/126; H04L 63/1433; H04L 63/145; H04L 67/1097; H04L 69/22
See application file for complete search history.

(56) References Cited

U.S. PATENT DOCUMENTS

| | | | |
|---|---|---|---|
| 8,565,718 B1 | 10/2013 | Erman et al. | |
| 8,577,845 B2 | 11/2013 | Nguyen et al. | |
| 8,725,898 B1 | 5/2014 | Vincent | |
| 8,863,129 B2 | 10/2014 | Dawson et al. | |
| 9,197,529 B2 | 11/2015 | Ganichev et al. | |
| 9,225,597 B2 | 12/2015 | Tubaltsev et al. | |
| 9,313,129 B2 | 4/2016 | Ganichev et al. | |
| 9,344,349 B2 | 5/2016 | Ganichev et al. | |
| 9,419,855 B2 | 8/2016 | Ganichev et al. | |
| 9,450,873 B2 | 9/2016 | Greenberg et al. | |
| 9,454,392 B2 | 9/2016 | Luxenberg et al. | |
| 9,503,371 B2 | 11/2016 | Thakkar et al. | |
| 9,532,004 B1 | 12/2016 | Metter et al. | |
| 9,558,029 B2 | 1/2017 | Behera et al. | |
| 9,577,845 B2 | 2/2017 | Thakkar et al. | |
| 9,590,901 B2 | 3/2017 | Tubaltsev et al. | |
| 9,606,896 B2 | 3/2017 | Mehta et al. | |
| 9,645,835 B2 | 5/2017 | Phillips et al. | |
| 9,692,696 B2 | 6/2017 | DeCusatis et al. | |
| 9,697,033 B2 | 7/2017 | Koponen et al. | |
| 9,755,965 B1 | 9/2017 | Yadav et al. | |
| 9,781,009 B2 | 10/2017 | Mehra et al. | |
| 9,785,455 B2 | 10/2017 | Chandrashekhar et al. | |
| 9,805,595 B1 | 10/2017 | Portela et al. | |
| 9,819,581 B2 | 11/2017 | Chanda et al. | |
| 9,847,938 B2 | 12/2017 | Chanda et al. | |
| 9,860,151 B2 | 1/2018 | Ganichev et al. | |
| 9,860,342 B2 | 1/2018 | Hunt | |
| 9,893,988 B2 | 2/2018 | Agarwal et al. | |
| 9,898,317 B2 | 2/2018 | Nakil et al. | |
| 9,910,686 B2 | 3/2018 | Chandrashekhar et al. | |
| 9,930,010 B2 | 3/2018 | Sun et al. | |
| 9,971,624 B2 | 5/2018 | Behera et al. | |
| 9,992,289 B2 | 6/2018 | Nayak et al. | |
| 9,998,371 B2 | 6/2018 | Shen et al. | |
| 10,063,469 B2 | 8/2018 | Shen et al. | |
| 10,078,526 B2 | 9/2018 | Han | |
| 10,078,527 B2 | 9/2018 | Han | |
| 10,110,431 B2 | 10/2018 | Ganichev et al. | |
| 10,506,022 B2 | 12/2019 | Bansal | |
| 10,616,104 B2 | 4/2020 | Shen et al. | |
| 10,671,424 B2 | 6/2020 | Behera et al. | |
| 10,779,779 B2 | 9/2020 | Hayakawa et al. | |
| 10,871,981 B2 | 12/2020 | Han et al. | |
| 10,873,638 B2 | 12/2020 | Nayak et al. | |
| 10,880,216 B2 | 12/2020 | Jiang et al. | |
| 10,891,144 B2 | 1/2021 | Tan et al. | |
| 10,897,453 B2 | 1/2021 | Hira et al. | |
| 11,206,213 B2 | 12/2021 | Shen et al. | |
| 11,347,537 B2 | 5/2022 | Behera et al. | |
| 11,431,781 B1 | 8/2022 | Carofiglio et al. | |
| 11,706,134 B2 | 7/2023 | Shen et al. | |
| 2004/0039741 A1 | 2/2004 | Benson et al. | |
| 2005/0018665 A1 | 1/2005 | Jordan et al. | |
| 2005/0022018 A1 | 1/2005 | Szor | |
| 2006/0143300 A1 | 6/2006 | See et al. | |
| 2006/0200696 A1 | 9/2006 | Shimada | |
| 2006/0293073 A1 | 12/2006 | Rengaraju et al. | |
| 2007/0094730 A1 | 4/2007 | Bhikkaji et al. | |
| 2007/0106986 A1* | 5/2007 | Worley, Jr. .......... G06F 9/45537 718/1 |
| 2007/0140263 A1 | 6/2007 | Mitome et al. | |
| 2007/0204151 A1 | 8/2007 | Schnackenberg et al. | |
| 2008/0175383 A1 | 7/2008 | Sun | |
| 2008/0222309 A1 | 9/2008 | Shanbhogue | |
| 2008/0240122 A1 | 10/2008 | Richardson et al. | |
| 2009/0044276 A1 | 2/2009 | Abdel-Aziz et al. | |
| 2009/0083445 A1 | 3/2009 | Ganga | |
| 2009/0183173 A1 | 7/2009 | Becker et al. | |
| 2009/0254990 A1 | 10/2009 | McGee et al. | |
| 2009/0260083 A1 | 10/2009 | Szeto et al. | |
| 2009/0328220 A1 | 12/2009 | Abdel-Aziz et al. | |
| 2010/0050258 A1 | 2/2010 | Talpade et al. | |
| 2010/0061245 A1 | 3/2010 | Larsen | |
| 2010/0138919 A1 | 6/2010 | Peng et al. | |
| 2010/0172453 A1 | 7/2010 | Cankaya et al. | |
| 2011/0018998 A1 | 1/2011 | Guzik | |
| 2011/0090915 A1 | 4/2011 | Droux et al. | |
| 2011/0194563 A1 | 8/2011 | Shen et al. | |
| 2012/0170585 A1 | 7/2012 | Mehra et al. | |
| 2012/0179776 A1 | 7/2012 | Umezuki | |
| 2012/0221955 A1 | 8/2012 | Raleigh et al. | |
| 2012/0304168 A1 | 11/2012 | Seeniraj et al. | |
| 2013/0003538 A1 | 1/2013 | Greenberg et al. | |
| 2013/0021933 A1 | 1/2013 | Kovvali et al. | |
| 2013/0034094 A1 | 2/2013 | Cardona et al. | |
| 2013/0044636 A1 | 2/2013 | Koponen et al. | |
| 2013/0058335 A1 | 3/2013 | Koponen et al. | |
| 2013/0061047 A1 | 3/2013 | Sridharan et al. | |
| 2013/0097354 A1* | 4/2013 | Arges .................. G06F 12/1458 718/1 |
| 2013/0125120 A1 | 5/2013 | Zhang et al. | |
| 2013/0125230 A1 | 5/2013 | Koponen et al. | |
| 2013/0142048 A1 | 6/2013 | Gross, IV et al. | |
| 2013/0219078 A1 | 8/2013 | Padmanabhan et al. | |
| 2013/0263118 A1 | 10/2013 | Kannan et al. | |
| 2014/0007087 A1 | 1/2014 | Scott-Nash et al. | |
| 2014/0156818 A1 | 6/2014 | Hunt | |
| 2014/0189867 A1 | 7/2014 | Jung et al. | |
| 2014/0348161 A1 | 11/2014 | Koponen et al. | |
| 2015/0009995 A1 | 1/2015 | Gross, IV et al. | |
| 2015/0016286 A1 | 1/2015 | Ganichev et al. | |
| 2015/0016287 A1 | 1/2015 | Ganichev et al. | |
| 2015/0016469 A1 | 1/2015 | Ganichev et al. | |
| 2015/0052522 A1 | 2/2015 | Chanda et al. | |
| 2015/0058968 A1 | 2/2015 | Wang et al. | |
| 2015/0063364 A1 | 3/2015 | Thakkar et al. | |
| 2015/0106815 A1 | 4/2015 | Nayak et al. | |
| 2015/0256581 A1 | 9/2015 | Kolhi et al. | |
| 2015/0263897 A1 | 9/2015 | Ganichev et al. | |
| 2015/0263899 A1 | 9/2015 | Tubaltsev et al. | |
| 2015/0263946 A1 | 9/2015 | Tubaltsev et al. | |
| 2015/0263952 A1 | 9/2015 | Ganichev et al. | |
| 2015/0271303 A1 | 9/2015 | Neginhal et al. | |

(56) References Cited

U.S. PATENT DOCUMENTS

| | | |
|---|---|---|
| 2015/0350813 A1 | 12/2015 | Prats et al. |
| 2015/0370586 A1 | 12/2015 | Cooper et al. |
| 2016/0048464 A1 | 2/2016 | Nakajima et al. |
| 2016/0057014 A1 | 2/2016 | Thakkar et al. |
| 2016/0092259 A1 | 3/2016 | Mehta et al. |
| 2016/0094460 A1 | 3/2016 | Shelar et al. |
| 2016/0191545 A1 | 6/2016 | Nanda et al. |
| 2016/0226960 A1 | 8/2016 | Zhang et al. |
| 2016/0226961 A1 | 8/2016 | Zhang et al. |
| 2016/0335107 A1 | 11/2016 | Behera et al. |
| 2016/0335129 A1 | 11/2016 | Behera et al. |
| 2017/0034023 A1 | 2/2017 | Nickolov et al. |
| 2017/0041435 A1 | 2/2017 | Simpson et al. |
| 2017/0093617 A1 | 3/2017 | Chanda et al. |
| 2017/0093636 A1 | 3/2017 | Chanda et al. |
| 2017/0093677 A1 | 3/2017 | Skerry et al. |
| 2017/0123832 A1 | 5/2017 | Han |
| 2017/0126431 A1 | 5/2017 | Han et al. |
| 2017/0126493 A1 | 5/2017 | Zhang et al. |
| 2017/0126559 A1 | 5/2017 | Han et al. |
| 2017/0126726 A1 | 5/2017 | Han |
| 2017/0134507 A1 | 5/2017 | Nayak et al. |
| 2017/0142011 A1 | 5/2017 | Zhang et al. |
| 2017/0142012 A1 | 5/2017 | Thakkar et al. |
| 2017/0163532 A1 | 6/2017 | Tubaltsev et al. |
| 2017/0171144 A1 | 6/2017 | Sagiraju et al. |
| 2017/0180249 A1 | 6/2017 | Shen et al. |
| 2017/0180250 A1 | 6/2017 | Shen et al. |
| 2017/0188438 A1 | 6/2017 | Vollmer et al. |
| 2017/0250912 A1 | 8/2017 | Chu et al. |
| 2017/0277557 A1 | 9/2017 | Koponen et al. |
| 2017/0295033 A1 | 10/2017 | Cherian et al. |
| 2017/0302673 A1 | 10/2017 | Makhervaks et al. |
| 2017/0339054 A1 | 11/2017 | Yadav et al. |
| 2017/0353493 A1 | 12/2017 | Bergman |
| 2017/0366446 A1 | 12/2017 | Davie et al. |
| 2018/0048702 A1 | 2/2018 | Patil et al. |
| 2018/0067951 A1 | 3/2018 | Brandwine et al. |
| 2018/0102959 A1 | 4/2018 | Ganichev et al. |
| 2018/0239631 A1 | 8/2018 | Behera et al. |
| 2018/0248961 A1 | 8/2018 | Nayak et al. |
| 2019/0014039 A1 | 1/2019 | Shen et al. |
| 2019/0238508 A1 | 8/2019 | Hira et al. |
| 2019/0238509 A1 | 8/2019 | Hira et al. |
| 2020/0228447 A1 | 7/2020 | Shen et al. |
| 2020/0278879 A1 | 9/2020 | Behera et al. |
| 2021/0166334 A1 | 6/2021 | Lee |
| 2021/0241800 A1 | 8/2021 | Patry et al. |
| 2022/0078112 A1 | 3/2022 | Shen et al. |
| 2022/0291943 A1 | 9/2022 | Behera et al. |

FOREIGN PATENT DOCUMENTS

| | | |
|---|---|---|
| CA | 3002975 A1 | 10/2010 |
| CA | 2885087 A1 | 3/2014 |
| CN | 101809943 A | 8/2010 |
| WO | 2009042397 A1 | 4/2009 |
| WO | 2016187168 A1 | 11/2016 |

OTHER PUBLICATIONS

Mahalingam, M., et al., "Virtual eXtensible Local Area Network (VXLAN): a Framework for Overlaying Virtualized Layer 2 over Layer 3 Networks," RFC7348, Aug. 26, 2014, 23 pages.

Ren, Yi, et al., "Residency-Aware Virtual Machine Communication Optimization: Design Choices and Techniques," 2013 IEEE Sixth International Conference on Cloud Computing, Jun. 28-Jul. 3, 2013, 8 pages, IEEE, Santa Clara, CA, USA.

Non-Published commonly Owned U.S. Appl. No. 18/226,773, filed Jul. 27, 2023, 57 pages, Nicira, Inc.

\* cited by examiner

SECURING A MANAGED FORWARDING ELEMENT THAT OPERATES WITHIN A DATA COMPUTE NODE

CLAIM OF BENEFIT TO PRIOR APPLICATIONS

This application is a continuation application of U.S. patent application Ser. No. 14/954,485, filed Nov. 30, 2015, now published as U.S. Patent Publication 2017/0126559. U.S. patent application Ser. No. 14/954,485 claims the benefit of U.S. Provisional Patent Application 62/249,270, filed Nov. 1, 2015. U.S. patent application Ser. No. 14/954, 485, now published as U.S. Patent Publication 2017/0126559, is incorporated herein by reference.

BACKGROUND

In today's Software-Defined Networking (SDN), a control plane implements and maintains the control logic that governs the forwarding behavior of shared network switching elements on a per user basis. For example, the logical network of a tenant of a hosting system connects a set of end machines (e.g., virtual machines, physical machines, etc.) that are assigned to the tenant, to each other and to other virtual and/or physical networks through a set of logical forwarding elements (e.g., logical switches, logical routers, etc.).

Conventionally, a virtualization software (e.g., a hypervisor) of each host machine implements different sets of logical forwarding elements that connect the end machines operating on the host machine to different logical networks. However, adding a layer to the virtualization software to implement the different logical networks imposes performance overhead to the virtualization software and lowers the overall efficiency of the host machine that executes the virtualization software. Additionally, the hypervisor does not have control (e.g., to enforce network policies) over the end machines that can have access to hardware directly (e.g., through the pass-through technology).

BRIEF SUMMARY

Some embodiments provide a managed forwarding element (MFE) within a data compute node (DCN) that operates on a host machine in order to enable the DCN to perform network functionalities (e.g., L2 switching, L3 routing, tunneling, etc.) that are normally performed by the virtualization software of the host machine. In some embodiments, the MFE in the data compute node (referred to as DCN-MFE hereinafter) performs these network functionalities instead of, or in conjunction with, a managed forwarding element that resides in the virtualization software (e.g., in the hypervisor) of the host machine.

In some embodiments, a local controller that operates on the host machine (e.g., in the hypervisor of the host machine) configures and manages a DCN-MFE within each DCN (e.g., virtual machine, physical machine, container, etc.) executing on the host machine. In some embodiments, the local controller receives the configuration and forwarding data required to configure and manage the DCN-MFEs from a central control plane (CCP) cluster. The CCP cluster of some embodiments includes one or more central controllers that configure and manage one or more logical networks for one or more tenants of a hosting system (e.g., a datacenter). In some embodiments, the CCP cluster (1) receives data that defines a logical network (e.g., from a user), (2) based on the received data, computes the configuration and forwarding data that define forwarding behaviors of a set of logical forwarding elements for the logical network, and (3) distributes the computed data to a set of local controllers operating on a set of host machines.

In some embodiments, each local controller resides on a host machine (e.g., in the virtualization software of the host machine) that executes one or more DCNs of the logical network. The DCNs of the logical network that execute on different host machines logically connect to each other, and to other physical or logical networks, through the set of logical forwarding elements (e.g., logical switches, logical routers, etc.). In some embodiments, each local controller, after receiving the logical network data from the CCP cluster, generates configuration and forwarding data that defines forwarding behaviors of (1) an MFE that resides on the same host machine alongside the local controller, and (2) each DCN-MFE of each DCN of the host machine that participates in the logical network. The local controller then distributes the generated data to the managed forwarding element (MFE) and the DCN-MFEs. Each of the MFE and DCN-MFEs implements the set of logical forwarding elements based on the configuration and forwarding data received from the local controller.

The configuration and forwarding data that the local controller of some embodiments generates for the MFE of the host machine, however, may be different from the configuration and forwarding data that the local controller generates for the DCN-MFEs of the same host machine. The MFE resides in the hypervisor of the host machine and is connected to several different DCNs, different subsets of which may belong to different logical networks of different tenants. As such, the MFE should be capable of implementing different sets of logical forwarding elements for different logical networks. On the other hand, each DCN-MFE that resides in a DCN (e.g., a virtual machine (VM)) is only capable of implementing the logical network to which the DCN is connected in some embodiments. Hence, in some embodiments, the forwarding and configuration data generated for the MFE of the host machine could be different (e.g., covering more logical networks' data) from the forwarding and configuration data generated for the DCN-MFEs of the DCNs.

Additionally, the forwarding and configuration data that a local controller of some embodiments generates for different DCNs that operate on the same host machine could be different from one DCN to another. That is, the logical network data generated for a particular DCN-MFE operating in a DCN of a host machine could be different from the logical network data generated for a DCN-MFE of a different DCN in the same host machine (e.g., when the two DCNs are connected to two different logical networks). In other words, in some embodiments, each DCN-MFE only implements a set of logical forwarding elements (e.g., logical switches, logical router, etc.) of the logical network to which the DCN containing the DCN-MFE logically connects.

In some embodiments, the DCN-MFE of a DCN enables the DCN to perform network traffic forwarding processing in the DCN, instead of having the MFE operating in the virtualization software (e.g., the hypervisor) of the host machine perform the packet forwarding processing. In some embodiments the DCN-MFE performs the packet forwarding processing for both outgoing and incoming network traffic. In some such embodiments, the data compute node offloads and receives the processed network traffic directly to and from a physical network interface controller (PNIC)

of the host machine. That is, the DCN-MFE of the DCN exchanges the network traffic with the PNIC without communicating with a managed forwarding element that operates in the hypervisor (e.g., in the pass-through approach). In some embodiments, however, when a source DCN operating on a host machine needs to transmit the network traffic to a destination DCN that operates on the same host machine, the source and destination DCNs employ the hypervisor as an intermediary means for exchanging the network traffic.

In some embodiments, the DCN-MFE of the source DCN, after realizing that the destination DCN operates on the same host machine as the source DCN, offloads the packets destined for the destination DCN to a memory space of the host machine that is controlled by the virtualization software (e.g., hypervisor) and that is shared with the destination DCN. The source DCN-MFE then notifies the hypervisor of the offload. In some embodiments, after receiving the offload notification, the hypervisor notifies the destination DCN-MFE about the new network traffic (e.g., data packets) that is stored in the shared memory space. The destination DCN-MFE of some such embodiments reads the packets from the shared memory upon receiving the notification from the hypervisor.

The shared memory space includes one or more particular physical pages of a host machine's physical memory that the hypervisor of the host machine assigns as a shared memory space for the DCNs operating on the host machine in some embodiments. In some such embodiments, the hypervisor of the host machine assigns the physical page(s) as shared memory space between the DCNs by mapping the physical page(s) to one or more particular physical pages in each DCN that shares the memory space. In this manner, the same physical pages of the host machine's memory become available to two or more DCNs operating on the host machine for writing to and reading from these shared physical pages.

In some embodiments, when the source and destination DCNs that include DCN-MFEs operate on different host machines and exchange data through the PNICs of the host machines directly (i.e., use the pass-through approach), the source and destination DCN-MFEs use a particular tunnel protocol to exchange network traffic between each other. That is, the source DCN-MFE uses a particular tunnel protocol (e.g., VXLAN, STT, Geneve, etc.) to encapsulate the packets with the source and destination DCN-MFE addresses (e.g., IP addresses associated with the DCN-MFEs). These source and destination addresses inserted in outer tunnel headers of the packets (e.g., in the packet headers) are used as the tunnel source and destination endpoints, respectively. The source DCN-MFE then sends the encapsulated packets towards the destination DCN (through the physical NIC of the host machine and onto the physical network between the DCNs). The destination DCN-MFE (i.e., the destination endpoint) then decapsulates the packets (i.e., removes the tunneling information added to the packets) using the particular tunnel protocol and sends the packets towards their corresponding destination in the destination DCN.

In some embodiments, even though the forwarding processing of the network traffic is done by the DCN-MFE, the processed network traffic is still sent to the virtualization software (e.g., through a virtual network interface controller (VNIC) of the DCN) rather than the PNIC of the host machine (e.g., in the emulation approach). In some such embodiments, the MFE of the virtualization software does not perform any additional forwarding processing on the outgoing packets and merely hands the received packets to the PNIC of the host machine. In some embodiments, however, the MFE operating in the virtualization software of the host machine performs packet forwarding processing for the incoming network traffic. That is, the MFE of a host machine performs forwarding processing on the incoming packets that are destined for any of the DCNs operating on the host machine. In other words, in some embodiments, the outgoing traffic is processed by the DCN-MFEs of the DCNs executing on a host machine, while the incoming traffic is processed by the MFE that operates in the virtualization software of the host machine.

A reason for having the DCN-MFE process the outgoing traffic and the hypervisor's MFE process the incoming traffic is that some embodiments have the forwarding element that is closer to the source of the packets perform the packet processing in order to increase the network traffic efficiency. For example, during the processing of a packet, when the first forwarding element on the path of a packet determines that the packet should be dropped (based on a network policy), the first forwarding element drops the packet and does not send the packet to the second forwarding element on the path to make such a determination. As such, extra network resources are not deployed to continue forwarding a packet towards a destination when the packet will not reach the destination anyway.

In some embodiments, when the source and destination DCNs operate on different host machines and exchange network traffic through the MFEs of the virtualization software (i.e., in the emulation approach), the source DCN-MFE and the MFE of the destination host machine (on which the destination DCN operates) use a particular tunnel protocol to exchange the network traffic. That is, the source DCN-MFE uses a tunnel protocol (e.g., VXLAN, STT, Geneve, etc.) to encapsulate the packets with the source DCN-MFE and the destination MFE addresses (e.g., IP addresses) as the tunnel endpoints before sending the packets towards the destination DCN. The destination MFE (i.e., the MFE in the hypervisor of the destination host machine) then decapsulates the packets (i.e., removes the tunneling information added to the packets) using the same tunnel protocol, and sends the packets towards the destination DCN.

Since the DCN-MFE of some embodiments is instantiated (and operates) in a DCN (e.g., a VM that belongs to a tenant of a hosting system), the DCN-MFE is more vulnerable to malicious attacks in comparison with an MFE that is instantiated (and operates) in a hypervisor of a host machine. This is because, although the DCN-MFE is instantiated in the kernel of a guest operating system (e.g., in the network stack of the kernel), in some embodiments, the DCN-MFE is still exposed to other applications and processes that run by the guest operating system. On the contrary, an MFE that operates in the hypervisor of a host machine is solely controlled by the central control plane (i.e., the CCP cluster) of the hosting system and is not exposed to any outside applications and/or processes.

In order to protect the DCN-MFE from malicious attacks, some embodiments mark the pages that contain the code and data of the DCN-MFE (e.g., the memory space of the host machine on which the DCN-MFE's code and data are loaded) as read-only to the guest operating system. Some such embodiments only allow the hypervisor to write on the pages that are marked as read-only for the guest operating system. Although this approach protects the DCN-MFE from being modified by the guest operating system, a malicious module may still attack the DCN-MFE by loading onto the guest kernel and simulating the functionalities of the DCN-MFE. That is, a malicious module could load onto the guest kernel and communicate with the VNIC (of the DCN) or the PNIC (of the host machine) in the same way that the DCN-MFE does, hence exposing these interfaces to malicious attacks. In addition to marking the memory as read-only memory, some embodiments check one or more particular data structures of the guest kernel (e.g., in the same manner as an antivirus program) to ensure that the DCN-MFE is the only module that communicates with the PNIC and/or VNIC (e.g., through a secure communication channel).

Some embodiments protect the DCN-MFE from malicious attacks that simulate the DCN-MFE functionalities by isolating the DCN-MFE from other modules and processes of the DCN in the host memory space. That is, some embodiments separate the memory space (e.g., in the host machine's physical memory), in which the code and data of the DCN-MFE are loaded (referred to as guest secure domain hereinafter) from the memory space, in which the other applications and processes of the DCN are loaded (referred to as guest general domain hereinafter). In some embodiments, the other applications and processes that are stored in the guest general domain include the guest user space applications, as well as the processes and modules that are loaded in the guest kernel. Some embodiments store additional data and modules in the guest secure domain, in which the DCN-MFE is loaded, in order for the two guest domains to be able to communicate with each other in a secure manner.

Conventionally, when a data compute node is loaded in a host machine (e.g., into the host machine's physical memory), the hypervisor of the host machine creates and uses a set of nested page tables (NPTs) to map the guest physical memory space of the DCN to a portion (i.e., a set of pages) of the host physical memory space. In order to separate the guest secure domain from the guest general domain, the hypervisor of some embodiments creates two sets of NPTs for each DCN that is loaded in the host machine (i.e., that starts operating on the host machine). In some such embodiments, the hypervisor creates a first set of NPTs (also referred to as secure NPTs) and a second set of NPTS (also referred to as general NPTs). The secure NPTs include a set of tables that maps the guest physical memory addresses that contain the DCN-MFE (code and data) to the guest secure domain. Similarly, the general NPTs include a set of tables that maps the guest physical memory addresses that contain other applications and processes to the guest general domain.

Instead of using a separate secure domain for the code and data of the DCN-MFE, some embodiments employ a counter check security agent in order to protect the DCN-MFE against malicious attacks. In some embodiments the counter check security agent operates in the virtualization software of the host machine. The counter check security agent of some embodiments receives a message from the DCN-MFE to increase a local counter value by n (n being an integer greater than or equal to one). The counter check security agent receives this message when the DCN-MFE transmits n packets (1) to a PNIC of the host machine directly (e.g., in the pass-through approach), or alternatively (2) to a VNIC of the DCN to be transmitted to the MFE of the virtualization software (e.g., in the emulation approach).

The counter check security agent of some embodiments, after receiving the counter increase message from the DCN-MFE, retrieves a packet counter value from the PNIC of the host machine and/or the VNIC of the data compute node (depending on whether a pass-through approach or an emulation approach is in use). In some embodiments, the packet counter value shows the total number of packets received at the PNIC and/or VNIC. By comparing the local counter value (after increasing the local counter value by n) and the packet counter value received from the PNIC and/or VNIC, the counter check security agent is able to determine whether the DCN is under a malicious attack or not.

However, a determined malicious module that simulates the DCN-MFE in the guest kernel may also imitate the communication between the DCN-MFE and the counter check security agent. In some embodiments, the DCN-MFE and counter check security agents communicate with each other through a communication channel, which is essentially a software function. The malicious module could call the same counter increase function that the DCN-MFE calls. By calling the same function, the malicious module would also send a counter increase message to the security agent of the hypervisor to increase the local counter by n, each time the malicious module transmits n packets to the PNIC and/or VNIC. In other words, the malicious module would imitate both functions of the DCN-MFE to transmit the packets out to the PNIC and/or VNIC, and to send a counter increase message to the counter check security agent with each transmission.

In order to protect the DCN-MFE against this type of malicious module, the hypervisor of some embodiments generates a list of valid return addresses, each of which indicates a valid return address of a subsequent instruction after the last instruction of the counter increase function is executed. That is, each return address in the list of valid return addresses contains a memory address that points to a subsequent instruction that has to be executed after the last instruction of the counter increase function (called by the DCN-MFE) is executed. Additionally, each time any module (e.g., a DCN-MFE or a malicious module) calls the counter increase function, the module stores the return address of the function in a call stack. The return address of the increase function is the address of a subsequent instruction that has to be executed after the counter increase function returns.

In some embodiments, each time a counter increase message is received, the counter check security agent checks the call stack maintained by the DCN, which contains the return address after the counter increase function is finished. In some other embodiments a different security agent (other than the counter check security agent) that runs in the communication channel between the DCN-MFE and the hypervisor (inside the hypervisor or the DCN) checks the call stack. The security agent then matches the return address in the call stack of the DCN against the list of valid return addresses (that are kept in a local storage of the hypervisor or DCN). When no match is found, the security agent determines that a separate module (which has a different return address for the subsequent instruction) has called into the counter increase function and notifies the virtualization software of a potential malicious attack on the DCN.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a managed forwarding element (MFE) within a data compute node (DCN) that operates on a host machine in order to enable the DCN to perform network functionalities (e.g., L2 switching, L3 routing, tunneling, teaming ports, link aggregation, etc.) that are normally performed by the virtualization software of the host machine. In some embodiments, the MFE in the data compute node (i.e., the DCN-MFE) performs these network functionalities instead of, or in conjunction with, a managed forwarding element that resides in the virtualization software (e.g., in the hypervisor) of the host machine. The managed forwarding element, in some embodiments, is a software instance that is instantiated in the hypervisor of a host machine to perform network traffic forwarding processing for the packets that are originated from and/or destined for a set of DCN (e.g., virtual machines) that reside on the host machine.

In some embodiments, one or more central controllers in a central control plane (CCP) cluster configure and manage one or more logical networks for one or more tenants of a hosting system (e.g., a datacenter). In some embodiments, a logical network of the hosting system logically connects different data compute nodes (e.g., end machines such as virtual machines (VMs), physical servers, containers, etc.) through a set of logical forwarding elements (e.g., logical L2 switches and logical L3 routers). Some of the end machines (e.g., the virtual machines, containers, etc.) reside on host machines that execute managed forwarding elements (MFEs), which implement the logical forwarding elements of the logical network to which the end machines are logically connected. In other words, each of the host machines executes an MFE that processes packets sent to and received from the end machines residing on the host machine, and exchanges these packets with other hardware and software managed forwarding elements (e.g., through tunnels).

Figure 1:
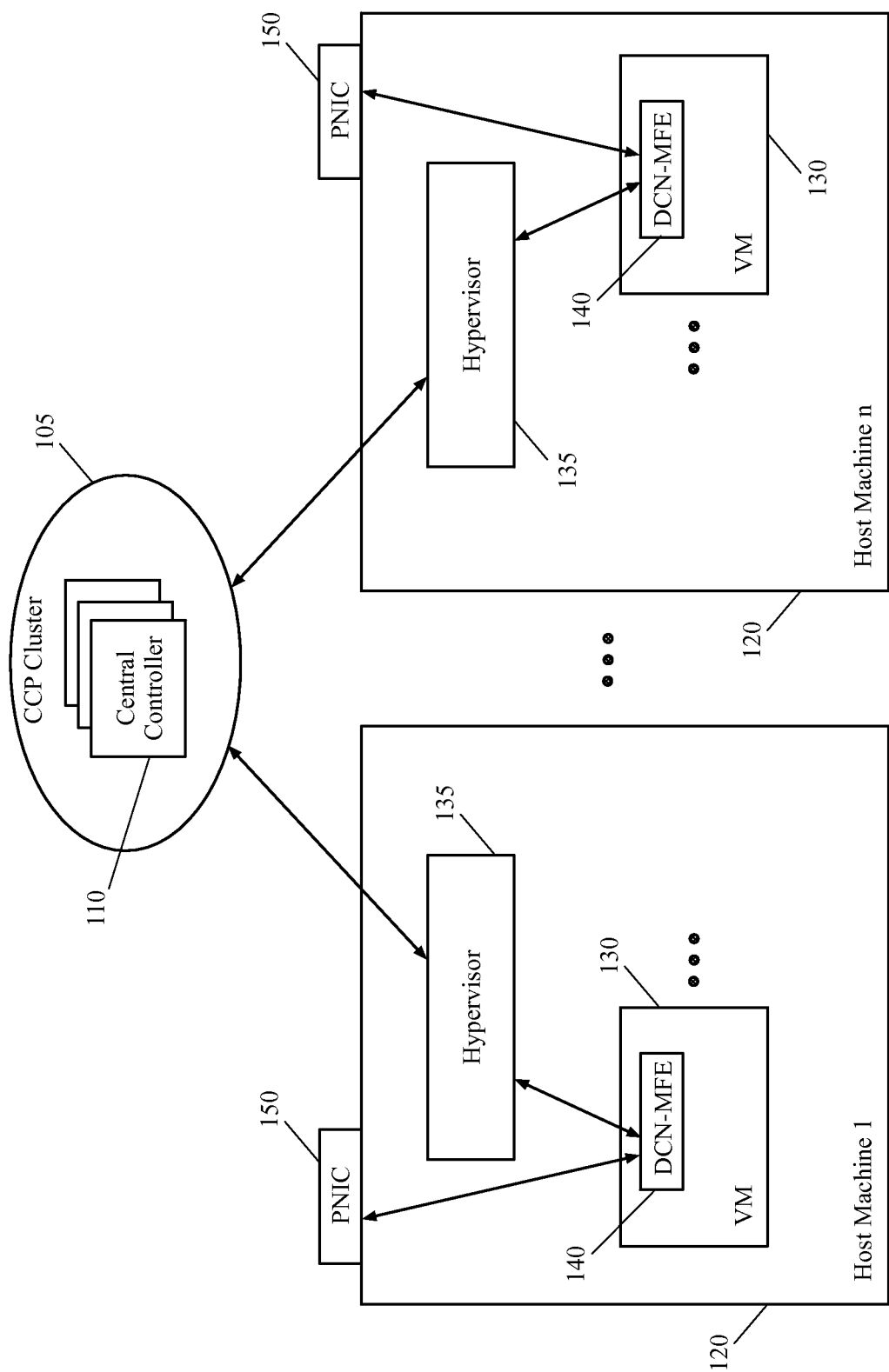
FIG. 1 illustrates an example implementation of DCN-MFEs within different virtual machines that reside in different host machines.

FIG. 1 illustrates an example implementation of DCN-MFEs within different virtual machines that reside in different host machines. More specifically, this figure shows the communication channels between a central control plane, the host machines, and the different elements of the host machines for exchanging configuration data and network traffic between the different elements. FIG. 1 includes a central control plane (CCP) cluster 105 and a set of host machines 120. The CCP cluster 105 includes several central controllers 110, while each host machine 120 includes a set of VMs 130, a hypervisor 135, and a physical network interface controller (PNIC) 150. Each of the shown VMs 130 that operates on one of the host machines 120 includes a data compute node managed forwarding element (DCN-MFE) 140.

One of ordinary skill in the art will realize that a CCP cluster or a host machine of some embodiments includes many more elements and modules that are not shown in this figure for the simplicity of description. The illustrated figure only shows some of the modules and elements of the CCP cluster and the host machines that are more relevant to the embodiments that are described above and below. Each one of the elements shown in the figure is now described in more detail below.

The illustrated central controllers 110 of some embodiments are responsible for (i) receiving definitions of different logical networks for different tenants of a hosting system (e.g., from a network administrator), and (ii) distributing the logical configuration and forwarding data to the managed forwarding elements (not shown) that reside in the hypervisors 135, and to the DCN-MFEs 140 that reside in the VMs 130. The MFEs of the hypervisors and DCN-MFEs use the distributed data to implement different logical switches (e.g., logical L2 switches, logical L3 switches, etc.) of the different logical networks in order to logically connect the virtual machines together and to other physical and logical networks (e.g., an external physical network, a third party hardware switch, a logical network of a tenant of another hosting system, etc.).

A virtualization software such as the hypervisor 135, in some embodiments, executes in the host machine 120 and is responsible for creating and managing a set of virtual machines 130 in the host machine. In some embodiments, a hypervisor (i.e., an MFE in the hypervisor) performs various different network functionalities for the data compute nodes (VMs) that run on the host machine. For example, after a hypervisor creates a set of VMs (e.g., for a tenant of a datacenter) on one or more host machines, the MFEs running inside the hypervisors of the host machines implement a set of logical forwarding elements that connects the different VMs of the tenant to each other and to other networks. In some embodiments, the MFEs exchange the logical network traffic for the tenant by establishing tunnels between each other (i.e., encapsulating the packets using a tunnel protocol) and serving as tunnel endpoints to exchange the network data.

However, having the DCNs of a host machine transmit the network traffic to the hypervisor (e.g., through a virtual network interface controller (VNIC)) in order for the hypervisor to enforce network policies and to perform packet forwarding for the DCNs (as in the emulation approach) adds extra layer of software to the hypervisor and imposes performance overhead. Conversely, having the VMs of a host machine communicate directly with the PNIC (or a simulated PNIC) of the host machine (as in the pass-through approach) avoids much of the emulation approach's overhead. However, in this approach (i.e., pass-through), the control plane of the network has less or no control over the packets that are generated by or destined for the DCNs, since the DCNs do not employ the hypervisor for data exchanging with the physical network interface.

In some embodiments, the DCN-MFE 140 is a software instance (e.g., a driver) that is instantiated inside the data compute node (e.g., in the network stack of the DCN's kernel). The DCN-MFE 140 enables the VM to perform packet forwarding processing and enforce network policies on the packets inside the VM. This way, the VM 130 can generate data packets and transmit the packets directly to the PNIC 150, or receive data packets that are destined for the VM directly from the PNIC 150, without imposing any overhead on the hypervisor 135. Instead of or in conjunction with, communicating directly with the PNIC 150, the DCN-MFE 150 of some embodiments performs the packet forwarding processing inside the VM and still sends the processed packets to the hypervisor (e.g., to an MFE residing in the hypervisor). In some such embodiments, since the packets are already processed by the VM, the hypervisor merely hands the packets to the PNIC 150 and as such, the performance impact on the hypervisor is minimum. Moreover, since the DCN-MFE 140 is configured by the CCP cluster 105, the packet forwarding processing is controlled by the control plane.

In some embodiments, the DCN-MFE 140 is configured (e.g., by the CCP cluster) in such a way to be able to switch between the pass-through approach (i.e., direct communication with the PNIC) and the emulation approach (i.e., communicating with the hypervisor through a VNIC). In some such embodiments, when the PNIC 150 is available, the DCN-MFE 140 utilizes the PNIC for transmitting network traffic. On the other hand, when the PNIC becomes unavailable to the DCN-MFE for any reason (e.g., the PNIC is reassigned to another VM through dynamic reconfiguration or reallocation of physical resources), the DCN-MFE 140 utilizes a VNIC (not shown in this figure) and exchanges the network traffic with the hypervisor 135 through the VNIC.

The above introduced the general concepts and implementation of DCN-MFEs in some embodiments, as well as certain aspects of the forwarding processing by the DCN-MFEs within the data compute nodes. In the following, Section I describes how a DCN-MFE of some embodiments performs network functionalities that are conventionally assigned to a hypervisor of a host machine instead of, or in conjunction with, the hypervisor. Next, Section II describes securing a DCN-MFE that is instantiated in a data compute node against any potential malicious attacks. Section III then describes the electronic system with which some embodiments of the invention are implemented.

I. Packet Forwarding Processing within a DCN

In some embodiments, a local controller that operates on the host machine (e.g., in the hypervisor of the host machine) configures and manages a DCN-MFE within each DCN (e.g., virtual machine, physical machine, container, etc.) executing on the host machine. In some embodiments, the local controller receives the configuration and forwarding data required to configure and manage the DCN-MFEs from a central control plane (CCP) cluster.

As described above, the CCP cluster of some embodiments includes one or more central controllers that configure and manage one or more logical networks for one or more tenants of a hosting system (e.g., a datacenter). In some embodiments, the CCP cluster (1) receives data that defines a logical network (e.g., from a user), (2) based on the received data, computes the configuration and forwarding data that define forwarding behaviors of a set of logical forwarding elements for the logical network, and (3) distributes the computed data to a set of local controllers operating on a set of host machines.

In some embodiments, each local controller, along with a managed forwarding element, resides on a host machine (e.g., in the virtualization software of the host machine) that executes one or more DCNs of the logical network. The DCNs of the logical network that execute on different host machines logically connect to each other (and to other physical or logical networks) through the set of logical forwarding elements (e.g., logical switches, logical routers, etc.).

In some embodiments, each local controller, after receiving the logical network data from the CCP cluster, generates configuration and forwarding data that defines forwarding behaviors of (1) the MFE that resides on the same host machine alongside the local controller, and (2) each DCN-MFE of each DCN of the host machine that participates in the logical network. The local controller then distributes the generated data to the MFE and the DCN-MFEs. Each of the MFE and DCN-MFEs implements the set of logical forwarding elements based on the configuration and forwarding data received from the local controller.

The configuration and forwarding data that the local controller of some embodiments generates for the MFE of the host machine, however, may be different from the configuration and forwarding data that the local controller generates for the DCN-MFEs of the same host machine. The MFE resides in the hypervisor of the host machine and is connected to several different DCNs, different subsets of which may belong to different logical networks of different tenants. As such, the MFE should be capable of implementing different sets of logical forwarding elements for different logical networks. On the other hand, each DCN-MFE that resides in a DCN (e.g., a virtual machine or VM) is only capable of implementing one or more logical networks to which the DCN is connected in some embodiments (e.g., the logical network(s) that are accessible to a tenant). Hence, in some embodiments, the forwarding and configuration data generated for the MFE of the host machine could be different (e.g., covering more logical networks' data) from the forwarding and configuration data generated for each DCN-MFE that operates on the same host machine.

Additionally, the forwarding and configuration data that a local controller of some embodiments generates for different DCNs that operate on the same host machine could be different from one DCN to another. As described above, in some embodiments, each DCN-MFE only implements a set of logical forwarding elements (e.g., logical switches, logical router, etc.) of the logical network to which the DCN containing the DCN-MFE logically connects. As such, the logical network data generated for a particular DCN-MFE operating in a DCN of a host machine could be different from the logical network data generated for a DCN-MFE of a different DCN in the same host machine (e.g., when the two DCNs are connected to two different logical networks).

Figure 2:
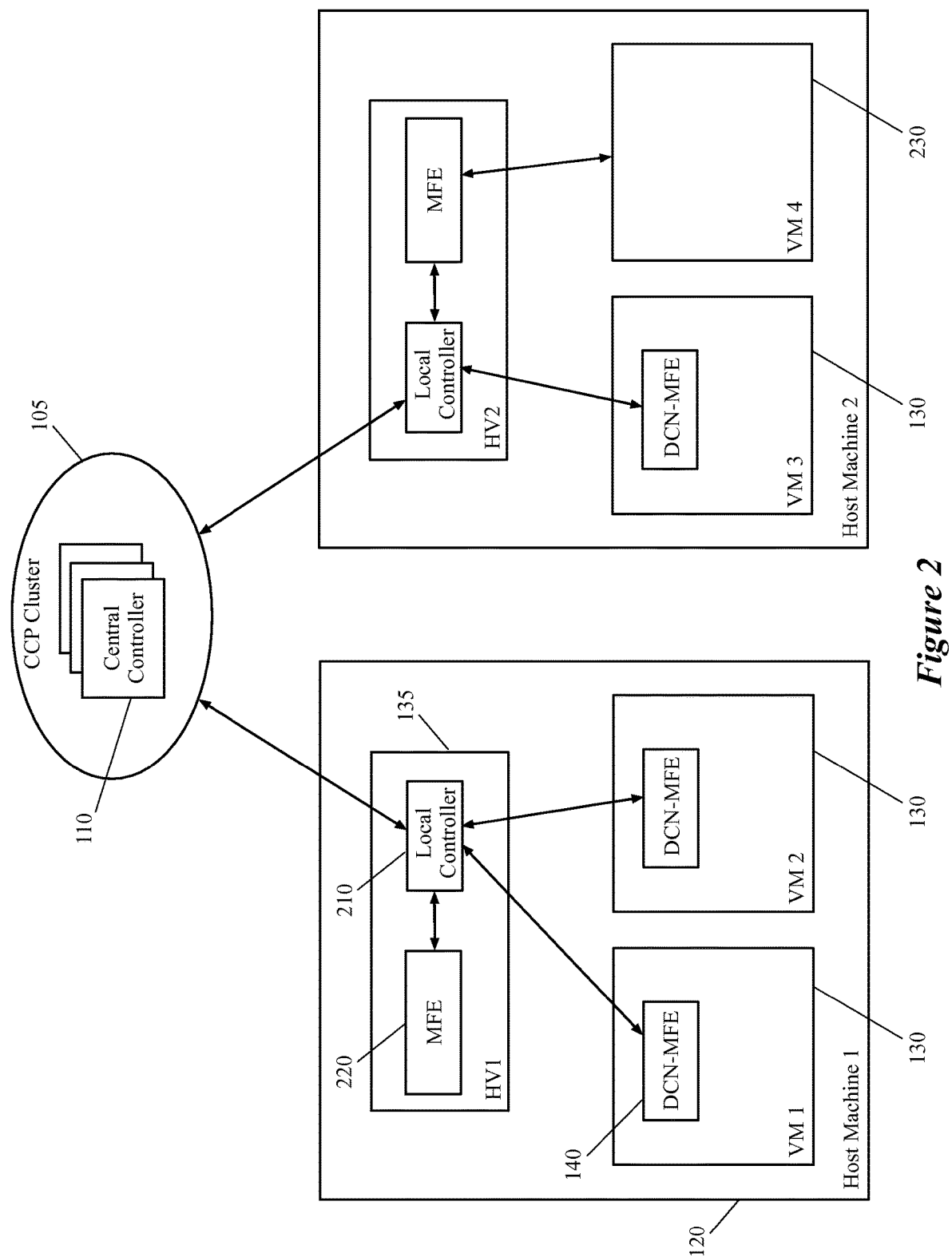
FIG. 2 illustrates a local controller of some embodiments that along with a managed forwarding element, operates in the hypervisor of a host machine and configures and manages both of the managed forwarding element and the DCN-MFEs of the host machine.

FIG. 2 illustrates a local controller of some embodiments that along with a managed forwarding element, operates in the hypervisor of a host machine and configures and manages both of the managed forwarding element and the DCN-MFEs of the host machine. This figure includes the same CCP cluster 105 and host machines 120 that were shown in FIG. 1. Additionally, FIG. 2 shows that each hypervisor 135 includes a local controller 210 and a managed forwarding element (MFE) 220. Furthermore, except for the DCN 230 (VM4) of Host Machine 2, each of the other three DCNs 130 (VM1-3) includes a DCN-MFE 140.

The virtual machines VM1-4 communicate with each other and other network entities (e.g., third-party hardware switches) via one or more logical networks, to which they are connected through the MFEs 220 and the DCN-MFEs 140. One of ordinary skill in the art would realize that the number of the host machines and DCNs illustrated in the figure are exemplary and only to simplify the description. Otherwise, a logical network for a tenant of a hosting system may span a multitude of host machines (and other third-party physical devices), and logically connect a large number of end machines to each other (and to other third-party physical devices).

The CCP cluster 105 communicates with the MFEs 220 and the DCN-MFEs 140 through the local controllers 210 in order to configure and manage these forwarding elements. The MFEs 220 and DCN-MFEs 140, in turn, implement different logical forwarding elements of the logical networks to logically connect the DCNs 130 and 230 operating on the host machines 120 to each other, to other end machines operating on other host machines (not shown), and to other physical machines that are connected to other third-party physical switches (not shown).

In some embodiments, the local controller 210 of each hypervisor of the host machines receives logical network data from a central controller 110 of the controller cluster 105. The controller 210 then converts and customizes the received logical network data for the local physical forwarding elements (i.e., the MFE 220 and DCN-MFEs 140 that operate on the same machine on which the local controller 210 operates). As described above though, the customized data generated for an MFE may be different from the customized data generated for the DCN-MFEs. Similarly, the customized data generated for a DCN-MFE may be different from the customized data generated for another DCN-MFE (operating in a same or different host machine). The local controller then delivers the converted and customized data to the local physical forwarding elements 220 and 140 on each host machine 120.

The CCP cluster of some embodiments communicates with the local controllers using a particular protocol (e.g., a Virtual Extensible LAN (VXLAN) control plane protocol), in order to distribute the logical configuration and forwarding data to the local controllers. In some embodiments, the local controllers use the same or different protocol (e.g., the OpenFlow protocol) to distribute the converted logical forwarding data to the MFEs of the host machines, as well as the DCN-MFEs of the DCNs running on the host machines. The local controllers of some embodiments use the same or different protocol (e.g., a database protocol such as the OVSDB protocol) to manage the other configurations of the forwarding elements, including the configuration of tunnels to other forwarding elements (MFEs and DCN-MFEs). In some other embodiments the local controllers 210 use other protocols to distribute the forwarding and configuration data to the forwarding elements (e.g., a single protocol for all of the data or different protocols for different data).

In some embodiments, each of the DCN-MFEs 140 on a host machine implements a particular set of logical forwarding elements (LFEs) for a particular logical network that logically connects the DCN containing the DCN-MFE to other network elements. An MFE 220 of a host machine, on the other hand, implements different sets of logical forwarding elements (LFEs) for different logical networks to which the different DCNs operating on the host machine are connected. As will be described in more detail below, the DCN-MFEs 140 of each host machine performs the logical forwarding operations (e.g., packet forwarding processing based on the forwarding information of the implemented LFEs) instead of, or in conjunction with, the MFE 220 that operates on the same host machine. As stated above, each set of logical forwarding elements (not shown) connects one or more of the end machines that reside on the same host machine to each other and to other end machines that are connected to the logical network. The logically connected end machines of the host machine, together with other logically connected end machines (operating on other host machines or connected to other hardware switches) create a logical network topology for the tenant of the hosting system.

In some embodiments, the connections of the end machines to the logical switch (as well as the connections of the logical switch to other logical switches such as a logical router) are defined using logical ports, which are mapped to the physical ports of the physical forwarding elements (MFEs and DCN-MFEs). As described above, in some embodiments, the LFEs (e.g., logical routers and switches) of a logical network are implemented by each DCN-MFE of each DCN that is connected to the logical network. That is, in some embodiments, when the DCN-MFE receives a packet from the DCN (i.e., from an application that runs in the DCN), the DCN-MFE performs the network processing for the logical switch to which the DCN logically couples, as well as the processing for any additional LFE (e.g., logical router processing if the packet is sent to an external network, logical router processing and processing for the other logical switch in the network if the packet is sent to an end machine (DCN) coupled to the other logical switch, etc.).

In some embodiments, the DCN-MFEs implement the LFEs of the logical network through a set of flow entries. These flow entries are generated by a local controller operating on each host machine (such as the local controllers 210). The local controller generates the flow entries by receiving the logical forwarding data from the CCP cluster and converting the logical forwarding data to the flow entries for routing the packets of the logical network in the host machine. That is, the local controller converts the logical forwarding data to a customized set of forwarding behaviors that is recognizable and used by the DCN-MFEs to forward the packets of the logical network between the end machines. In other words, by using the generated flow entries, the DCN-MFEs are able to forward and route packets between data compute nodes of the logical network that contain the DCN-MFEs.

In some embodiments, however, some or all of the DCN-MFEs are not flow-based software forwarding elements, but instead process packets based on configuration data that is generated by their respective local controllers. In some embodiments, the local controllers receive the same data from the CCP cluster irrespective of the type of DCN-MFEs they manage, and perform different data conversions for different types of DCN-MFEs. Although in the described examples, each logical network is assigned to a particular tenant, one tenant may have many more logical networks assigned to the tenant. Also, because the end machines operating on a particular host machine may belong to more than one logical network (e.g., some of the end machines belong to a first tenant while the other end machines belong to a second tenant), each MFE of the host machine (i.e., operating in the virtualization software of the host machine) implements different sets of logical forwarding elements that belong to different logical networks.

Lastly, not all the DCNs executing on a host machine are required to implement a DCN-MFE in some embodiments. As illustrated in FIG. 2, the virtual machine 230 (VM4) does not include any DCN-MFE. In other words, in some embodiments, some of the end machines (DCNs) do not execute packet forwarding pipelines (i.e., do not implement LFEs, tunneling, etc.) within the end machine and instead, forward the packets to an associated MFE executing in the hypervisor to perform the necessary packet forwarding processing. In some such embodiments, an end machine that does not implement a DCN-MFE couples to the logical networks through its associated MFE (running in the hypervisor).

A DCN-MFE of some embodiments determines whether the DCN-MFE can perform packet forwarding processing on a packet when the DCN-MFE receives the packet from one of the applications that executes on the DCN. That is, based on the configuration and forwarding data that the DCN-MFE has received for an associated local controller that executes on the same host machine, the DCN-MFE knows to which particular logical network(s) the DCN is connected. The DCN-MFE, therefore, implements only the logical forwarding elements of that particular logical network(s).

In some such embodiments, when a DCN-MFE receives a packet that belongs to a different logical network, the DCN-MFE does not perform forwarding processing and instead, sends the packet to the MFE of the host machine to perform the forwarding processing on the packet. That is, when the DCN-MFE extracts the forwarding data (e.g., source and destination addresses) from the different network layers' headers of the packet (e.g., L2 header, L3 header, etc.), the DCN-MFE can determine whether the packet is destined for a logical network for which the DCN-MFE is configured, or a different logical network. When the DCN-MFE determines that the packet is destined for a DCN that is connected to a logical network that the DCN-MFE does not implement, the DCN-MFE forwards the packet to the MFE of the host machine for forwarding processing.

Figure 3:
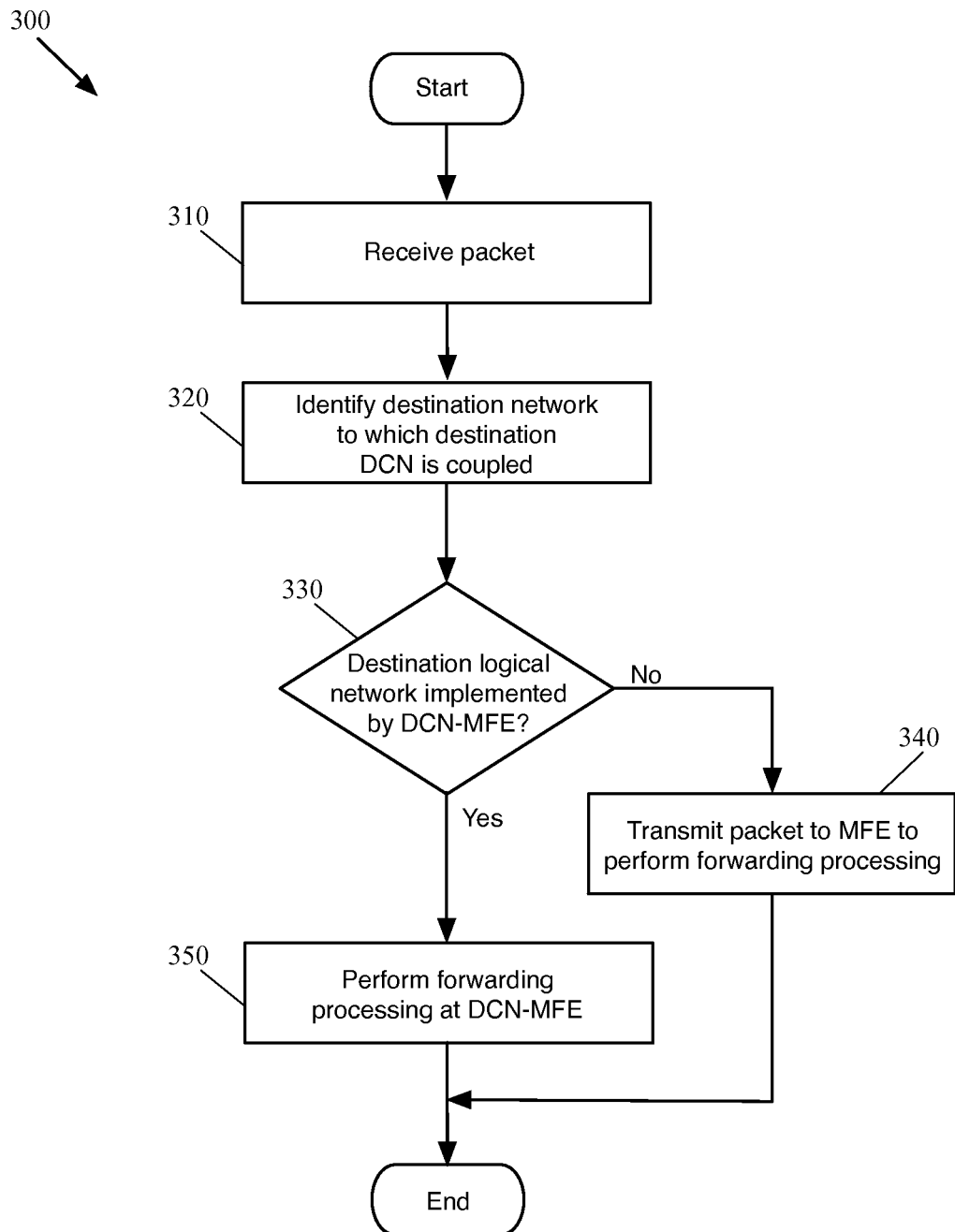
FIG. 3 conceptually illustrates a process of some embodiments that determines which forwarding element operating on a host machine should perform forwarding processing for network traffic data that is generated in a DCN.

FIG. 3 conceptually illustrates a process 300 of some embodiments that determines which forwarding element operating on a host machine should perform forwarding processing for network traffic data that is generated in a DCN. More specifically, the process determines whether the DCN-MFE is capable of performing the forwarding processing on a packet that the DCN-MFE receives from an application, or the packet should be sent to the MFE of the host machine to be processed. The process 300 of some embodiments is performed by the DCN-MFE that runs in a DCN (e.g. a virtual machine (VM), a container, etc.) operating on a host machine.

The process starts by receiving (at 310) a packet from one of the applications that executes in the DCN. In some embodiments the DCN-MFE is a driver that operates in the kernel of the DCN, while the applications that generate the packets to be forwarded to other network elements operate in the user space of the DCN. Before starting any forwarding processing on the received packet, the process identifies (at 320) the destination network to which the destination DCN is connected. The destination DCN is the final destination data compute node that executes the destination application to which the packet is sent. In order to identify the destination logical network, the process of some embodiments extracts a set of forwarding data (e.g., source and destination addresses) from the different network layers' headers of the received packet (e.g., L2 header, L3 header, etc.). Based on this extracted data, the process can determine the destination address of the packet (e.g., based on the destination IP address stored in the L3 header of the packet).

The process then determines (at 330) whether the destination network is one of the logical networks that the DCN-MFE implements. The process of some embodiments determines that the DCN-MFE implements the destination logical network when the DCN-MFE has received the necessary configuration and forwarding data to implement the destination logical network. For example, the process can determine that the packet should be sent to an end machine in a different logical network, when none of the logical forwarding elements that the DCN-MFE implements (for one or more logical networks) has a logical port associated with the destination address. In other words, when the DCN-MFE does not have enough information (that is received in the configuration data) for a logical port of a logical switch to which the destination DCN couples, the DCN-MFE determines that the packet is destined for a different logical network in some embodiments. On the other hand, some embodiments ensure that the DCN-MFE is always configured to implement any logical networks reachable from its DCN without requiring that the packet pass through a centralized MFE.

When the process determines that the DCN-MFE does not implement the destination logical network, the process transmits (at 340) the packet to an MFE operating in the hypervisor of the host machine so that the MFE performs the necessary forwarding processing on the packet. The process then ends. As described above, the MFE is connected to several different DCNs operating on the host machine, different subsets of which may belong to different logical networks of different tenants. As such, the forwarding and configuration data that the MFE of the host machine receives includes data for all of these logical networks and not just the logical network(s) to which the source DCN couples. Based on this configuration and forwarding data, the MFE is capable of implementing different sets of logical forwarding elements for the different logical networks.

On the other hand, when the process determines that the destination logical network is one of the logical networks that the DCN-MFE implements, the process starts (at 350) performing forwarding processing on the received packet. The forwarding processing of network data is described in more detail below. The process then ends.

The specific operations of the process 300 may not be performed in the exact order shown and described. The specific operations may not be performed in one continuous series of operations, and different specific operations may be performed in different embodiments. Furthermore, the process 300 could be implemented using several sub-processes, or as part of a larger macro process.

After receiving a logical network configuration data from the local controllers, the MFEs and DCN-MFEs establish tunnels (e.g., a Virtual Extensible LAN (VXLAN) tunnel, a Stateless Transport Tunneling (STT) tunnel, a Geneve tunnel, etc.) between themselves (e.g., a full mesh of tunnels between all of the configured forwarding elements that implement the logical network) in order to exchange the logical network packets between the end machines that are coupled to the MFEs and/or the DCN-MFEs.

In some embodiments, when the source and destination DCNs operate on different host machines and exchange data through the PNICs of the host machines directly (i.e., use the pass-through approach), the source and destination DCN-MFEs use a particular tunnel protocol (e.g. VXLAN) to exchange network traffic between each other. That is, the source DCN-MFE uses a particular tunnel protocol to encapsulate the packets with the source and destination DCN-MFE addresses (e.g., IP addresses associated with the DCN-MFEs). These source and destination addresses inserted in the packets (e.g., in the packet headers) are used as the tunnel source and destination endpoints, respectively. The source DCN-MFE then sends the encapsulated packets towards the destination DCN. The destination DCN-MFE (i.e., the destination endpoint) then decapsulates the packets (i.e., removes the tunneling information added to the packets) using the particular tunnel protocol and sends the packets towards their corresponding destination in the destination DCN.

In some embodiments, when the source and destination DCNs operate on two different host machines and exchange network traffic through the MFEs of the virtualization software (i.e., use the emulation approach), the source DCN-MFE and the MFE of the destination host machine (on which the destination DCN operates) use a particular tunnel protocol to exchange the network traffic. That is, the source DCN-MFE uses a tunnel protocol (e.g., a VXLAN tunnel protocol) to encapsulate the packets with the source DCN-MFE and the destination MFE addresses (e.g., IP addresses) as the tunnel endpoints before sending the packets towards the destination DCN. The destination MFE (i.e., the MFE in the hypervisor of the destination host machine) then decapsulates the packets (i.e., removes the tunneling information added to the packets) using the same tunnel protocol, and sends the packets towards the destination DCN.

Figure 4:
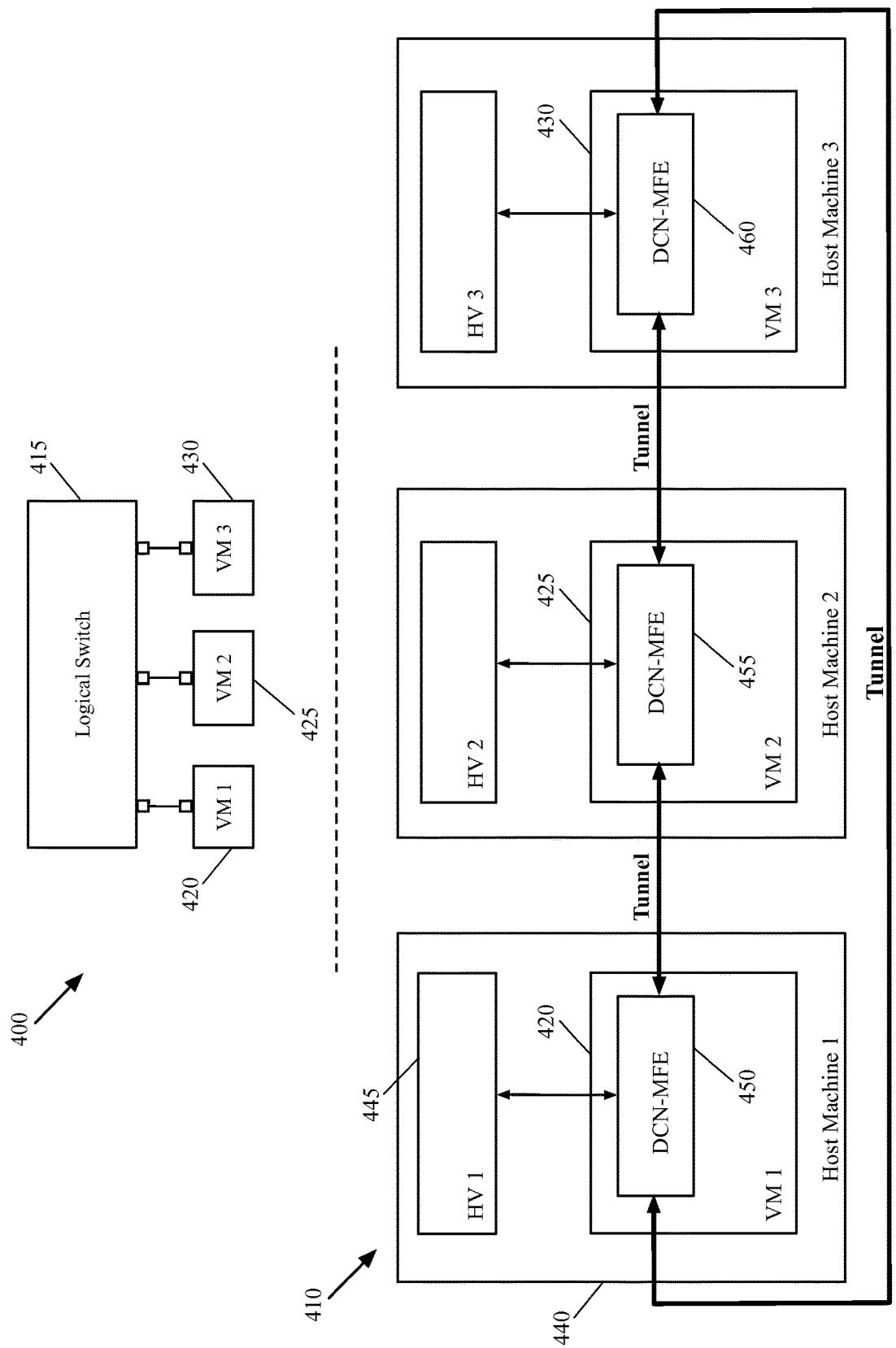
FIG. 4 illustrates an example of establishing tunnels between DCN-MFEs of different data compute nodes that operate on different host machines.

FIG. 4 illustrates an example of establishing tunnels between DCN-MFEs of different data compute nodes that operate on different host machines. Specifically, this figure shows a portion of a logical network 400 in the top half of the figure, and a portion of a physical network 410 that implements the logical network portion 400. The logical network portion 400 includes a logical switch (e.g., an L2 switch) 415 that connects three different data compute nodes (VM1-3) 420-430 to each other. These VMs may belong to a tenant of a hosting system. The physical network portion 410 includes three host machines 440 (Host Machines1-3) that each executes a hypervisor 445 and one of the VMs 420-430. Three different DCN-MFEs 450-460 are implemented on the virtual machines VM1-3, respectively.

As described above, each local controller converts the logical network data that defines forwarding behaviors of a set of logical forwarding elements (LFEs) to customized forwarding data that defines forwarding behavior of each forwarding element (MFE and DCN-MFE) that implements the set of LFEs. The customized forwarding data, in some embodiments, includes, but is not limited to, (1) data (e.g., L2 data such as MAC address resolution protocol (ARP) tables, L3 data such as routing tables, etc.) for the MFE or DCN-MFE to implement the required set of LFEs for packets sent to and received from the DCNs, and (2) data (e.g., virtual tunnel endpoint (VTEP) tables, etc.) to encapsulate these packets using a tunnel protocol in order to send the packets to other MFE an/or DCN-MFEs.

The logical data for implementing the LFEs of some embodiments includes tables that map addresses to logical ports of the LFEs (e.g., mapping MAC addresses of virtual machines 420-430 to logical ports of logical switch 415, mapping IP subnets to ports of logical routers (not shown), etc.), routing tables for logical routers, etc. In addition, the logical data includes mappings of the logical ports to physical ports of the MFEs or DCN-MFEs at which the machines connected to a logical port is located. In some embodiments in which the DCN-MFEs are flow-based software forwarding elements, the local controller converts the received logical network data into a set of flow entries that specifies expressions to match against the header of a packet, and actions to take on the packet when a given expression is satisfied. Possible actions in some embodiments include modifying a packet, dropping a packet, sending it to a given egress port on the logical network, and writing in-memory metadata (analogous to registers on a physical switch) associated with the packet and resubmitting the packet back to the logical network for further processing.

The tunneling data, in some embodiments, includes instructions on how to set up tunnels between the different forwarding elements (MFEs and DCN-MFEs). For instance, each of the DCN-MFEs 450-460 serves as a tunnel endpoint with a particular tunnel endpoint Internet Protocol (IP) address. Each DCN-MFE also receives addresses (e.g., tunnel endpoint IP addresses) of the other DCN-MFEs, as well as other information (e.g., logical network and logical port identifiers, etc.) to use when encapsulating packets using the tunnel protocol.

In the illustrated example of FIG. 4, each of the DCN-MFEs 450-460, after receiving the tunneling data from its associated local controller, sets up a tunnel between the DCN-MFE and the other two DCN-MFEs as illustrated with highlighted double-headed arrows between these DCN-MFEs. This is because, based on the received configuration and forwarding data, each DCN-MFE knows that the VM in which it operates is connected to a logical network through the logical switch 415. As such, when an application in a particular VM generates an L2 packet that should be forwarded to another VM in the logical network, the DCN-MFE within the particular VM receives the L2 packet from the application and performs the L2 logical forwarding processing for the packet. After identifying the destination tunnel endpoint, the DCN-MFE encapsulates the packet with the destination tunnel endpoint data and forwards the packet towards the destination VM (e.g., through the PNICs of the host machines executing the source and destination VMs). Two examples of exchanging packets between two DCN-MFEs as tunnel endpoints using two different approaches (i.e., pass-through and emulation approaches) are described below by reference to FIGS. 5 and 6.

Figure 5:
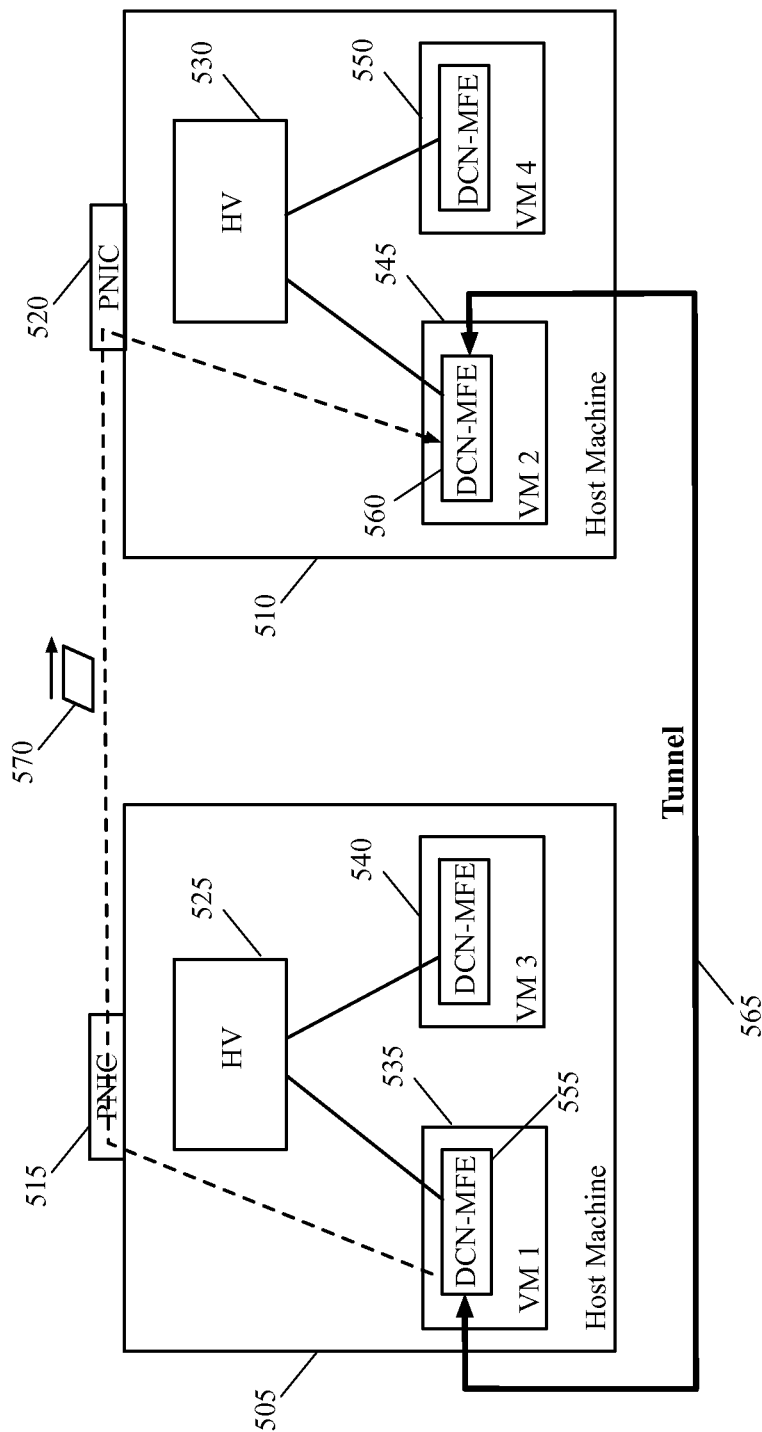
FIG. 5 illustrates two different DCNs of two different host machines communicating with each other directly through the physical network interface controllers (PNICs) of the host machines using a particular tunnel protocol (e.g., VXLAN).

As described above, in the pass-through approach of some embodiments, the source and destination DCNs operating on different host machines exchange data through the PNICs of the host machines without employing the hypervisors of the host machines. FIG. 5 illustrates an example of one such approach. More specifically, this figure shows two different DCNs of two different host machines communicating with each other directly through the physical network interface controllers (PNICs) of the host machines using a particular tunnel protocol (e.g., VXLAN protocol).

FIG. 5 shows two host machines 505 and 510. The first host machine 505 has a PNIC 515 and executes a hypervisor 525 along with two virtual machines 535 and 540. The second host machine 510 has a PNIC 520 and executes a hypervisor 530, as well as two virtual machines 545 and 550.

In the illustrated example, the DCN 535 (VM1) has generated a packet 570 (e.g., a guest application running on the machine generated the packet) to be sent to the DCN 545 (e.g., to a guest application that runs in VM2). Although not shown, the two DCNs 535 and 545 are connected to a particular logical network (e.g., through a common logical switch, through two different logical switches that are connected to a common logical router, etc.). The logical network may or may not include the other two DCNs 540 and 550.

As shown in the figure, both of the DCN-MFEs 555 and 560 use the pass-through approach and communicate with each other directly through the PNICs 515 and 520 of the host machines 505 and 510, respectively. In other words, these two DCN-MFEs do not need the MFEs that run in the hypervisors 525 and 530 in order to exchange the network data with each other or with other network elements of the logical network to which the source and destination DCNs are connected. As will be described in more detail below by reference to FIGS. 11-13 though, when these DCN-MFEs communicate with other DCN-MFEs that operate on the same host machines, the DCN-MFEs use their respective hypervisor in order to exchange network traffic with the other DCN-MFEs.

In some embodiments, the source and destination DCN-MFEs 555 and 560 can communicate with the PNICs directly because the DCNs that contain these two DCN-MFEs, also include the required physical drivers of the PNICs in order to communicate with the PNICs. In fact, in some embodiments, a DCN-MFE is a managed forwarding element that operates in the PNIC driver of a data compute node. In some other embodiments, the DCN-MFE is a separate driver that executes in the data compute node. As the DCNs 535 and 545 are connected to a same logical network (e.g., connected to a common logical L2 switch, to different L2 switches that are connected to a common L3 switch), both of the DCN-MFEs executing in these DCNs are capable of implementing the logical network. That is, the DCN-MFEs are capable of implementing the LFEs of the logical network based on the logical network forwarding and configuration data that the DCN-MFEs receive from their respective local controllers. The DCN-MFEs then perform the forwarding processing on the packets based on the data stored for the LFEs and data stored in the packets' headers.

When the DCN-MFE 555 receives the generated packet (e.g., from a source guest application running in the DCN 535), the DCN-MFE starts executing the forwarding pipelines of the logical forwarding elements that connect the source DCN-MFE to the destination DCN-MFE. That is, the DCN-MFE extracts the data stored in different packet headers (e.g., destination MAC address in the L2 header, destination IP address in the L3 header, etc.) and compares the extracted data with the forwarding data that the DCN-MFE receives from one or more central controllers of the CCP cluster.

Based on executing the forwarding pipelines, the source DCN-MFE 555 realizes that the destination managed forwarding element is the DCN-MFE 560 (e.g., the DCN-MFE 560 implements a logical port of a logical switch that is associated with the destination DCN). After execution of the pipeline, the source DCN-MFE 555 establishes a tunnel 565 and uses the tunnel protocol to encapsulate the packet 570 with the IP address of the source DCN-MFE 555 as the source endpoint of the tunnel and the IP address of the destination DCN-MFE 560 as the destination endpoint of the tunnel. The source DCN-MFE 555 establishes the tunnel by injecting the source and destination IP addresses in the packet's IP source and destination outer headers. The packet is then forwarded towards the destination application in the destination DCN.

As shown in the figure, the physical path of the packet 570 though, is not through the illustrated tunnel 565, since this tunnel is only an abstract concept. That is, the tunnel encapsulation information injected into the outer headers of the packet causes the intermediary networking elements (e.g., PNICs 515 and 520, and other forwarding elements between the PNICs) to ignore the inner source and destination headers of the packet (as if a direct path between the two forwarding elements is created). In reality, the source DCN-MFE 555 sends the encapsulated packet to the PNIC 515, which in turn forwards the packet to the PNIC 520 based on the outer headers information of the packet 570.

The PNIC 520 then forwards the packet directly to the destination DCN-MFE 560, which is the destination endpoint of the tunnel 565. The destination DCN-MFE 560, after receiving the packet 570, decapsulates the packet (i.e., removes the tunneling information added to the packet by the source DCN-MFE 555) using the same tunnel protocol used to encapsulate the packet, and sends the packet to the destination application inside the DCN 545 (e.g., based on the inner headers information of the packet such as the destination port address stored in the L4 header of the packet).

Figure 6:
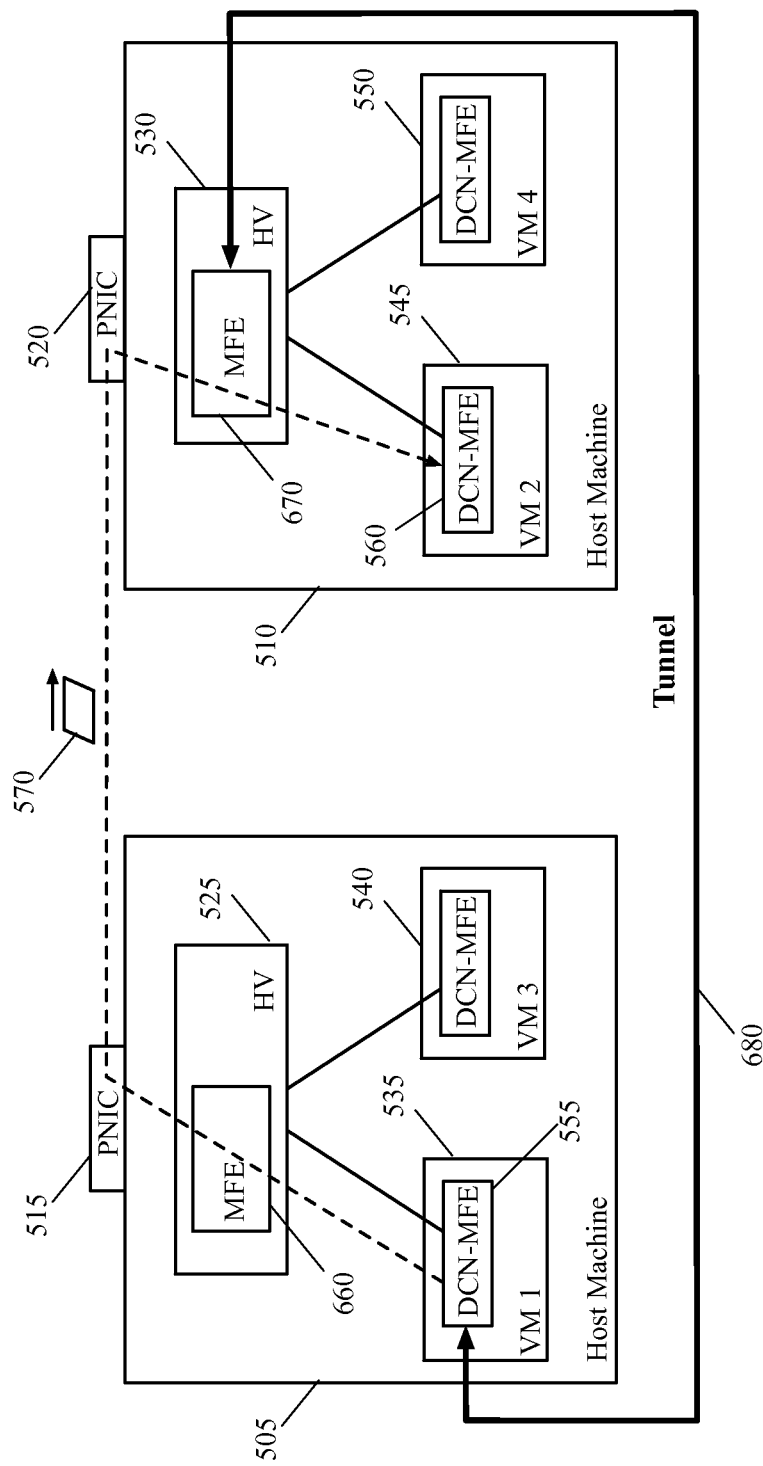
FIG. 6 illustrates two different DCNs of two different host machines communicating with each other through the hypervisors (i.e., MFEs implemented in the hypervisors) of the host machines using a particular tunnel protocol (e.g., VXLAN).

In the above-described example, the source and destination VMs used the pass-through approach to exchange network data with each other. As described before, in the emulation approach, the source and destination VMs, although processing the packets inside the VMs, exchange the packets with each other through their respective hypervisors. FIG. 6 illustrates an example of one such approach. More specifically, this figure shows two different DCNs of two different host machines communicating with each other through the hypervisors (i.e., MFEs implemented in the hypervisors) of the host machines using a particular tunnel protocol (e.g., VXLAN protocol).

FIG. 6 includes similar elements as in FIG. 5, except that in this figure the hypervisor 525 includes an MFE 660 and the hypervisor 530 includes an MFE 670. This figure shows that the first host machine 505 has a PNIC 515 and executes a hypervisor 525 along with two virtual machines 535 and 540. The second host machine 510 has a PNIC 520 and executes a hypervisor 530 along with two virtual machines 545 and 550. Also, in this figure the DCN 555 has generated a packet 570 to be sent to the DCN 560. Although not shown, the two DCNs 535 and 545 are connected to a logical network through a common logical switch. The logical network may or may not include the other two DCNs 540 and 550.

As shown in this figure though, the DCN-MFEs 555 and 560 do not use the pass-through approach to communicate with each other directly through the PNICs 515 and 520 of the host machines 505 and 510 in order to exchange the packet 570. In other words, the source and destination DCN-MFEs in the example of this figure exchange packets using the emulation approach instead of the pass-through approach. There can be various reasons for selecting the emulation approach over the pass-through approach in some embodiments. For example when a DCN does not include the necessary PNIC driver, or the PNIC driver running on the DCN is corrupt, the DCN uses the emulation approach to forward the packets. Alternatively, the DCN-MFEs might be configured (by the management control plane) in such a way to exchange packets of a particular type (e.g., belonging to a particular data flow, generated by a particular source application, etc.) only through the emulation approach.

Therefore, instead of communicating with the PNICs directly, the two DCN-MFEs 555 and 560 shown in FIG. 6 employ the MFEs 660 and 670 that operate in the hypervisors 525 and 530, respectively, in order to exchange network data with each other, or with other end machines of the logical network to which the DCN-MFEs 555 and 560 are connected. It is important to note that even though the source DCN-MFE 555 forwards the packet to the MFE 660 and the destination DCN-MFE 560 receives the packet from the MFE 670, the packet still has to be forwarded through the PNICs 515 and 520 in order to be transmitted from the source host machine to the destination host machine.

In the emulation approach of some embodiments, between the pair of source DCN-MFE and MFE in the source host machine, the forwarding element that is closer to the source of the packet performs the forwarding processing on the packet. Hence, since the source DCN-MFE is always closer to the source of the packet (i.e., the source application that generates the packet in the same DCN) in some embodiments, the source DCN-MFE performs the necessary forwarding processing (e.g., a logical switch's forwarding pipeline) for the packet. In some such embodiments, the source MFE only receives the packet from the source DCN-MFE and hands the packet to the corresponding PNIC of the source host machine without performing any forwarding processing for the packet.

Similarly, in some embodiments, between the pair of destination DCN-MFE and MFE in the destination host machine, the forwarding element that is closer to the source of the packet performs the forwarding processing on the packet. Therefore, in some embodiments, since the destination MFE is always closer to the source of the packet (i.e., the destination PNIC, which collects the packets from the physical network), the destination MFE performs the necessary forwarding processing for the packet. In some such embodiments the destination DCN-MFE only receives the packet from the destination MFE and hands the packet to the corresponding destination application in the destination DCN without performing any forwarding processing.

In some embodiments the closer forwarding element performs the forwarding processing in order to increase the efficiency of forwarding process. For example, during the processing of a packet, when the first forwarding element on the path of a packet determines that the packet should be dropped (e.g., based on a network policy received from the control plane), the first forwarding element drops the packet and does not send the packet to the second forwarding element on the path to make such a determination. As such, extra network resources are not deployed to continue on forwarding the packet towards a destination while the packet is not supposed to reach the destination.

In the illustrated example, since the two DCNs 535 and 545 are connected to a common logical switch of the logical network (not shown), both of the DCN-MFEs executing in these DCNs are capable of performing the necessary forwarding pipeline of the common logical switch (e.g., based on the logical forwarding and configuration data that the DCN-MFEs have received from their respective local controllers). Additionally, both of the MFEs 660 and 670 receive the logical network configuration and forwarding data form their corresponding local controllers (not shown). Therefore, these two MFEs are also capable of performing forwarding pipeline of the logical switches of the logical network.

When the DCN-MFE 555 receives the generated packet (e.g., from a source application running in the DCN 535), the DCN-MFE starts executing the forwarding pipeline of the logical switch. This forwarding pipeline indicates to the DCN-MFE 555 that the destination application is in the same subnet and connected to the same logical switch which is being implemented by both of the MFE 670 and the DCN-MFE 560 (e.g., based on the different source and destination data stored in the different packet headers).

After execution of the forwarding pipeline, the source DCN-MFE 555 establishes a tunnel 680 and uses the tunnel protocol to encapsulate the packet 570 with the IP address of the source DCN-MFE 555 as the source endpoint of the tunnel and the IP address of the destination MFE 670 as the destination endpoint of the tunnel. This is because, in the destination host machine, the destination MFE 670 is closer to the source of the packet (on the transmission path from the source application to the destination application) compared to the destination DCN-MFE 560. Consequently, the MFE 670 is selected as the destination endpoint of the tunnel over the DCN-MFE 560.

As shown in the figure, the physical path of the packet 570 is not through the illustrated tunnel 680 though, since the illustrated tunnel is only an abstract concept. That is, the tunnel encapsulation information injected into the outer headers of the packet causes the intermediary networking elements (e.g., routers) ignore the inner source and destination headers of the packet (as if a direct path between the two forwarding elements is created). In reality, the source DCN-MFE 555 sends the encapsulated packet to the MFE 660, which in turn forwards the packet to the PNIC 515.

The PNIC 515 then forwards the packet to the PNIC 520 based on the tunneling data encapsulated in the outer headers of the packet 570. The PNIC 520 then forwards the packet to the destination MFE 670, which is the destination endpoint of the tunnel 680. The MFE 670 then performs the forwarding processing for the packet (e.g., decapsulates the packet using the same tunnel protocol used for packet encapsulation) and forwards the packet based on the information stored in the inner headers of the packet (e.g., the MAC address of the destination DCN) to the destination DCN-MFE 560. The destination DCN-MFE 560, after receiving the packet 570, sends the packet to the destination application inside the DCN 545.

As described above, in some embodiments, the DCN-MFE of a data compute node enables the data compute node to perform network traffic forwarding processing in the DCN, instead of having the MFE of the virtualization software (e.g., the hypervisor) of the host machine perform the packet forwarding processing. In some embodiments that use the pass-through technology, the DCN-MFE performs the packet forwarding processing for both of the outgoing and incoming network traffic.

In the pass-through approach of some embodiments, the data compute node includes and runs the required PNIC's driver in order to directly communicate with the PNIC of the host machine. In some embodiments, the DCN-MFE is a separate driver that runs in the DCN. In some other embodiments the DCN-MFE is part of the PNIC driver running in the DCN. The DCN-MFE of the data compute node of some embodiment (regardless of being a part of the PNIC driver or being a separate driver in the DCN) is able to offload the processed network traffic directly to the PNIC of the host machine. Similarly, the DCN-MFE of the DCN is also able to receive the network traffic directly from the PNIC of the host machine. In other words, the DCN-MFE exchanges the network traffic directly with the PNIC of the host machine and without communicating with a managed forwarding element that operates in the hypervisor of the host machine.

In the pass-through approach of some embodiments, however, when a source DCN operating on a host machine needs to transmit the network traffic to a destination DCN that operates on the same host machine, the source and destination DCNs employ the hypervisor as an intermediary means for exchanging the network traffic. Employing the hypervisor of a host machine to exchange network traffic between the DCNs of the host machine is described in detail below by reference to FIGS. 11-13.

Figure 7:
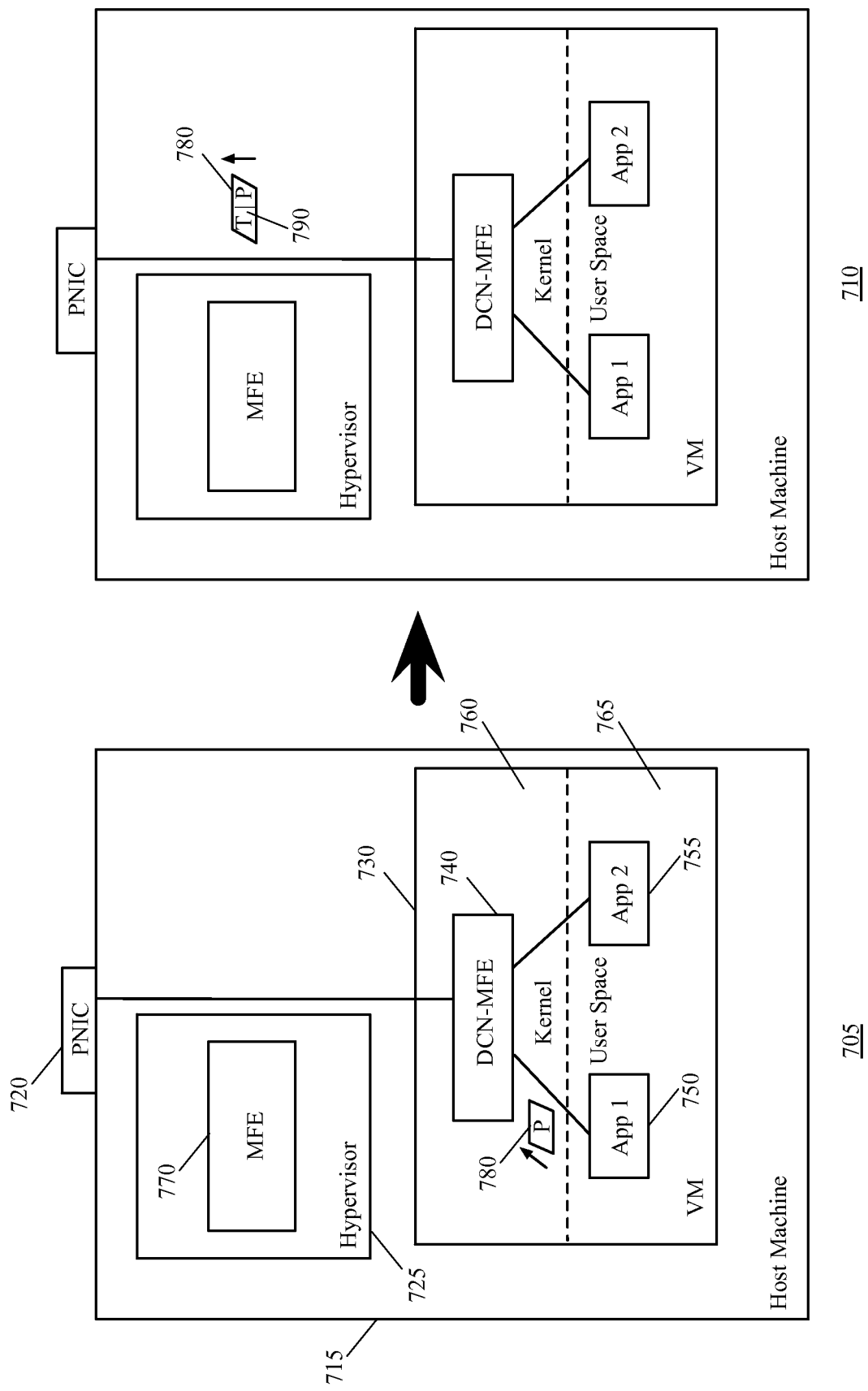
FIG. 7 illustrates an example of a DCN-MFE within a data compute node that performs packet forwarding processing on a packet received from an application and transmits the processed packet directly to a PNIC of a host machine that hosts the data compute node.

FIG. 7 illustrates an example of a source DCN-MFE within a data compute node that performs packet forwarding processing on a packet received from an application and transmits the processed packet directly to a PNIC of a host machine that hosts the data compute node. Specifically, this figure shows, through two stages 705 and 710, how a DCN-MFE of a virtual machine receives a packet originated from one of the guest applications running in the virtual machine, performs packet forwarding processing on the packet, and sends the packet to the physical NIC of the host machine to be forwarded towards the destination of the packet.

FIG. 7 shows a host machine 715 that includes a PNIC 720 and a hypervisor 725. The host machine can be a physical server or any other computer that hosts one or more data compute nodes (e.g., virtual machines, physical machines, containers, etc.) for a tenant of a hosting system or a datacenter. The host machine also hosts a virtual machine 730. The virtual machine 730 runs a DCN-MFE 740 in the kernel space 760 (e.g., in the network stack in the kernel) of the virtual machine (VM) and two applications 750 and 755 in the user space of the VM.

In the first stage 705, the source application 750 has generated a packet 780 to be sent to a destination application executing in a destination data compute node that operates on a destination host machine (not shown). Since the DCN-MFE 740 executes all of the forwarding pipelines of the network to which the VM 730 is connected, all of the applications that run in this virtual machine 730 send and receive their corresponding network traffic to and from the DCN-MFE 740.

Therefore, the application 750 sends the packet 780 (e.g., through a communication channel instantiated in the virtual machine for such communications) to the DCN-MFE 740. When the DCN-MFE 740 receives the packet, the DCN-MFE determines whether the packet is destined for an end machine of the same logical network to which the VM 730 is connected or it is destined for a different logical and/or physical network.

In some embodiments, if the packet is determined to belong to a different network (e.g., based on destination information in different headers of the packet), the DCN-MFE 740 forwards the packet to the managed forwarding element (MFE) 770 that operates in the hypervisor of the host machine for further forwarding processing of the packet. That is, since the MFE implements all the logical forwarding elements of the different logical networks, even if the packet is destined for a different logical or physical network, the MFE will have the necessary forwarding pipeline to determine the next destination of the packet.

It should be understood that sending the packet to an MFE to perform forwarding processing on the packet in this manner is not the same as processing the packet inside the virtual machine and using the MFE merely as an intermediary to pass the packet to the PNIC (as was defined in emulation approach). In other words, when the DCN-MFE of some embodiments determines that the destination of a packet belongs to a different network, the DCN-MFE hands the packet to the MFE to perform the whole forwarding processing on the packet. This is different than the emulation approach, in which the DCN-MFE performs all the necessary forwarding processing on the packet and then merely passes the packet to the MFE to be handed to the PNIC without any further forwarding processing.

When the DCN-MFE 740 determines that the packet is destined for another data compute node that belongs to the same logical network but on a different host machine, the DCN-MFE executes all the necessary forwarding pipelines to determine which other managed forwarding element (i.e., other MFE or DCN-MFE) implements the logical switch to which the destination data compute node couples. As an example, the source DCN-MFE could be coupled to a first L2 logical switch, while the destination DCN-MFE is coupled to a second, different logical switch. However, both of the first and second logical switches are connected to each other through a logical router.

As such, the DCN-MFE 740 executes the three forwarding pipelines of all three L2 and L3 switches to determine that the destination DCN is connected to the second L2 logical switch. The DCN-MFE 740 then encapsulates the packet with tunneling information, in which, an IP address of the source DCN-MFE 740 is the source endpoint address of the tunnel and the IP address of the destination MFE or DCN-MFE that implements the second L2 switch is the destination endpoint address of the tunnel.

The second stage 710 shows that after the packet 780 is processed by the DCN-MFE 740, the packet is sent to the PNIC 720 to be sent to the destination PNIC which is connected to the destination MFE or DCN-MFE that implements the logical switch to which the destination DCN is connected. As shown in this stage, the packet is sent directly to the PNIC 720 without being processed by the hypervisor 725 or the MFE 770 that operates in the hypervisor 725. As described above, this is possible in the pass-through approach because the virtual machine 730 includes the PNIC driver of the PNIC 720 and as such can communicate with the PNIC 720 directly instead of sending the packet to the MFE to do so (as in emulation approach). The second stage also shows that the tunneling information 790 has been added to the packet (e.g., stored in the outer header of the packet) by the DCN-MFE.

Figure 8:
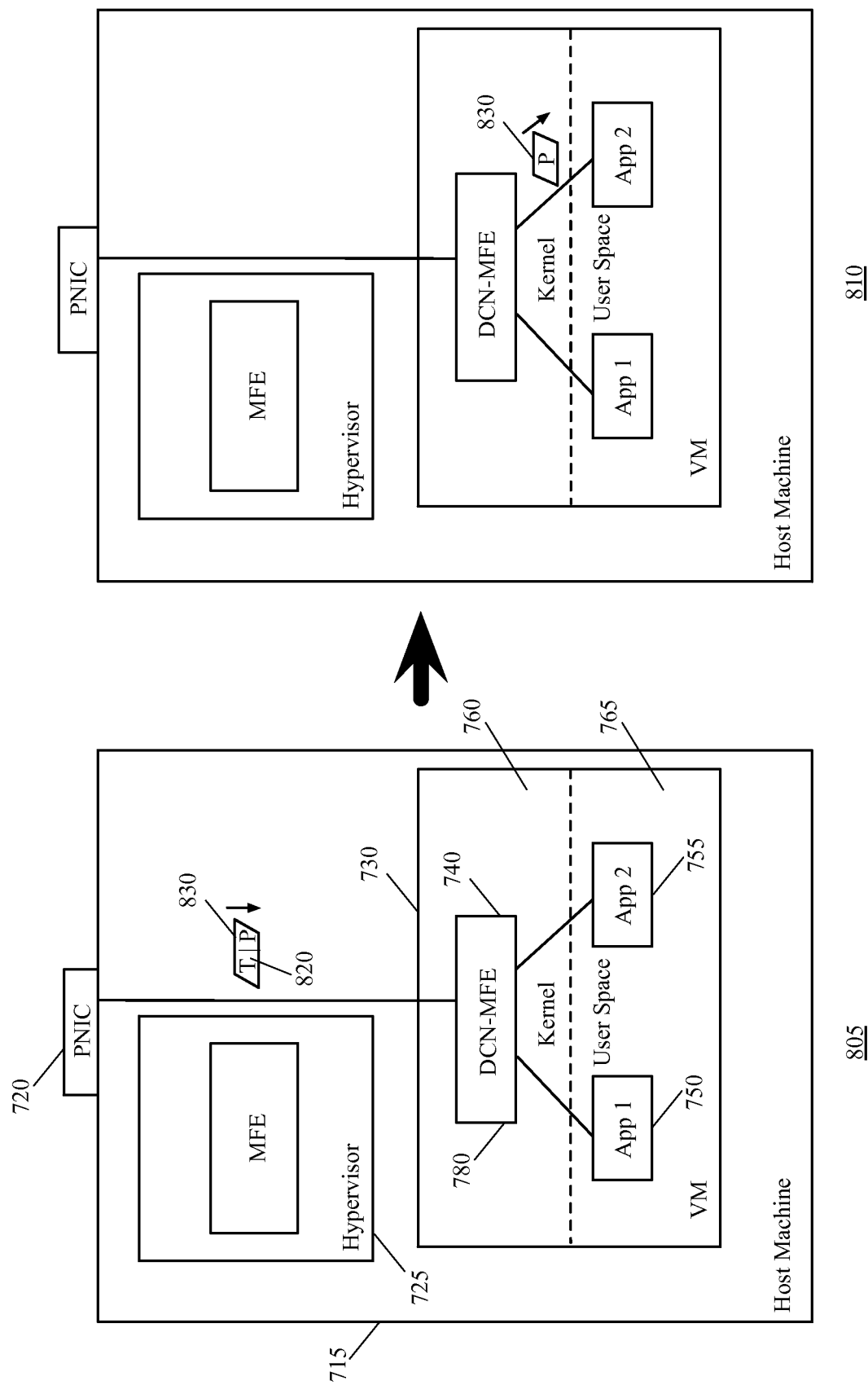
FIG. 8 illustrates another example of a DCN-MFE within a data compute node that receives a packet directly from a PNIC of a host machine that hosts the data compute node, and performs the necessary packet forwarding processing on the received packet.

FIG. 8 illustrates an example of a destination DCN-MFE within a data compute node that receives a packet directly from a PNIC of a host machine that hosts the data compute node, and performs the necessary packet forwarding processing on the received packet. Specifically, this figure shows, through two stages 805 and 810, how a DCN-MFE of a virtual machine (i) receives a packet originated from a source MFE or DCN-MFE that operates in a different host machine, (ii) performs packet forwarding processing on the received packet, and (iii) sends the packet to a destination application that runs on the same virtual machine on which the DCN-MFE runs.

Similar to the FIG. 7, this figure shows a host machine 715 that includes a PNIC 720 and a hypervisor 725. The host machine can be a physical server or any other computer that hosts one or more data compute nodes (e.g., virtual machines, physical machines, containers, etc.) for a tenant of a hosting system or a datacenter. The hos machine also hosts a virtual machine 730. The virtual machine 730 runs a DCN-MFE 740 in the kernel space 760 (e.g., in the network stack in the kernel) of the VM and two applications 750 and 755 in the user space of the VM.

In the first stage 805, the DCN-MFE 740 receives a packet 830 from the PNIC 720 of the host machine that is destined for one of the two applications 750 and 755 that run in the virtual machine 730. As shown in the first stage, the packet is received directly from the PNIC 720 without being processed by the hypervisor 725 or the MFE 770 that operates in the hypervisor 725. As described above, this is possible in the pass-through approach because the virtual machine 730 includes the PNIC driver of the PNIC 720 and as such can communicate with the PNIC 720 directly instead of having the PNIC send the packet to the MFE and receiving the packet from the MFE.

The first stage also shows that the packet is already encapsulated with the tunneling information 820 (e.g., stored in the outer header of the packet 830) by a source DCN-MFE that has performed the forwarding processing on the packet in a source machine (e.g., a source virtual machine). The tunneling information 820 shows that the DCN-MFE 740 is the destination endpoint of the tunnel (e.g., the destination IP address in the outer header of the packet has the tunnel endpoint IP address of the DCN-MFE 740). The tunneling information also includes other information such as the tunnel endpoint IP address of the source DCN-MFE that has received the packet from the source application.

In other words, when the source DCN-MFE has received the packet from the source application in the source machine, the source DCN-MFE has determined that the packet is destined for an application inside the VM 730 which belongs to the same logical network to which the source VM belongs and as such, has encapsulated the packet with the DCN-MFE 740 as the destination endpoint of the tunnel. The source DCN-MFE has done so by executing all the necessary forwarding pipelines of the logical forwarding elements (e.g., logical L2 and L3 switches) that logically connect the source and destination VMs to each other.

The second stage 810 shows that, after the encapsulated packet 830 is received from the PNIC 720 (e.g., based on the outer headers information of the packet 830), the destination DCN-MFE 740 decapsulates the packet (i.e., removes the tunneling information added to the packet by the source DCN-MFE) using the same tunnel protocol that has been used by the source DCN-MFE to encapsulate the packet. The destination DCN-MFE 740 then sends the packet 830 to the destination application 755 inside the VM 730. The destination DCN-MFE 740 sends the packet to the destination application based on the inner header destination information of the packet (e.g., the destination port address stored in the inner L4 header of the packet that is associated with the destination application 755).

Unlike the pass-through approach, the DCN-MFE of some embodiments sends the packets (e.g., through a virtual network interface controller (VNIC) of the DCN) to the hypervisor of the host machine in the emulation approach. That is, even though the forwarding processing of the network traffic is done by the DCN-MFE, the processed network traffic is still sent to the virtualization software rather than the PNIC of the host machine. In some such embodiments, the MFE operating in the virtualization software does not perform any additional forwarding processing on the outgoing packets and merely hands the received packets to the PNIC of the host machine. In some embodiments, however, the MFE operating in the virtualization software of the host machine performs packet forwarding processing for the incoming network traffic that is destined for a DCN-MFE of a DCN operating on the host machine. In other words, in some embodiments, the outgoing traffic is processed by the DCN-MFEs of the DCNs executing on a host machine, while the incoming traffic is processed by the MFE operating in the virtualization software of the host machine.

The reason for having the DCN-MFE process the outgoing traffic and the hypervisor's MFE process the incoming traffic is that some embodiments have the forwarding element that is closer to the source of the packets perform the packet processing in order to increase the network traffic efficiency. For example, during the processing of a packet, when the first forwarding element on the path of a packet determines that the packet should be dropped (based on a network policy), the first forwarding element drops the packet and does not send the packet to the second forwarding element on the path to make such a determination. As such, extra network resources are not deployed to continue on forwarding the packet towards a destination while the packet is not supposed to reach the destination.

Figure 9:
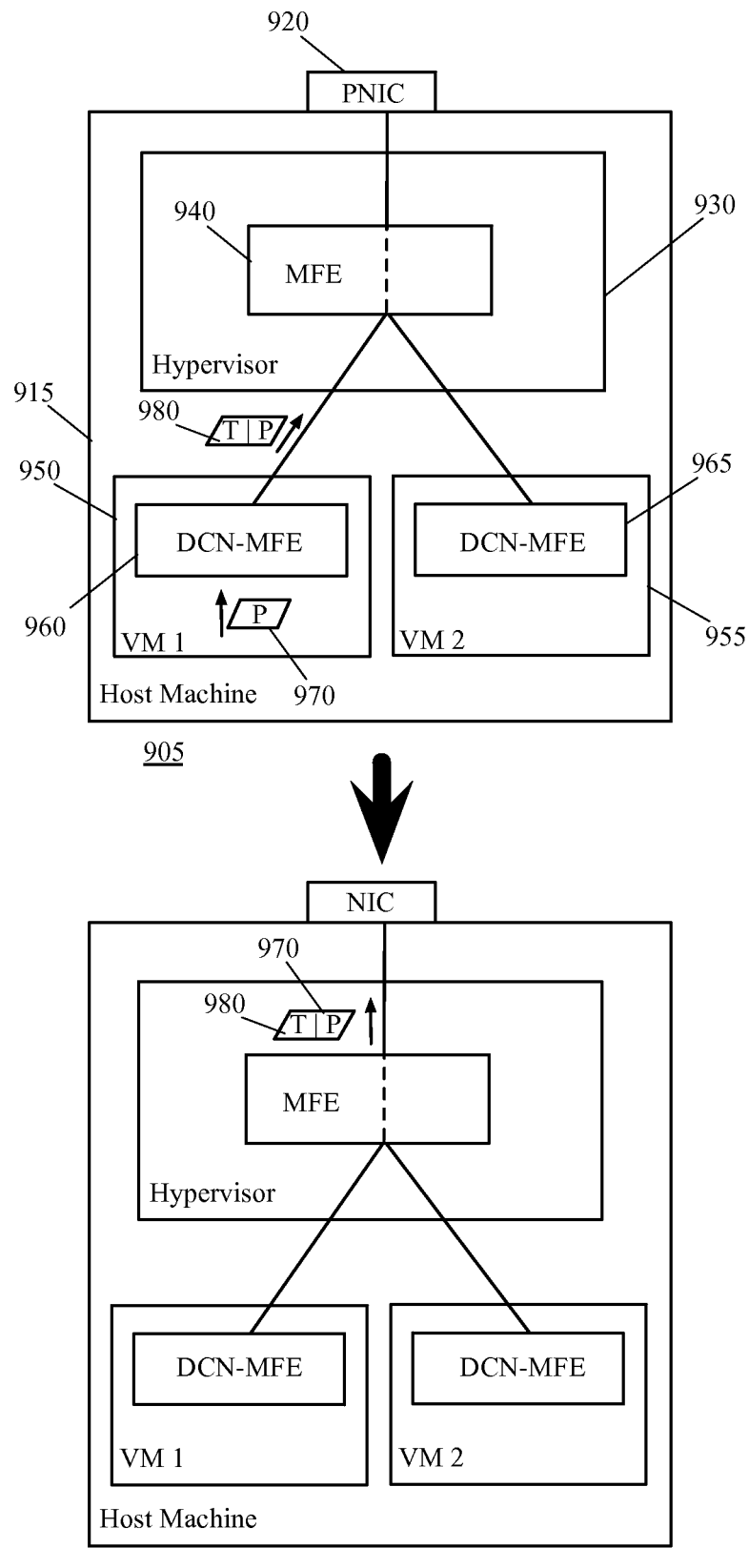
FIG. 9 illustrates an MFE residing in the virtualization software of a host machine that handles the outgoing traffic in the emulation approach.
Figure 10:
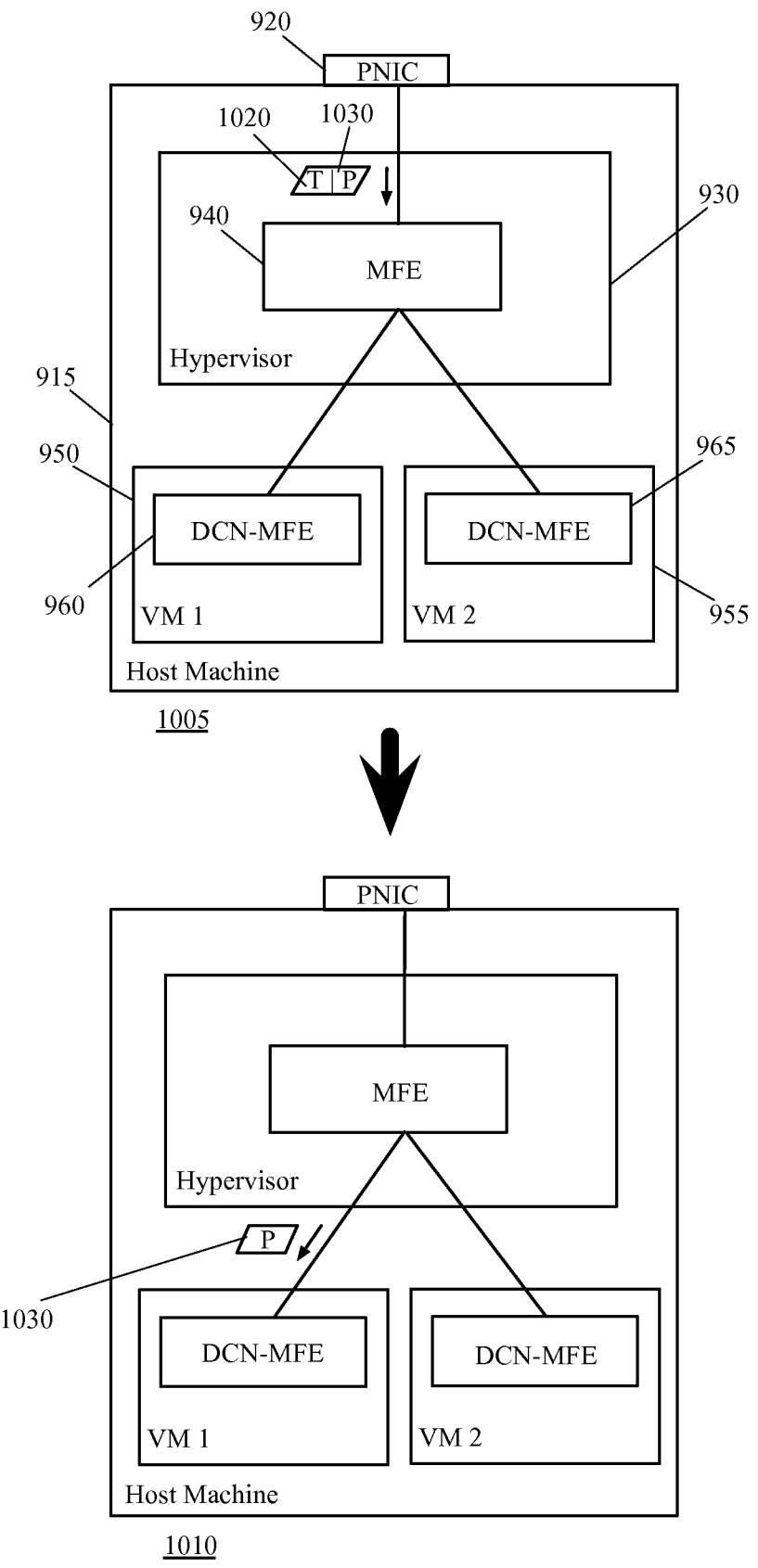
FIG. 10 illustrates an MFE residing in the virtualization software of a host machine that handles the incoming traffic in the emulation approach.

FIGS. 9 and 10 illustrate how the MFE of a virtualization software executing in a host machine handles the incoming and outgoing traffic in the emulation approach. More specifically, FIG. 9 illustrates an MFE residing in the hypervisor of a host machine handling the outgoing traffic in the emulation approach. More specifically, this figure shows, through two stages 905 and 910, how the MFE that operates in the hypervisor of a host machine receives a packet from a source VM and without performing any additional forwarding processing, delivers the packet to the PNIC of the host machine.

As described before, the reason for a DCN-MFE to choose emulation approach over the pass-through approach (i.e., to send the network traffic to the PNIC through the MFE of the hypervisor instead of sending the packets directly to the PNIC) could be different in different embodiments. For example when a DCN does not include the necessary PNIC driver, or the PNIC driver running on the DCN is corrupt, the DCN uses the emulation approach to forward the packets through the MFE running in the hypervisor. Alternatively, the DCN-MFEs might be configured (by the management control plane) in such a way to exchange packets of a particular type (e.g., belonging to a particular data flow, generated by a particular source application, etc.) only through the MFEs that run on the hypervisors of their respective host machines.

FIG. 9 shows a host machine 915 that includes a PNIC 920 and a hypervisor 930. The hypervisor 930 executes a managed forwarding element 940 which performs different network functionalities for the virtual machines executing in the host machine. In the shown figure, the host machine 915 hosts two virtual machines 950 and 955. The virtual machine 950 runs a DCN-MFE 960 (e.g., in the kernel of the virtual machine VM1). The virtual machine 955 runs a DCN-MFE 965 (e.g., in the kernel of the virtual machine VM2). Each of these virtual machines also executes several different applications (not shown) in the user space of the virtual machine.

In the first stage 905, a source application in the virtual machine 950 has generated a packet 970 to be sent to a destination application executing in a destination data compute node that operates on a different host machine (not shown). Since the DCN-MFE 960 executes all of the forwarding pipelines of the network to which the VM 950 is connected, all of the applications that run in this virtual machine, including the source application of the packet 970, send and receive their corresponding network traffic to and from the DCN-MFE 960.

Therefore, the source application sends the packet 970 (e.g., through a communication channel instantiated in the virtual machine for such communications) to the DCN-MFE 960. When the DCN-MFE 960 receives the packet, the DCN-MFE determines whether the packet is destined for a DCN that is connected to the same logical network to which the VM 960 is connected or it is destined for a different logical and/or physical network.

In some embodiments, if the packet is determined to belong to a different network (e.g., based on destination information in different header of the packet), the DCN-MFE 960 forwards the packet to the MFE 940 that operates in the hypervisor of the host machine for further forwarding processing of the packet. That is, since the MFE 940 implements all the logical forwarding elements of the different logical networks, even if the packet is destined for a different logical or physical network, the MFE will have the necessary forwarding pipeline to determine the next destination of the packet.

It should be understood that sending the packet to an MFE to perform forwarding processing on the packet in this manner is not the same as processing the packet inside the virtual machine and using the MFE merely as an intermediary to pass the packet to the PNIC (as shown in this figure). In other words, when the DCN-MFE of some embodiments determines that the destination of a packet belongs to a different network, the DCN-MFE hands the packet to the MFE to perform the whole forwarding processing on the packet. This is different than the emulation approach shown in this figure, in which the DCN-MFE performs all the necessary forwarding processing on the packet and then merely passes the packet to the MFE to be handed to the PNIC without any further forwarding processing.

When the DCN-MFE 960 determines that the packet is destined for another data compute node that belongs to the same logical network but on a different host machine, the DCN-MFE executes all the necessary forwarding pipelines to determine which other managed forwarding element (i.e., other MFE or DCN-MFE) implements the logical switch to which the destination data compute node couples. As an example, the source DCN-MFE could be coupled to a first L2 logical switch, while the destination DCN-MFE is coupled to a second, different logical switch. However, both of the first and second logical switches are connected to each other through a logical router.

As such, the DCN-MFE 960 executes the three forwarding pipelines of all three L2 and L3 switches to determine that the destination DCN is connected to the second L2 logical switch. The DCN-MFE 960 then encapsulates the packet with tunneling information, in which, an IP address of the source DCN-MFE 960 is the source tunnel endpoint address and the IP address of the destination MFE or DCN-MFE that implements the second logical L2 switch is the destination endpoint address of the tunnel.

The first stage 905 also shows that after the packet 970 is processed by the DCN-MFE 960, the packet is sent to the MFE 940 operating in the hypervisor 930 to be sent to the source PNIC 920. Additionally, the first stage shows that the tunneling information 980 has been added to the packet 970 (e.g., stored in the outer header of the packet) by the DCN-MFE 960 before sending the packet to the MFE 940.

The second stage 910 shows that the same packet 970 with the same tunneling information 980 is transmitted from the MFE 940 towards the PNIC 920. That is, even though the MFE 940 is primarily for performing network functionalities on the network traffic data, in this particular case, the MFE 940 only plays the role of a messenger that receives the packet from the DCN-MFE 960 and delivers the packet to the PNIC 920. This is because, the DCN-MFE 960 has already performed all of the required forwarding processing and even encapsulated the packet with the tunnel endpoint addresses.

FIG. 10 illustrates an MFE residing in the virtualization software of a host machine that handles the incoming traffic in the emulation approach. Specifically, this figure shows, through two stages 1005 and 1010, how an MFE operating in the hypervisor of a host machine (i) receives a packet originated from a source DCN-MFE that operates in a different host machine, (ii) performs packet forwarding processing on the received packet, and (iii) sends the packet to a destination DCN-MFE in the emulation approach.

As described above, in some embodiments, the MFE operating in the virtualization software of the host machine performs packet forwarding processing for the incoming network traffic that is destined for a DCN-MFE of a DCN operating on the host machine. The reason for having the DCN-MFE process the outgoing traffic and the hypervisor's MFE process the incoming traffic is that some embodiments have the forwarding element that is closer to the source of the packets perform the packet processing in order to increase the network traffic efficiency.

Similar to the FIG. 9, this figure shows a host machine 915 that includes a PNIC 920 and a hypervisor 930. The hypervisor 930 executes a managed forwarding element 940 which performs different network functionalities for the virtual machines executing in the host machine. In the shown figure, the host machine 915 hosts two virtual machines 950 and 955. The virtual machine 950 runs a DCN-MFE 960 (e.g., in the kernel of the virtual machine VM1). The virtual machine 955 runs a DCN-MFE 965 (e.g., in the kernel of the virtual machine VM2). Each of these virtual machines also executes several different applications (not shown) in the user space of the virtual machine.

In the first stage 1005, the MFE 940 receives a packet 1030 from the PNIC 920 of the host machine that is destined for one of the two virtual machines 950 and 955 that run in the host machine 915. This stage also shows that the packet is encapsulated with the tunneling information 1020 (e.g., stored in the outer header of the packet 1030) by a source DCN-MFE that has performed the forwarding processing on the packet in a source machine (e.g., a source virtual machine). The tunneling information 1020 shows that the MFE 940 is the destination endpoint of the tunnel (e.g., the destination IP address in the outer header of the packet has the tunnel endpoint IP address of the MFE 940). The tunneling information also includes other information such as the tunnel endpoint IP address of the source DCN-MFE that has received the packet from the source application (in a different host machine).

In other words, when the source DCN-MFE has received the packet from the source application in the source machine, the source DCN-MFE has determined that the packet is destined for a virtual machine executing in the host machine 915. Since the source DCN-MFE uses the emulation approach, the source DCN-MFE has encapsulated the packet with the MFE 940 as the destination endpoint of the tunnel instead of the DCN-MFE 965. The source DCN-MFE has done so by executing all the necessary forwarding pipelines of logical forwarding elements (e.g., logical L2 and L3 switches) that logically connect the source and destination VMs to each other.

The second stage 1010 shows that, after the encapsulated packet 1030 is received from the PNIC 920 (e.g., based on the outer headers information of the packet 1030), the destination MFE 940 decapsulates the packet (i.e., removes the tunneling information added to the packet by the source DCN-MFE) using the same tunnel protocol that has been used by the source DCN-MFE to encapsulate the packet. The destination MFE 940 then sends the packet 1030 to the destination DCN-MFE 960 (e.g., based on the destination MAC address in the inner L2 header of the packet).

The destination DCN-MFE 960, subsequently, sends the packet 1030 to a destination application (not shown) running inside the VM 950. The destination DCN-MFE 960 sends the packet to the destination application based on the inner header destination information of the packet (e.g., the destination port address stored in the inner L4 header of the packet that is associated with the destination application).

In the pass-through approach of some embodiments, the DCN-MFE of the source DCN uses the virtualization software of the host machine to transmit the packet to a destination DCN after the source DCN-MFE realizes that the destination DCN operates on the same host machine as the source DCN. That is, when both of the source and destination DCNs operate on the same host machine, the source DCN-MFE offloads the packets destined for the destination DCN on a memory space of the host machine that is controlled by the virtualization software (e.g., hypervisor) and that is shared with the destination DCN. After storing the packets on the shared memory space, the source DCN-MFE notifies the hypervisor of the offload. In some embodiments, after receiving the offload notification, the hypervisor notifies the destination DCN-MFE about the new network traffic (e.g., data packets) that is stored in the shared memory space. The destination DCN-MFE of some such embodiments reads the packets from the shared memory space upon receiving the notification from the hypervisor.

In some embodiments, the shared memory space includes one or more particular physical pages of a host machine's physical memory that the hypervisor of the host machine assigns as a shared memory space for the DCNs operating on the host machine. In some such embodiments, the hypervisor of the host machine assigns the physical page(s) as shared memory space between the DCNs by mapping the physical page(s) to one or more particular physical pages in each DCN that shares the memory space. In this manner, the same physical pages of the host machine's memory become available to two or more DCNs operating on the host machine for writing to and reading from these shared physical pages.

Figure 11:
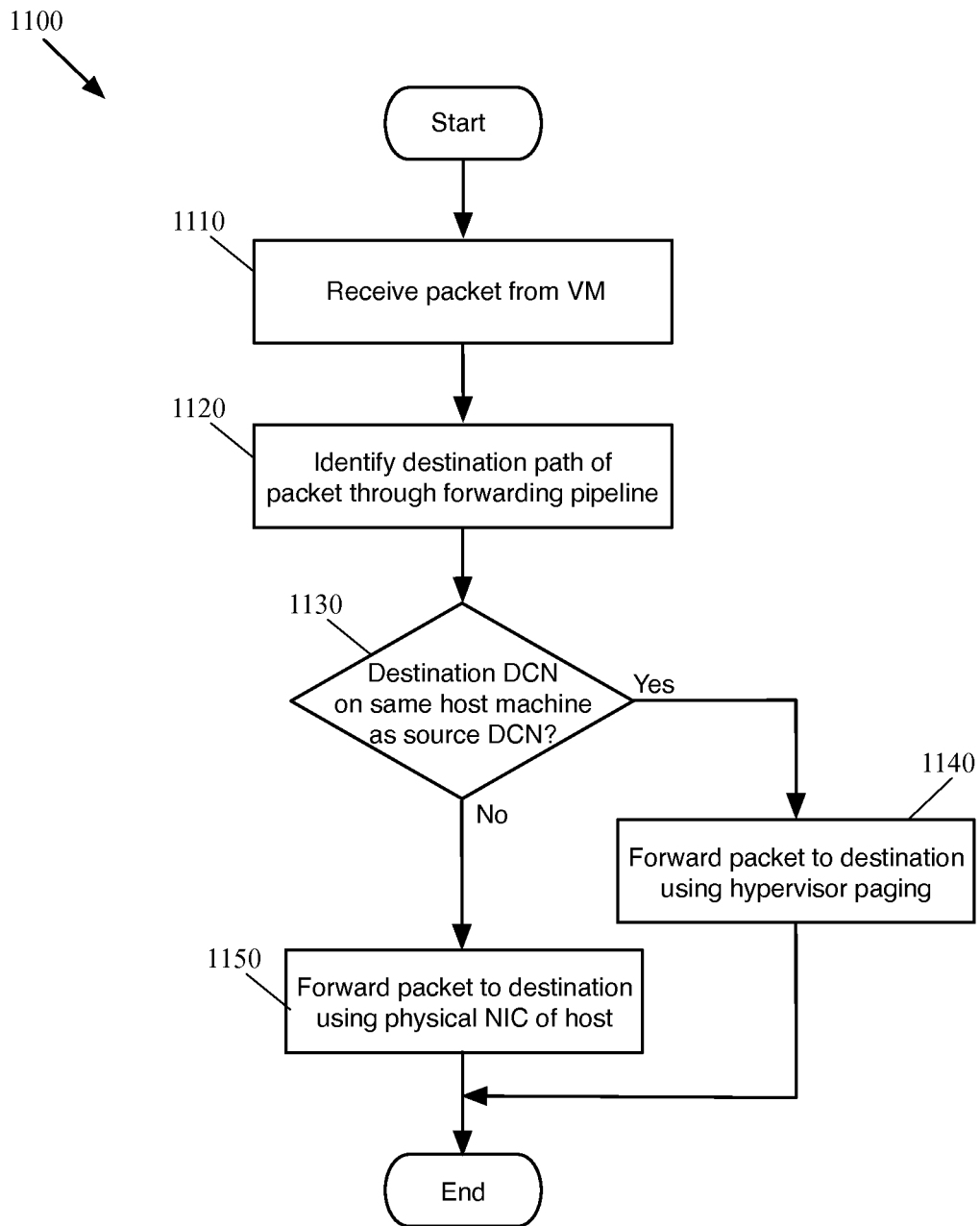
FIG. 11 conceptually illustrates a process of some embodiments for employing the virtualization software of a host machine in order to exchange network data between two data compute nodes of the same host machine in the pass-through approach.

FIG. 11 conceptually illustrates a process 1100 of some embodiments for employing the virtualization software (e.g., hypervisor) of a host machine in order to exchange network data between two data compute nodes of the host machine in the pass-through approach. In some embodiments, process 1100 is performed by a source DCN-MFE that runs inside a source data compute node (i.e., a DCN that contains the source application that generates the packets) operating on the host machine. The process 1100 will be described by reference to FIG. 12, which provides an example for two different ways of forwarding data from a source DCN-MFE based on the destination DCN-MFE being on the same host machine or a different host machine.

As shown in FIG. 11, the process 1100 begins by receiving (at 1110) a packet from one of the applications that execute in the virtual machine that runs the DCN-MFE. As described above, since the DCN-MFE is the forwarding element that performs the different network functionalities for the network to which the virtual machine is connected, all of the guest applications that run on the virtual machine exchange their incoming and/or outgoing packets with the DCN-MFE.

After receiving the packet (from a source application), the process identifies (at 1120) the destination path of the packet (e.g., to which logical switch the destination DCN is connected) by executing the necessary forwarding pipelines for the packet. For example, if the source and destination DCNs are connected to a particular L2 logical switch, the process determines whether the particular L2 switch is implemented by a DCN-MFE that operates on the same host machine, or by a DCN-MFE that operates on a different host machine.

The process of some embodiments makes such a determination based on the source and destination data that is extracted from the different packet headers (e.g., source and destination addresses extracted form the L2 and L3 packet headers), and comparing this data with the forwarding data the process receives from the CCP cluster (e.g., from the local controller operating on the host machine).

On the other hand, when the source DCN-MFE is coupled to a first L2 logical switch and the destination DCN-MFE is coupled to a second, different logical switch, but the first and second logical switches are connected to each other through a logical router, the process runs the forwarding pipeline of all three LFEs. The process can then determine whether the second logical L2 switch is implemented by a DCN-MFE that operates on the same host machine (i.e., on a DCN that is hosted by the same host machine) or not.

Based on the identification of the destination path, the process determines (at 1130) whether the destination DCN is on the same host machine or not. When the process determines that the source and destination DCNs are not on the same host machine, the process forwards (at 1140) the received packet to either the PNIC or the MFE running in the hypervisor of the host machine. That is, depending on whether the process uses the emulation approach or the pass-through approach, the packet could be sent to the MFE or the PNIC of the host machine, respectively. The process then ends.

Figure 12:
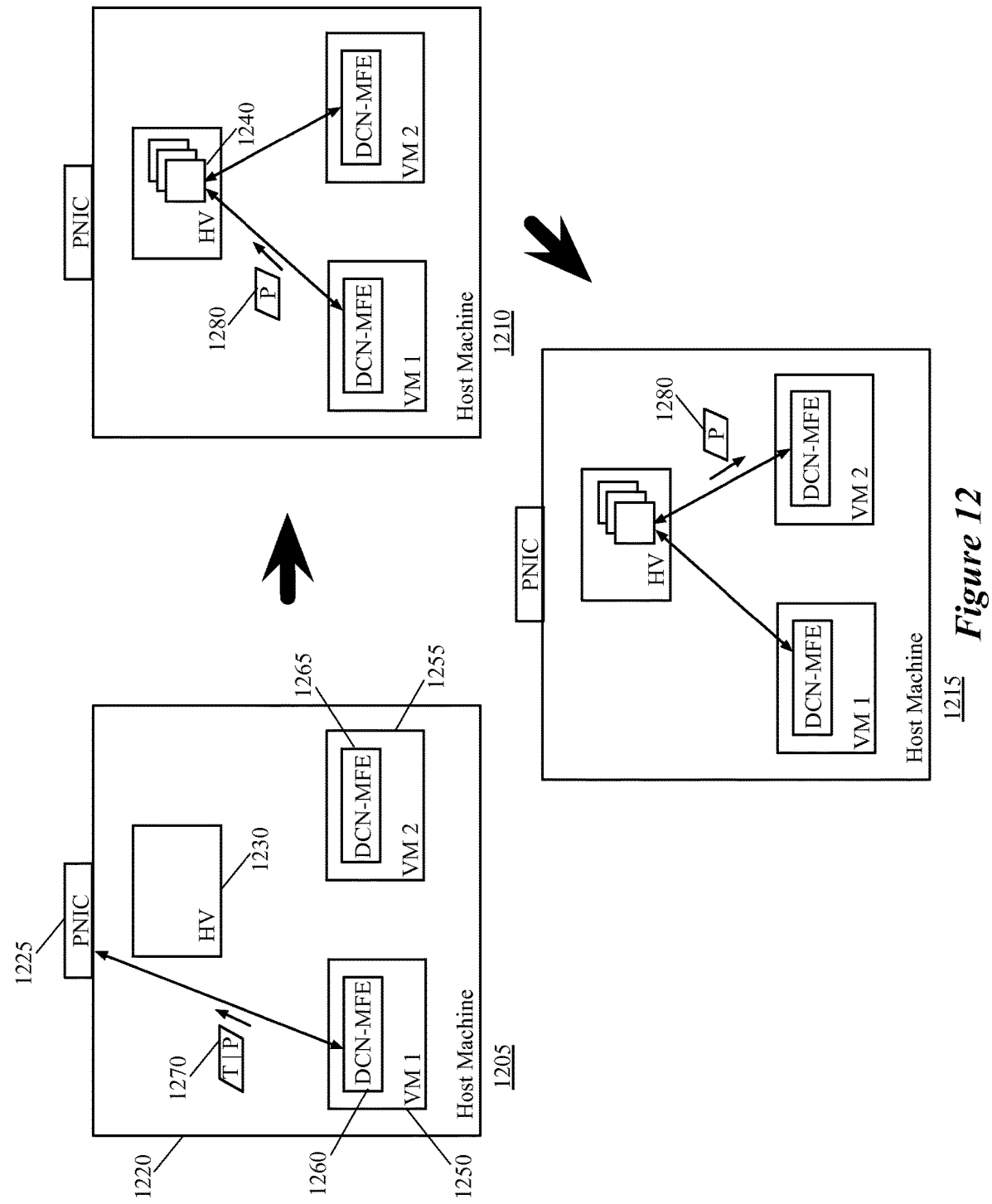
FIG. 12 illustrates two different ways of forwarding data from a source DCN-MFE based on the destination DCN-MFE being on the same host machine or a different host machine.

FIG. 12 shows, through three different stages 1205-1215, a source DCN-MFE sending a first packet to the PNIC of the host machine and a second packet to the hypervisor of the host machine. This figure includes a host machine 1220 that includes a PNIC 1225 and a hypervisor 1230. The host machine 1220 hosts two virtual machines 1250 and 1255. The virtual machine 1250 runs a DCN-MFE 1260 (e.g., in the kernel of the virtual machine VM1). The virtual machine 1255 runs a DCN-MFE 1265 (e.g., in the kernel of the virtual machine VM2). Each of these virtual machines also executes several different applications (not shown) in the user space of the virtual machine.

In the first stage 1205, a source application in the virtual machine 1250 has generated a packet to be sent to a destination application executing in a destination data compute node that operates on a different host machine (not shown). The source application sends the packet (e.g., through a communication channel instantiated in the virtual machine for such communications) to the DCN-MFE 1260. When the DCN-MFE 1260 receives the packet, the DCN-MFE determines whether the packet is destined for an end machine in the same logical network to which the VM 1250 is connected or it is destined for a different logical and/or physical network.

When the DCN-MFE 1260 determines that the packet is destined for another data compute node that belongs to the same logical network but on a different host machine, the DCN-MFE executes all the necessary forwarding pipelines to determine which other managed forwarding element (i.e., other MFE or DCN-MFE) implements the logical switch to which the destination data compute node couples. That is, the DCN-MFE 1260 extracts data that is stored in the different packet headers and compares the extracted data with the forwarding data that the packet receives from the control plane. By comparing the data, the DCN-MFE 1260 identifies that another MFE or DCN-MFE that operates on another host machine implements the logical switch to which the destination DCN is connected. As such, the DCN-MFE 1260 encapsulates the packet with the necessary tunneling information (e.g., destination tunnel endpoint address) and forwards the processed packet 1270 to the PNIC 1225.

Returning to FIG. 11, when the process 1100 determines (at 1130) that the source and destination DCNs are on the same host machine, the process forwards (at 1150) the received packet to the hypervisor running in the host machine that hosts the source DCN. In some embodiments, as will be described below, the process stores the packet in a shared memory space of the host machine that the hypervisor controls (e.g., in a physical page of the source VM that is mapped to a physical page of the host machine). The destination DCN is then notified about the arrival of the new packet in the shared memory space and the control of the shared memory space is passed from the source DCN to the destination DCN. The destination DCN, upon receiving the notification, reads the new packet from the shared memory space (e.g., from a physical page of the destination VM that is mapped to the same physical page of the host machine). The process then ends.

The second stage 1210 of FIG. 12 shows that the DCN-MFE 1260 has processed a second packet 1280 and identified the destination DCN of the packet to be on the same host machine as the source DCN. As such, the DCN-MFE 1260 simply stores the packet on a shared memory space 1240 and does not encapsulate the packet with any tunneling information. That is, the DCN-MFE 1260 writes the packet on a guest physical page that is defined for the host DCN and that is mapped to a host physical page controlled by the hypervisor of the host machine.

The third stage 1215 shows that the destination DCN-MFE 1265 has been notified of the arrival of the new packet 1280 on the shared memory space and as such, the destination DCN-MFE 1265 reads the packet 1280 from the shared memory space 1240. After the destination DCN-MFE 1265 receives the packet, the destination DCN-MFE forwards the packet to the destination application based on the information in the destination packet headers (e.g., the destination port address in the L4 packet header).

Figure 13:
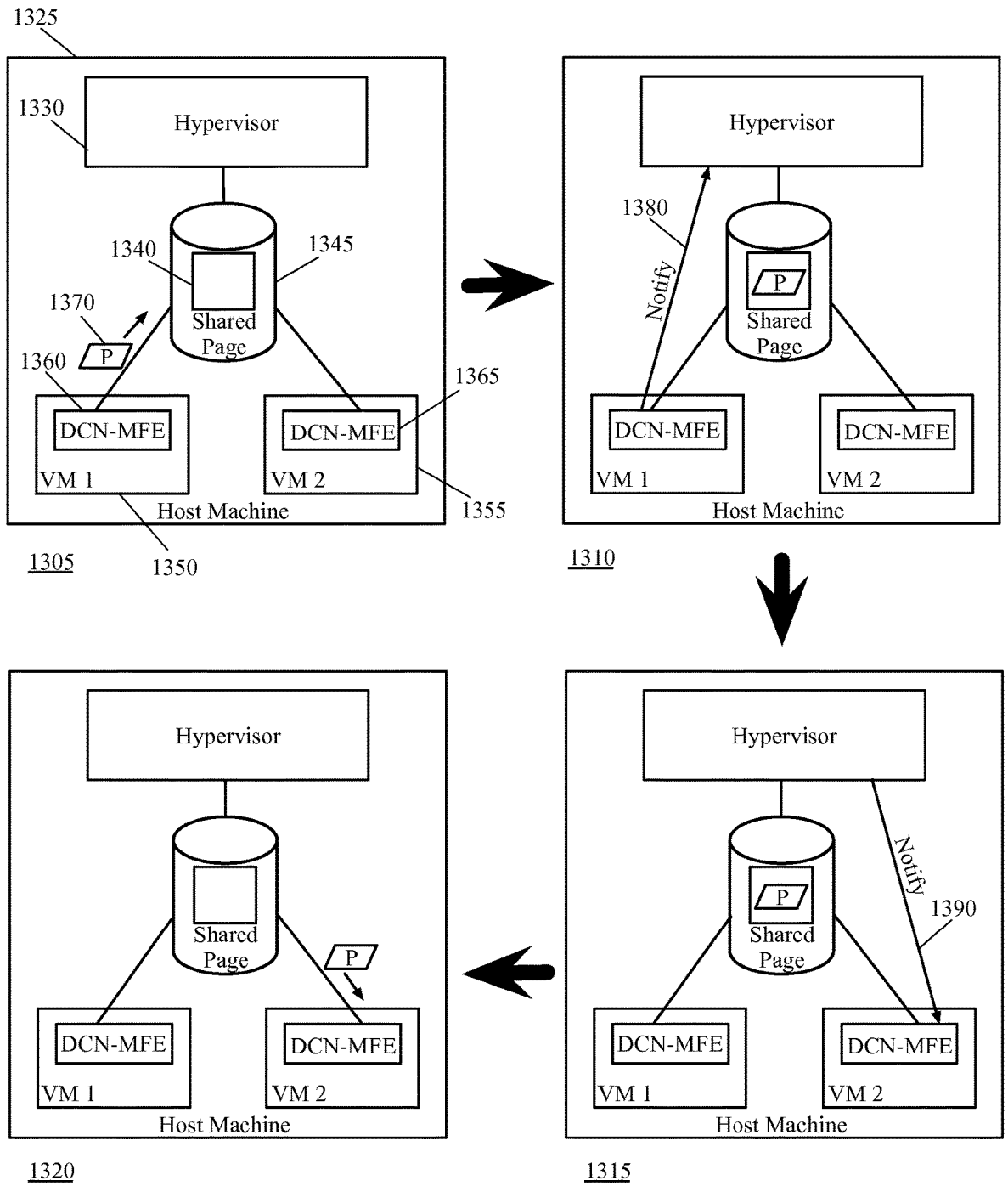
FIG. 13 illustrates a more detailed example of exchanging network data between a source DCN-MFE and a destination DCN-MFE in a pass-through approach, when the virtual machines containing the source and destination DCN-MFEs operate on the same host machine.

FIG. 13 illustrates a more detailed example of exchanging network data between a source DCN-MFE and a destination DCN-MFE in a pass-through approach, when the virtual machines containing the source and destination DCN-MFEs operate on the same host machine. This figure shows, through four different stages 1305-1320, a source DCN-MFE storing a packet in a shared memory space of a hypervisor of the host machine for a destination DCN-MFE to read the packet from the memory space.

FIG. 13 includes a host machine 1325 that includes a hypervisor 1330 and a physical memory 1345. The host machine 1325 hosts two virtual machines 1350 and 1355. The virtual machine 1350 runs a DCN-MFE 1360 (e.g., in the kernel of the virtual machine VM1). The virtual machine 1355 runs a DCN-MFE 1365 (e.g., in the kernel of the virtual machine VM2). Each of these virtual machines also executes several different applications (not shown) in the user space of the virtual machine. The physical memory 1345 includes a particular memory space (physical page) 1340 that the hypervisor of some embodiments assigns as a shared memory space for the virtual machines operating on the host machine by mapping this physical page 1340 to a particular physical page in each virtual machine (not shown).

The first stage 1305 shows that the DCN-MFE 1360 has processed a packet 1370 and identified that the destination DCN of the packet is on the same host machine as the source DCN. As described above, the DCN-MFE 1360 of some embodiments performs the forwarding processing on the packet 1370 by extracting the source and destination information in different layer headers (e.g., L2 header, L3 header, etc.) of the packet and comparing the extracted information with the forwarding information the DCN-MFE 1360 receives from one or more central controllers of the CCP cluster.

The DCN-MFE 1360, after performing the forwarding processing on the packet, determines whether the logical switch port, to which the destination DCN is connected is implemented by a destination DCN-MFE in the same host machine or a different host machine. For example, when both of the VM1 and VM2 shown in this figure are connected to the same logical L2 switch, by performing the forwarding processing, the DCN-MFE 1360 identifies the logical port of the logical L2 switch, to which the destination VM2 is connected (e.g., by looking at the destination MAC address in the destination L2 header of the packet).

Furthermore, when the DCN-MFE 1360 performs the forwarding pipeline of the logical L2 switch, based on the forwarding tables configured in the DCN-MFE 1360 (by the control plane), the DCN-MFE 1360 realizes that the DCN-MFE 1365 is the forwarding element that implements the port of the logical L2 switch that is connected to the destination VM 1355. Therefore, the source DCN-MFE 1360 does not use the direct communication channel to the PNIC of the host machine and instead, uses the shared memory space with the destination DCN-MFE 1365 to send the packet to this destination DCN-MFE.

Because the source and destination DCNs operate on the same host machine, the DCN-MFE 1360 identifies a memory space that the source DCN-MFE 1360 and the destination DCN-MFE 1365 share for reading and writing the packets exchanged between the two forwarding elements. Although the first stage 1305 shows that the packet 1370 is being sent from the DCN 1350 to the physical memory 1345, in reality, the source DCN-MFE 1360 writes the packet in a particular virtual page of the DCN 1350. In some embodiments, this particular virtual page is mapped to a particular physical page of the guest machine (i.e., the VM 1350) by the guest operating system, while the particular physical page of the guest machine is mapped to a shared physical page of the host machine by the hypervisor 1330. Therefore, when the DCN-MFE 1360 writes the packet in the particular virtual page, the packet is written in the physical page 1340 of the host machine's physical memory 1345, which is shared with the destination VM 1355. That is, the destination VM 1355 also has a virtual page in its memory that is mapped (in the same manner described above) to the shared physical memory 1340.

The second stage 1310 shows that, after writing the packet in the shared memory space, the source DCN-MFE 1360 sends a notification 1380 to the hypervisor 1330, informing the hypervisor that a new packet is available in the shared memory. In some embodiments, the notification message sent to the hypervisor also informs the hypervisor that the new packet should be read by the destination DCN-MFE 1365 and not any other DCN that shares the same memory space. In some other embodiments, the memory space is only shared between these two particular DCNs and as such, the notification message only notifies the hypervisor of the arrival of new packet. Additionally, although the illustrated example shows that the source DCN-MFE notifies the hypervisor after writing only one packet in the physical page, it should be understood that in some embodiments, such notification is sent to the hypervisor after a particular number of packets are stored in the shared memory space. The second stage also shows that the packet 1370 is now stored in the physical page 1340 of the physical memory 1345 of the host machine 1325.

In some embodiments, the shared page of the host machine's physical memory is accessible, at any particular time, by only one DCN. That is, when the hypervisor passes the control of the shared memory page from the source DCN to the destination DCN (e.g., to read from the page), the shared page is no longer accessible by the source DCN. There could be different reasons for not allowing two DCNs to have control over a same memory page, e.g., to avoid concurrent transaction on the same page, to avoid spread of an attack from a source DCN to a destination DCN, etc.

In some embodiments, when the hypervisor is notified of the arrival of new network traffic (i.e., one or more new packets) in the shared memory space, the hypervisor notifies the destination DCN-MFE to read the new network traffic from the shared memory. The third stage 1315 shows such a notification. Specifically, this stage shows that the hypervisor sends a notification 1390 to the DCN-MFE 1365, informing this forwarding element that a new packet 1370 is stored in the shared physical page 1340. In some embodiments, this notification is sent to the destination DCN-MFE 1365 each time the hypervisor is notified of the arrival of new traffic by the source DCN-MFE 1360. In some other embodiments, the hypervisor notifies the destination DCN-MFE 1365 when the hypervisor receives a particular number of notifications from the source DCN-MFE 1360. Yet, in some other embodiments, the hypervisor notifies the destination DCN-MFE 1365, when a particular number of packets are stored in the shared physical page 1340.

The fourth stage 1320 shows that the destination DCN-MFE 1365 reads the new packet 1370 from the shared memory space after the destination DCN-MFE 1365 is notified by the hypervisor 1330. Even though the fourth stage shows that the packet 1370 is being sent from the physical memory 1345 to the destination DCN-MFE 1365, in reality, the destination DCN-MFE 1365 reads the packet from a particular virtual page of the DCN 1355. In some embodiments, this particular virtual page is mapped to a particular physical page of the guest machine (i.e., the VM 1355) by the guest operating system, while the particular physical page of the guest machine is mapped to the shared physical page of the host machine by the hypervisor 1330. Therefore, when the DCN-MFE 1365 reads the packet from the particular virtual page, the packet is in fact read from the physical page 1340 of the host machine's physical memory 1345, which is shared with the destination VM 1355.

In some embodiments, each time the destination DCN-MFE reads from the shared memory (i.e., one or more physical pages of the physical memory of the host machine), the destination DCN-MFE removes the network traffic that is read from the memory. Some embodiments free the shared physical pages from network traffic when a particular number of times a destination DCN-MFE reads from these shared physical pages. Yet, in some other embodiments, the shared memory is cleaned up periodically. That is, the hypervisor deletes the packets from the shared memory spaces after a certain period of time lapses.

II. Securing a DCN-MFE within a DCN

Since the DCN-MFE of some embodiments is instantiated (and operates) in a DCN (e.g., as one of the drivers of the DCN), the DCN-MFE is more vulnerable to malicious attacks in comparison with an MFE that is instantiated (and operates) in a hypervisor of a host machine. This is because, although the DCN-MFE is instantiated in the kernel of a guest operating system (e.g., in the network stack of the kernel), in some embodiments, the DCN-MFE is still exposed to other applications and processes that run by the guest operating system. In contrary, an MFE that operates in the hypervisor of a host machine is solely controlled by the central control plane (i.e., the CCP cluster) of the hosting system and is not exposed to any outside applications and/or processes.

In order to protect the DCN-MFE from malicious attacks, some embodiments mark the pages that contain the code and data of the DCN-MFE (e.g., the memory space of the host machine on which the DCN-MFE's code and data are loaded) as read-only to the guest operating system. Some such embodiments only allow the hypervisor to write on the pages that are marked as read-only for the guest operating system. Although this approach protects the DCN-MFE from being modified by the guest operating system, a malicious module may still attack the DCN-MFE by loading onto the guest kernel and simulating the functionalities of the DCN-MFE. That is, a malicious module loads onto the guest kernel and communicates with the VNIC (of the DCN) or the PNIC (of the host machine) in the same way that the DCN-MFE does, hence exposing these interfaces to malicious attacks.

In addition to marking the memory as read-only memory, some embodiments check one or more particular data structures of the guest kernel (e.g., in the same manner as antivirus programs do) to ensure that the DCN-MFE is the only module that communicates with the PNIC and/or VNIC through a communication channel. Some such embodiments check the particular one or more data structures periodically, while other embodiments check the particular data structures when a certain number of packets are received at the PNIC and/or VNIC. Marking the memory pages of the kernel that store the code and data of the DCN-MFE, however, is not enough to protect the DCN-MFE from kernel-level attacks or malicious programs, such as rootkits (e.g., a malicious software that masks itself as being the DCN-MFE). The possible rootkit attacks include attempts to unload the DCN-MFE instance from the kernel of the DCN or prevent the DCN-MFE instance from loading. A rootkit attack may also include tampering with the DCN-MFE code or data that are on physical memory (e.g., of the virtual or host machine) and tampering with the communication channels of the DCN-MFE instance with other network elements such as the hypervisor and/or PNIC of the host machine.

Some embodiments protect the DCN-MFE from such malicious attacks by separating the memory space (e.g., in the host machine's physical memory) in which the code and data of the DCN-MFE are loaded (guest secure domain) from the memory space in which other applications and processes of the DCN are loaded (guest general domain). In some embodiments, the other applications and processes that are stored in the guest general memory space include the guest user space applications as well as the processes and drivers that are loaded in the guest kernel. Some embodiments store additional data and modules in the guest secure domain, in which the DCN-MFE is loaded, in order for the two guest domains to be able to communicate with each other in a secure manner. These additional data and module that are stored in the guest secure domain are described below by reference to FIG. 15.

Conventionally, when a data compute node is loaded in a host machine (e.g., into the host machine's physical memory), the hypervisor of the host machine creates and uses a set of nested page tables (NPTs) to map the guest physical memory space of the DCN to a portion (i.e., a set of pages) of the host physical memory space. In order to separate the guest secure domain from the guest general domain, the hypervisor of some embodiments creates two sets of NPTs for each DCN that is loaded in the host machine (i.e., that starts operating on the host machine). In some such embodiments, the hypervisor creates a first set of NPTs (also referred to as secure NPTs) and a second set of NPTS (also referred to as general NPTs). The secure NPTs include a set of tables that maps the guest physical memory addresses that contain the DCN-MFE (code and data) to the guest secure domain. Similarly, the general NPTs include a set of tables that maps the guest physical memory addresses that contain other applications and processes to the guest general domain.

Figure 14:
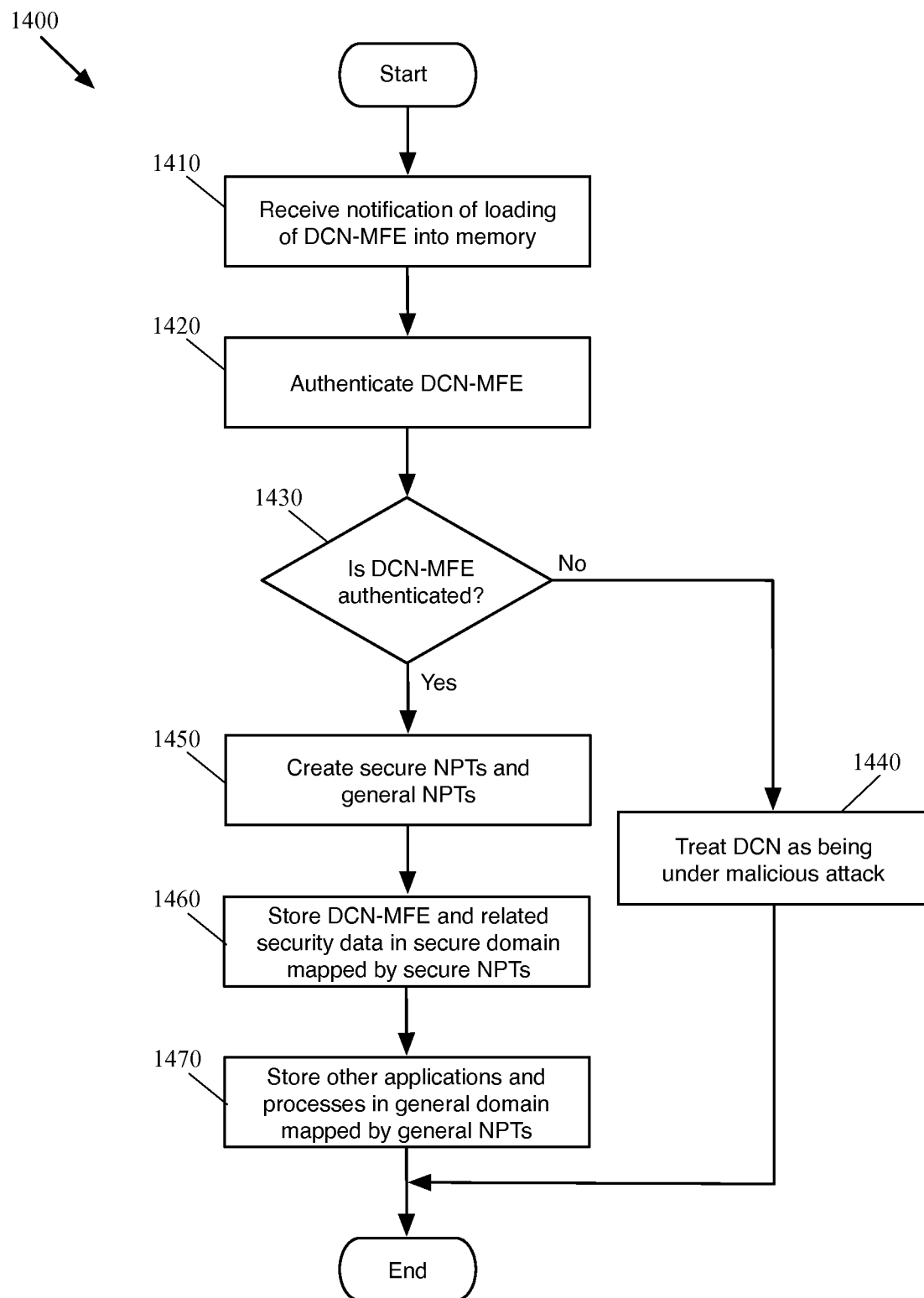
FIG. 14 conceptually illustrates a process that some embodiments perform in order to isolate a guest secure domain in the physical memory of a host machine for loading the code and data of a DCN-MFE of a data compute node.

FIG. 14 conceptually illustrates a process 1400 that some embodiments perform in order to isolate a guest secure domain in the physical memory of a host machine for loading the code and data of a DCN-MFE of a data compute node. In some embodiments, the process 1400 is performed by a hypervisor of the host machine (e.g., by a virtual memory monitor (VMM) in the hypervisor). The process 1400 begins by receiving (at 1410) a notification that a DCN-MFE has been loaded on a data compute node. In some embodiments, the hypervisor is notified that a DCN-MFE is loaded in a guest VM, when the VM is loaded in the host machine and the DCN-MFE is loaded in the guest physical memory of the VM. In some embodiments the hypervisor (or the VMM in the hypervisor) also identifies the guest virtual addresses of the executable code and data regions of the DCN-MFE.

The process then authenticates (at 1420) the loaded DCN-MFE (i.e., the executable code and data of the DCN-MFE loaded into memory). In some embodiment, upon receiving the notification of loading the DCN-MFE, the hypervisor performs a signature verification to verify the authenticity of the DCN-MFE. The purpose of the signature verification is to ensure that the executable code and data of the DCN-MFE are the same as the original code and data of the DCN-MFE. In other words, the initial signature verification verifies that the code and data of the DCN-MFE have not been modified, or tampered with, by a malicious software.

In order to perform signature verification, the hypervisor of some embodiments issues a request to a service appliance to validate the executable code and data regions of the DCN-MFE by comparing these regions against known valid signatures. Any technically feasible method may be used for the validation so long as the validation is orchestrated outside the guest because a rogue agent may attempt to disable any such validation within the guest. For example, some embodiments decrypt a hashed valid version of the executable code and data regions of the DCN-MFE using a public key of the creator of the DCN-MFE, and compare the hashed valid version against the in-memory image of the executable code and data regions of the DCN-MFE. Some other embodiments use other methods.

The process 1400 then determines (at 1430) whether the DCN-MFE has passed the authentication test. In some embodiments, the process treats (at 1440) the DCN containing the DCN-MFE as being under malicious attack when the signature verification operation for authenticating the executable code and data of the DCN-MFE fails. That is, the process terminates the DCN, or alternatively drops all the packets received from the DCN. On the other hand, when the process determines that the DCN-MFE is authenticated, the process creates (at 1450) a secure set of NPTs and a general set of NPTs.

As described above, the secure set of NPTs includes a set of tables that maps the guest physical memory addresses that contain the DCN-MFE (i.e., executable code and data of the DCN-MFE) to the guest secure domain in the physical memory of the host machine. Similarly, the general set of NPTs includes a set of tables that maps the guest physical memory addresses that contain other applications and processes to the guest general domain in the physical memory of the host machine.

In some embodiments, a hypervisor of the host machine creates a set of original NPTs to map the guest DCN's physical memory to the host machine's physical memory when the guest DCN is loaded into the memory of the host machine. In some such embodiments, the secure and general NPTs are created from the originally generated NPTs. In particular, in some embodiments, the mappings of guest physical memory addresses corresponding to the executable code and data regions of the DCN-MFE are moved, from the original NPTs, into the secure NPTs and the other mappings are moved into the general NPTs.

Next, the process 1400 stores (at 1460) the DCN-MFE and other related security data in the guest secure domain of the physical memory of the host machine in order to isolate the code and data of the DCN-MFE from other code and data of the DCN. Particularly, the process uses the created secure NPTs to map the physical memory of the guest VM that contains the DCN-MFE's code and data to the guest secure domain of the physical memory of the host machine.

The process then stores (at 1470) other applications and processes of the guest VM in the guest general domain. Particularly, the process uses the created general NPTs to map the physical memory of the guest VM that contains the other applications' code and data, as well as other processes, to the guest general domain of the physical memory of the host machine. In some embodiments, the other applications and processes that are stored in the guest general memory space include the guest user space applications as well as the processes and drivers that are loaded in the guest kernel.

The specific operations of the process 1400 may not be performed in the exact order shown and described. The specific operations may not be performed in one continuous series of operations, and different specific operations may be performed in different embodiments. For example, some embodiments, upon receiving a notification that the DCN-MFE is loaded, mark the page table entries of the memory locations that store the code and data of the DCN-MFE to be read-only, so that no other guest thread running on other virtual CPUs can modify the memory state of the executable code and data regions of the DCN-MFE.

Furthermore, the process could be implemented using several sub-processes, or as part of a larger macro process. For example, in some embodiments, the operation 1450 that creates the secure and general NPTs, uses a sub-process to create secure guest page tables from the original guest page tables and store them in the guest secure domain of the physical memory. In some such embodiments, the hypervisor moves the original guest page table entries that point to guest physical memory pages that are mapped by the secure NPTs into the guest secure domain. Creating the secure guest page tables and storing them in the guest secure domain prevents a rogue agent from changing the mapping of a guest virtual memory address which points to a guest physical memory address that is mapped in secure NPTs.

Figure 15:
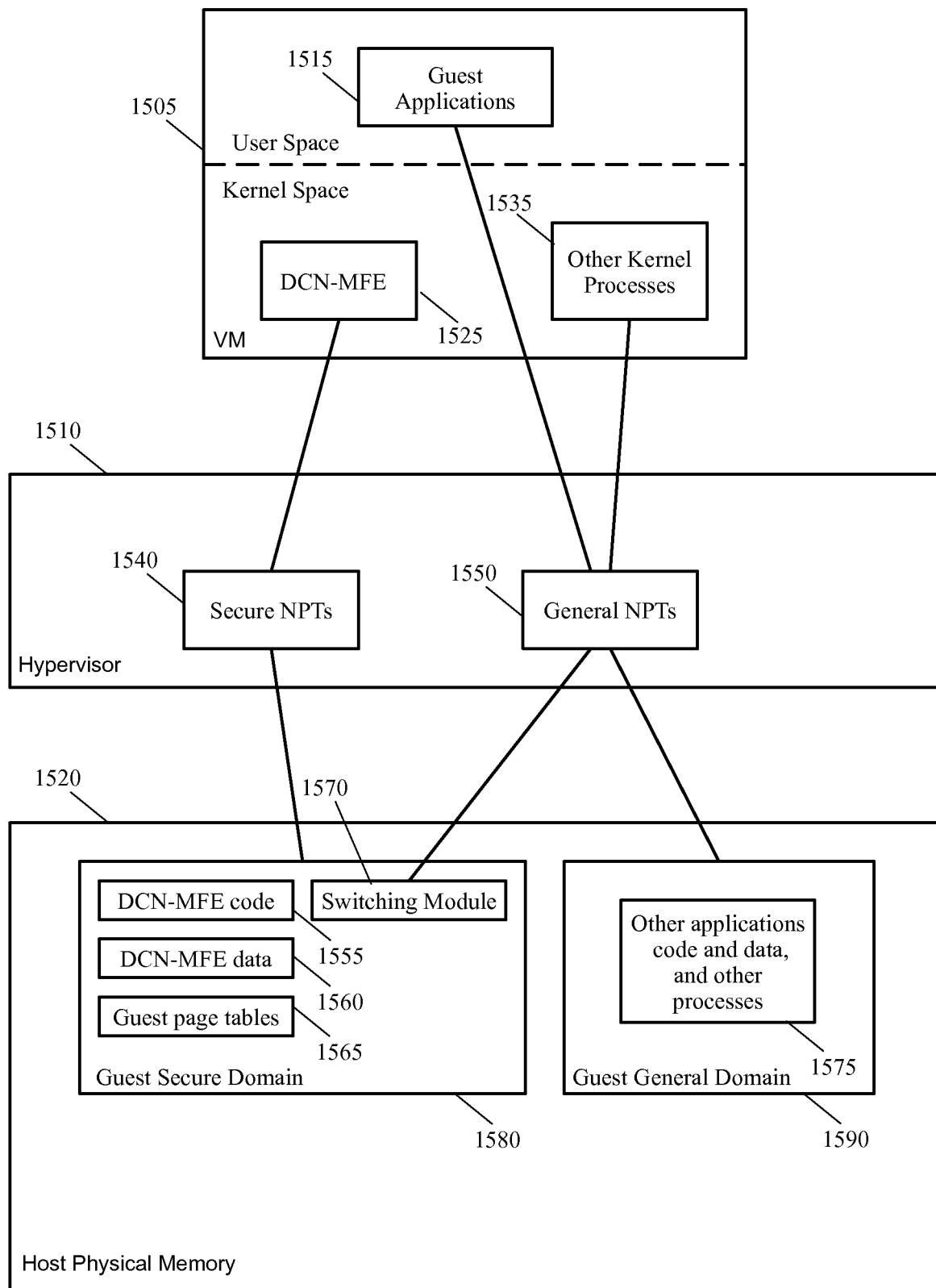
FIG. 15 illustrates a memory mapping system that some embodiments employ to isolate a guest secure domain from the guest general domain in the physical memory of the host machine.

FIG. 15 illustrates a memory mapping system that some embodiments employ to isolate a guest secure domain from the guest general domain in the physical memory of the host machine. In some embodiments there are two types of memory mappings that map the memory of a DCN to the memory of the host machine on which the DCN executes. The first type is a mapping from the guest virtual memory space to the guest physical memory space. This type of mapping is managed by guest DCN operating system and is encoded in guest page tables. As in physical computer systems, the guest page tables of some embodiments are provided per process. The second type of memory mapping is a mapping from the guest physical memory space to the host physical memory space. This type of mapping is managed by the virtualization software of the host machine (e.g., the hypervisor), and is encoded in nested page tables (NPTs).

Conventionally, for each DCN that starts operating on the host machine (e.g., loaded into the memory of the host machine) one set of nested page tables is created that maps the memory of the DCN to the physical memory of the host machine. Some embodiments generate two sets of NPTs, as described above, from the original set of NPTs. These two sets include secure NPTs and general NPTs. Secure NPTs map guest physical memory addresses to a guest secure domain of the host physical memory while general NPTs map guest physical memory addresses to a guest general domain of the host physical memory.

FIG. 15 shows a DCN 1505, a hypervisor 1510, and a host physical memory 1520. The DCN 1505 includes a set of guest applications 1515 in the user space of the DCN, a DCN-MFE 1525 that operates in the kernel of the DCN, and a set of other processes that are also loaded in the kernel of the DCN. The hypervisor 1510 includes a set of secure NPTs 1540 and a set of general NPTs 1550. The host physical memory 1520 includes a guest secure domain 1580 and a guest general domain 1590. The guest secure domain contains the executable code 1555 and data 1560 of the DCN-MFE, a set of secure guest page tables 1565, and a switching module 1570. The guest general domain contains the other applications code and data and other processes 1575 of the DCN.

This figure shows how the mappings of the two separate NPTs isolates the guest secure domain from the guest general domain, and thereby the DCN-MFE from the other application and processes, in the host machine's physical memory. Particularly, the figure shows that the secure NPTs 1540 generated in the hypervisor 1510 of the host machine map the DCN-MFE 1525 to the guest secure region 1580 of the physical memory. On the other hand, the general NPTs 1550 generated in the hypervisor 1510 of the host machine map the guest applications 1515 and the other kernel processes 1535 to the guest general region 1580 of the physical memory.

Some embodiments, in addition to the executable code and data of the DCN-MFE, store a set of secure guest page tables 1565 and a switching module 1570 in the guest secure domain 1580. The secure guest page tables 1565 are created from the original guest page tables that contain the code and data of the DCN-MFE and include guest page table entries that point to guest physical memory pages that are mapped by the secure NPTs into the guest secure domain. As stated above, creating the secure guest page tables and storing them in the guest secure domain prevents a rogue agent from changing the mapping of a guest virtual memory address which points to a guest physical memory address that is mapped in secure NPTs.

In some embodiments, the data that is stored in the guest secure domain 1580 is not mapped in the guest general domain and is only accessible to code that executes in the guest secure domain such as the executable code of the DCN-MFE. As such, confidential information can be stored in the guest secure domain 1580 without any risk of being exposed even if the guest OS is compromised.

The switching module 1570 is deployed by some embodiments for switching between the guest secure domain and the guest general domain. That is, this module is called as a secure way to enter into or exit out of the guest secure domain. In some embodiments, the operating system of the guest DCN calls the switching module, which is stored in the guest secure domain but is mapped executable from the guest general domain, and causes the switching module to enter the guest secure domain (e.g., to pass the execution control from the guest general domain to the guest secure domain). On the other hand, in some embodiments, the DCN-MFE calls the switching module and causes this module to exit the guest secure domain (e.g., to pass the execution control from the guest secure domain to the guest general domain).

In order to employ this switching module, the hypervisor of the host machine first determines whether or not there is an available secure thread stack from a secure thread stack pool. If not, the hypervisor returns a busy status to switching module. If there is an available secure thread stack or when a secure thread stack becomes available, the hypervisor selects a secure thread stack. Then, the hypervisor obtains the return address from the instruction pointer in the guest general domain and saves the return address in a temporary register.

The hypervisor then changes the pointer to the guest page tables (currently pointing to guest page tables stored in the guest general domain), and the NPT pointer, which is the pointer to the nested page tables (currently pointing to the general NPTs), so that the guest page table pointer points to guest page tables stored in the guest secure domain and the NPT pointer points to secure NPTs. After the page table pointers have been changed, the hypervisor switches the stack to the selected secure thread stack and pushes the return address in the temporary register onto the selected stack.

The hypervisor then sets the instruction pointer to an entry point to the secure protection domain and resumes guest execution, as a result of which execution control is transferred to a secure protection domain dispatcher. The secure protection domain dispatcher performs a validation of an entry number (passed as a parameter when the switching module was called) and if the entry number is validated, allows execution of the DCN-MFE in the secure protection domain. Validation of the entry number consists of a check that the entry number corresponds to a defined service. Dispatch can be done through a jump table, binary decision tree, or other mechanism that transfers control flow from the dispatch routine to the code associated with the indicated service.

When the DCN-MFE calls into the switching module it causes the module to exit the secure domain. To do this, the hypervisor pops the return address from the stack and saves the return address in a temporary register. Then, the hypervisor changes the guest page table pointer GPT and the NPT pointer, so that the guest page table pointer points to the general guest page tables and the NPT pointer points to general NPTs. After the page table pointers have been changed, the hypervisor switches the stack back to the thread stack in the guest general domain and returns the current secure thread stack back to the secure thread stack pool. The hypervisor then sets the instruction pointer to the return address stored in a temporary register and resumes guest execution in the guest general domain.

Instead of using a separate secure domain for the code and data of the DCN-MFE, some embodiments employ a counter check security agent in order to protect the DCN-MFE against malicious attacks. In some embodiments the counter check security agent operates in the virtualization software of the host machine. The counter check security agent of some embodiments receives a message from the DCN-MFE to increase a local counter value by n (n being an integer greater than or equal to one). The counter check security agent receives this message when the DCN-MFE transmits n packets (1) to a PNIC of the host machine directly (e.g., in the pass-through approach), or alternatively (2) to a VNIC of the DCN to be transmitted to the MFE of the virtualization software (e.g., in the emulation approach).

Figure 16:
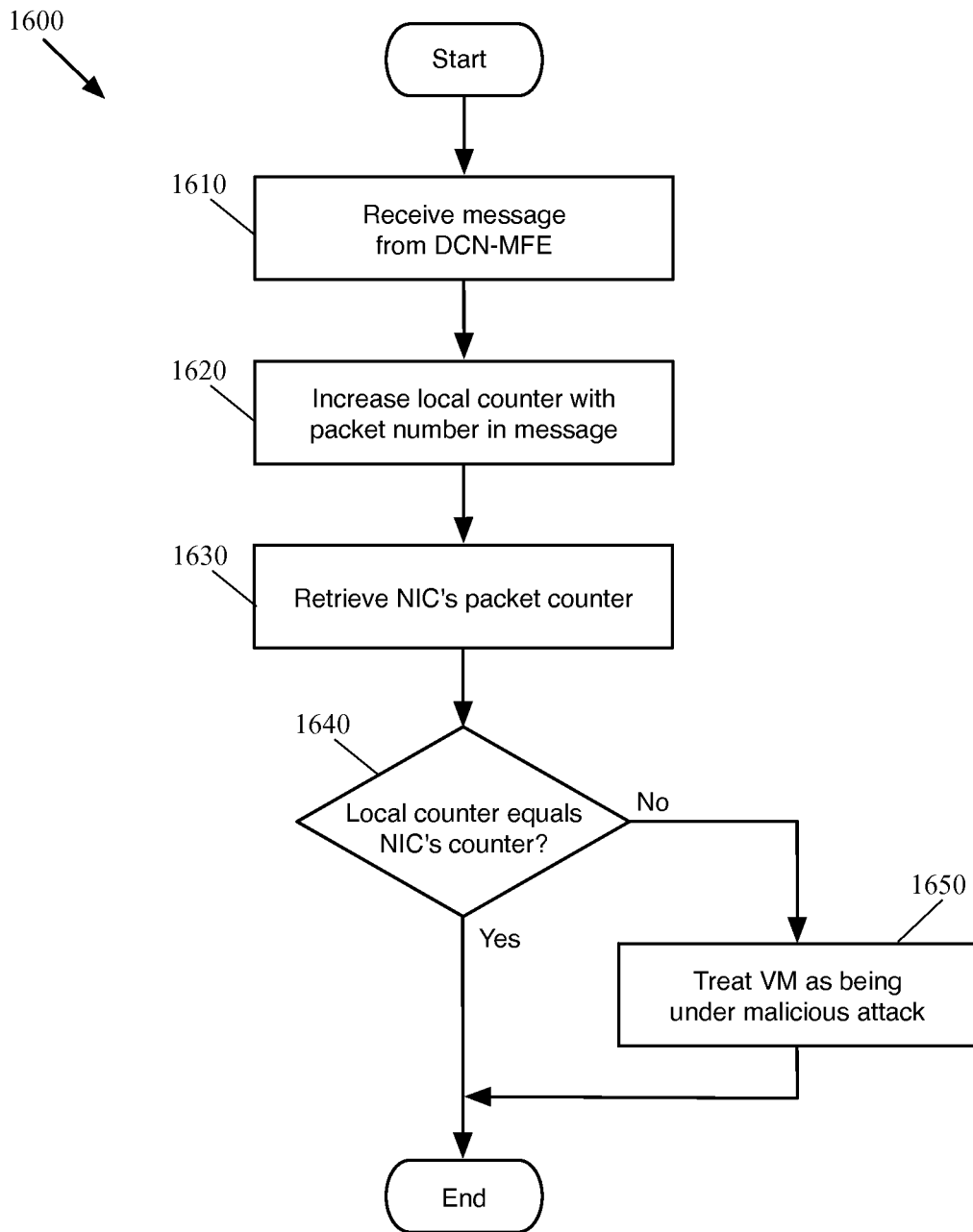
FIG. 16 conceptually illustrates a process that some embodiments perform to protect a DCN-MFE of a data compute node against malicious attacks by using a packet counter value.

FIG. 16 conceptually illustrates a process 1600 that some embodiments perform to protect a DCN-MFE of a data compute node against malicious attacks by using a packet counter value. In some embodiments a counter check security agent that operates in the hypervisor of a host machine performs this process. The process 1600 begins by receiving (at 1610) a message from the DCN-MFE to increase the current value of a counter that is local to the security agent. In some embodiment the message instructs the security agent to increase the local value by n when the DCN-MFE transmits n packet out. In some embodiments the current value of the counter is stored in a physical memory of the host machine that is only accessible by the counter check security agent.

The process then increases (at 1620) the local counter's value with the packet number that was included in the received counter increase message. For example, the security agent increments the value of the local counter by one when the security agent receives a counter increase message from the DCN-MFE, in which the message indicates that only one packet is transmitted out from the DCN-MFE.

The process of some embodiments, after increasing the counter value, retrieves (at 1630) a packet counter value from the PNIC of the host machine (e.g., in the pass-through approach) and/or the VNIC of the DCN (e.g., in the emulation approach). The retrieved counter value, in some embodiment, shows the total number of packets received at the PNIC and/or VNIC. That is, in some embodiments, the PNIC and/or VNIC increases a packet counter value each time the interface receives a packet from the DCN-MFE (and/or any other module including a potential malicious module). In some other embodiments, the PNIC and/or VNIC increases the packet counter value each time the interface sends a packet to other network elements.

The process then determines (at 1640) whether the packet number value retrieved from the PNIC and/or VNIC is equal to the local counter value of the security agent. When the counter value kept in the local counter (after increasing the local counter value by n) of the counter check security agent is the same as the number retrieved from the PNIC and/or VNIC, the process determines that the DCN is in a normal condition (i.e., the DCN is not under any type of malicious attack) and ends.

On the other hand, if the two numbers (i.e., the local number and the retrieved number from the PNIC and/or VNIC) do not match, the process of some embodiments treats (at 1650) the DCN executing the DCN-MFE as being under malicious attack and notifies the virtualization software (e.g., the hypervisor) of such. The process then ends. In some embodiments, the virtualization software then takes the necessary steps to prevent the malicious attack of being spread (e.g., by dropping any additional packets received from the DCN, by terminating the DCN, etc.).

Figure 17:
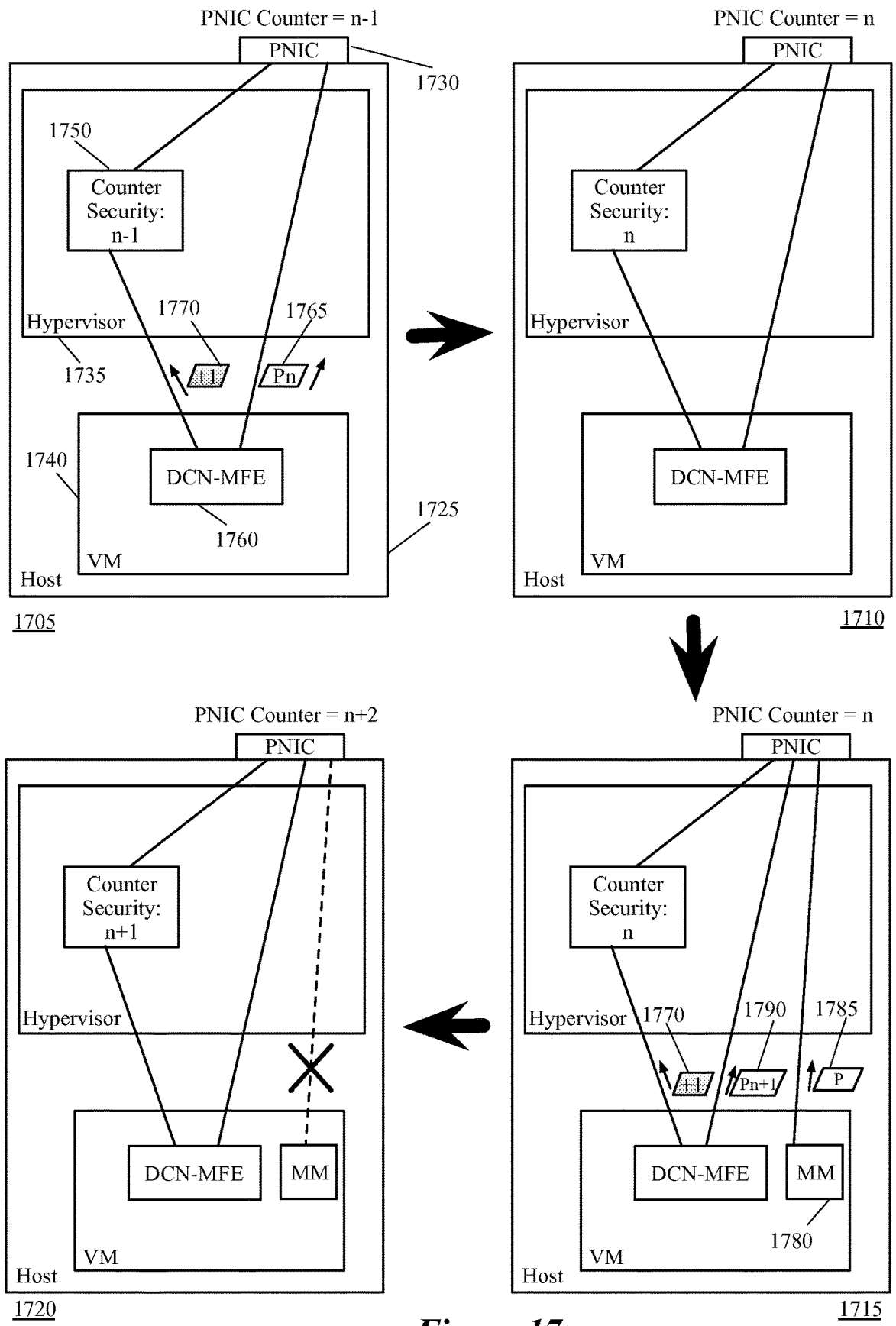
FIG. 17 illustrates an example of a counter check security agent operating in a hypervisor of a host machine that protects a DCN-MFE against a malicious attack in the pass-through approach.

FIG. 17 illustrates an example of a counter check security agent operating in a hypervisor of a host machine that protects a DCN-MFE against a malicious attack in the pass-through approach. Specifically, this figure shows, through four different stages 1705-1720, how a counter check security (CCS) agent receives different counter values from a DCN-MFE and a PNIC and compares these values to identify a malicious attack on a DCN that runs the DCN-MFE. The figure shows a host machine 1725 that includes a PNIC 1730 and a hypervisor 1735. The host machine also executes a DCN (e.g. a virtual machine VM) 1740 that includes a DCN-MFE 1760 for forwarding processing. The hypervisor 1735 executes a counter check security agent 1750 for protecting the DCN-MFE 1760 against any potential malicious attack.

In the first stage 1705, the local counter value of the CCS agent 1750 in the hypervisor 1735 is n−1. That is, as of this moment, the CCS agent has received one or more messages from the DCN-MFE 1760 in which, the DCN-MFE indicated to the CCS agent that the DCN-MFE has transmitted n−1 packets out to the PNIC 1730 so far. The first stage also shows that the PNIC 1730 includes a packet counter that currently has the same value of n−1, which shows this PNIC has received n−1 packets from the DCN-MFE 1760. In some embodiments, each DCN is associated with a single PNIC (in the pass-through approach) and therefore, the packet count that the PNIC's counter holds shows precisely the number of packets that the PNIC has received from the DCN.

In some embodiments, a PNIC can be a physical NIC of the host machine or a simulated PNIC from a set of simulated PNICs that are simulated from the physical NIC of the host machine. The first stage 1705 also shows that the DCN-MFE 1750 has transmitted (1) a packet 1765 (Pn) towards the PNIC 1730 and (2) a counter increase message 1770 towards the CCS agent 1750, which instructs the CCS agent to increase the local counter value by one.

The second stage 1710 shows that the CCS agent 1750 has received the message 1770 and as a result, has incremented the value of the local counter. As such, at this stage, the value of the local counter has changed from n−1 to n. Similarly, the PNIC 1730 has received the packet 1765 from the DCN-MFE 1760 and as a result, has incremented the value of the packet counter. Therefore, the value of the packet counter has changed from n−1 to n.

The third stage 1715 shows that the DCN-MFE 1750 has transmitted (1) another packet 1790 (Pn+1) towards the PNIC 1730 and (2) another counter increase message 1770 towards the CCS agent 1750, which instructs the CCS agent to increase the local counter value by one. Furthermore, the third stage shows that a malicious module 1780, which imitates the DCN-MFE 1750, is sending a packet to the PNIC 1730, e.g., through the same channel that the DCN-MFE communicates with the PNIC. In some embodiments, the malicious module 1780 executes in the kernel of the VM (same as the DCN-MFE) and takes over some of the operations of the DCN-MFE, or alternatively, performs these operations in parallel with the DCN-MFE (as shown in the illustrated example).

The fourth stage 1720 shows that the CCS agent 1750 has received the second message 1770 and as a result, has incremented the value of the local counter. As such, at this stage, the value of the local counter has changed from n to n+1. However, the PNIC 1730 has received an extra packet 1785 from the malicious module 1780, in addition to the packet 1790 that it receives from the DCN-MFE 1760. As a result, the PNIC 1730 has increased the value of the packet counter by two. Therefore, the value of the packet counter has changed from n to n+2. As described above, the CCS agent 1750 of some embodiments retrieves the packet counter value from the PNIC each time the CCS agent increases the local counter value. In some embodiments, the CCS agent retrieves the packet counter value by sending a request to the PNIC asking the PNIC to send the current packet counter value to the CCS agent.

At the fourth stage 1720, the CCS agent 1750, after receiving the packet counter value from the PNIC, compares this value with the value stored in the local counter associated with the CCS agent 1750. As described before, the local counter value is stored in a physical memory of the machine that is controlled by the hypervisor of the host machine in some embodiments. When the CCS agent 1750 compares the local counter value (n+1) with the packet counter value (n+2), the CCS agent realizes that the DCN is under attack because these two numbers do not match. The CCS agent 1750 of some embodiments, upon identifying a malicious attack, notifies the hypervisor of such. In some embodiments the hypervisor 1735 takes the necessary action to prevent the attack from spreading to other DCNs or other modules of the same DCN.

Figure 18:
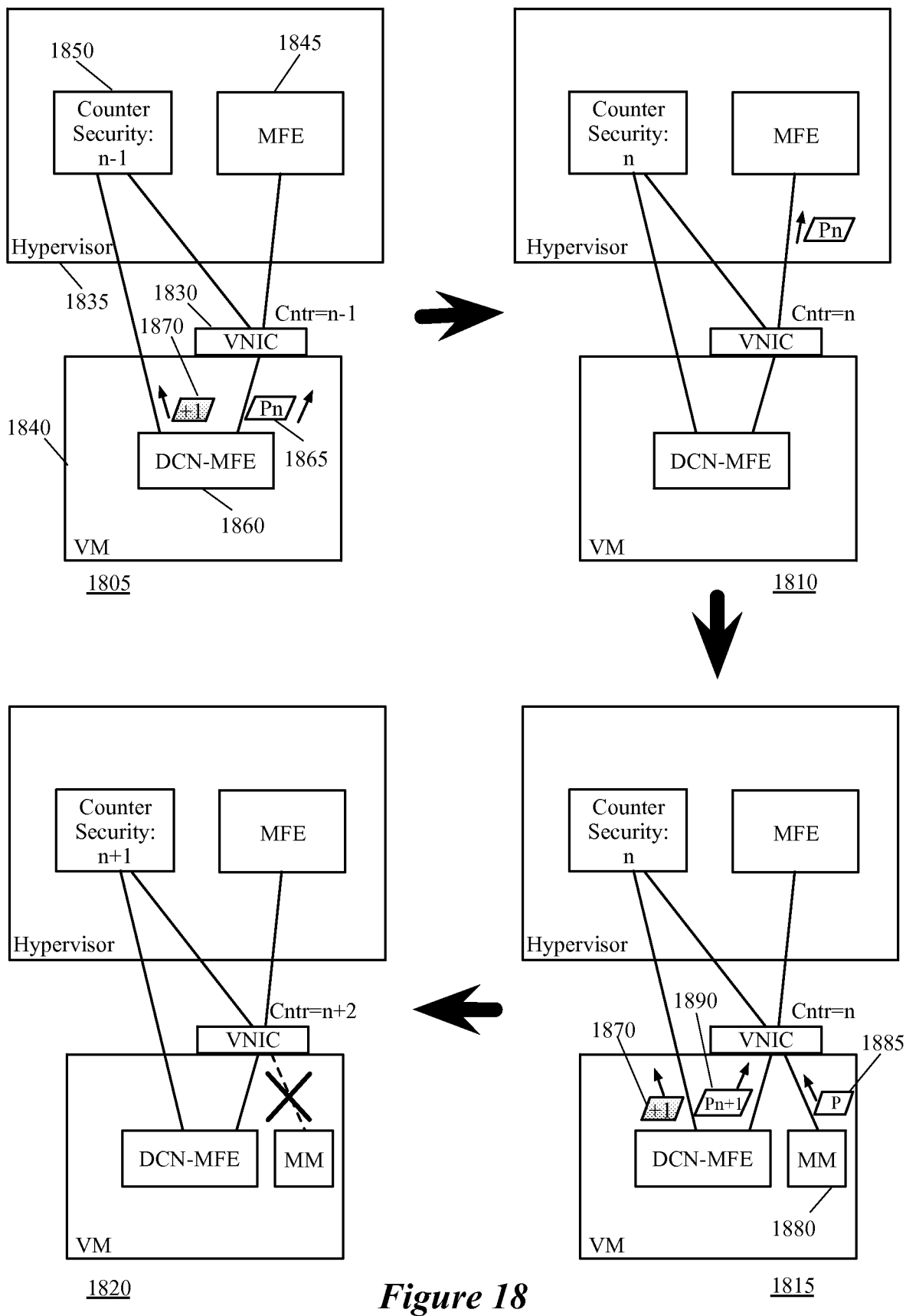
FIG. 18 illustrates another example of a counter check security agent operating in a hypervisor of a host machine that protects a DCN-MFE against a malicious attack in the emulation approach.

FIG. 18 illustrates another example of a counter check security agent operating in a hypervisor of a host machine that protects a DCN-MFE against a malicious attack in the emulation approach. Specifically, this figure shows, through four different stages 1805-1820, how a counter check security (CCS) agent receives different counter values from a DCN-MFE and a VNIC and compares these values to identify a malicious attack on a DCN that runs the DCN-MFE. The figure shows a DCN (e.g. a virtual machine VM) 1840 and a hypervisor 1835. The DCN 1840 includes a DCN-MFE 1860 for packet forwarding processing and a VNIC 1830 for forwarding the processed packets. The VNIC 1830 of some embodiments is a virtual network interface controller that is associated with a physical port of the MFE 1845 in order for the DCN 1840 to communicate with a managed forwarding element of a host machine such as the MFE 1845.

The hypervisor 1835 executes a counter check security agent 1850 for protecting the DCN-MFE 1860 against any potential malicious attack. The hypervisor 1835 also executes an MFE 1845 for packet forwarding processing for every DCN that (1) executes on a same host machine on which the MFE executes and (2) does not include a DCN-MFE to perform packet forwarding processing. The MFE 1845, in some embodiment, is also for receiving processed packets from every DCN that (1) executes on a same host machine on which the MFE executes and (2) includes a DCN-MFE that performs the forwarding processing on the packets but uses the MFE as an intermediary to send the processed packets to a PNIC (not shown) of the host machine in emulation approach.

In the first stage 1805, the local counter value of the CCS agent 1850 in the hypervisor 1835 is n−1. That is, as of this moment, the CCS agent has received one or more messages from the DCN-MFE 1860 in which, the DCN-MFE indicated to the CCS agent that the DCN-MFE has transmitted n−1 packets out to the VNIC 1830 so far. The first stage also shows that the VNIC 1830 includes a packet counter that currently has the same value of n−1, which shows this VNIC has received n−1 packets from the DCN-MFE 1860.

In some embodiments, each DCN is associated with a single VNIC and therefore, the packet count that the VNIC's counter holds shows precisely the number of packets that the VNIC has received from the DCN. The first stage 1805 also shows that the DCN-MFE 1850 has transmitted (1) a packet 1865 (Pn) towards the VNIC 1830 and (2) a counter increase message 1870 towards the CCS agent 1850, which instructs the CCS agent to increase the local counter value by one.

The second stage 1810 shows that the CCS agent 1850 has received the message 1870 and as a result, has incremented the value of the local counter. As such, at this stage, the value of the local counter has changed from n−1 to n. Similarly, the VNIC 1830 has received the packet 1865 from the DCN-MFE 1860 and as a result, has incremented the value of the packet counter. Therefore, the value of the packet counter has changed from n−1 to n.

The third stage 1815 shows that the DCN-MFE 1850 has transmitted (1) another packet 1890 (Pn+1) towards the VNIC 1830 and (2) another counter increase message 1870 towards the CCS agent 1850, which instructs the CCS agent to increase the local counter value by one. Furthermore, the third stage shows that a malicious module 1880, which imitates the DCN-MFE 1850, is sending a packet to the VNIC 1830, e.g., through the same communication channel that the DCN-MFE communicates with the VNIC.

The fourth stage 1820 shows that the CCS agent 1850 has received the second message 1870 and as a result, has incremented the value of the local counter. As such, at this stage, the value of the local counter has changed from n to n+1. However, the VNIC 1830 has received an extra packet 1885 from the malicious module 1880, in addition to the packet 1890 that it receives from the DCN-MFE 1860. As a result, the PNIC 1830 has increased the value of the packet counter by two. Therefore, the value of the packet counter has changed from n to n+2. As described above, the CCS agent 1850 of some embodiments retrieves the packet counter value from the VNIC each time the CCS agent increases the local counter value. In some embodiments, the CCS agent retrieves the packet counter value by sending a request to the VNIC asking the VNIC to send the current packet counter value to the CCS agent.

At the fourth stage 1820, the CCS agent 1850, after receiving the packet counter value from the VNIC 1830, compares this value with the value stored in the local counter associated with the CCS agent 1850. As described before, the local counter value is stored in a physical memory of the machine that is controlled by the hypervisor of the host machine in some embodiments. When the CCS agent 1850 compares the local counter value (n+1) with the packet counter value (n+2), the CCS agent realizes that the DCN is under attack because these two numbers do not match. The CCS agent 1850 of some embodiments, upon identifying a malicious attack, notifies the hypervisor of such. In some embodiments the hypervisor 1835 takes the necessary action to prevent the attack from spreading to other DCNs or other modules of the same DCN.

In some embodiments, a determined malicious module that simulates the DCN-MFE in the guest kernel may also imitate the communication between the DCN-MFE and the counter check security agent. In some embodiments, the DCN-MFE and counter check security agents communicate with each other through a channel that is essentially a software function. The malicious module, in some such embodiments, may call the same counter increase function that the DCN-MFE calls. By calling the same function, the malicious module also sends a counter increase message to the security agent to increase the local counter by n, each time the malicious module transmits n packets to the PNIC and/or VNIC. In other words, the malicious module imitates both functions of the DCN-MFE to transmit the packets out to the PNIC and/or VNIC, and to send a counter increase message to the counter check security agent with each transmission.

In order to protect the DCN-MFE against this type of malicious modules, the hypervisor of some embodiments generates a list of valid return addresses, each of which indicates a valid return address of a subsequent instruction after the last instruction of the counter increase function is executed. That is, each return address in the list of valid return addresses contains a memory address that a subsequent executing instruction pointer may point to after the last instruction of the counter increase function called by the DCN-MFE is executed. Additionally, each time any module (e.g., a DCN-MFE or a malicious module) calls the counter increase function, that module stores the return address of the next instruction, that has to be executed after the counter increase function returns, in a call stack.

In some embodiments, each time a counter increase message is received, the counter check security agent checks the call stack maintained by the DCN, which contains the return address after the counter increase function is finished. In some other embodiments a different security agent (other than the counter check security agent) that runs in the communication channel between the DCN-MFE and the hypervisor (e.g., inside the hypervisor or the DCN) checks the call stack. The security agent then matches the return address in the call stack of the DCN against the list of valid return addresses (that are kept in local storage of the hypervisor or DCN). When no match is found, the security agent determines that a separate module (which has a different return address for the subsequent instruction) has called into the counter increase function and notifies the virtualization software of a potential malicious attack on the DCN.

Figure 19:
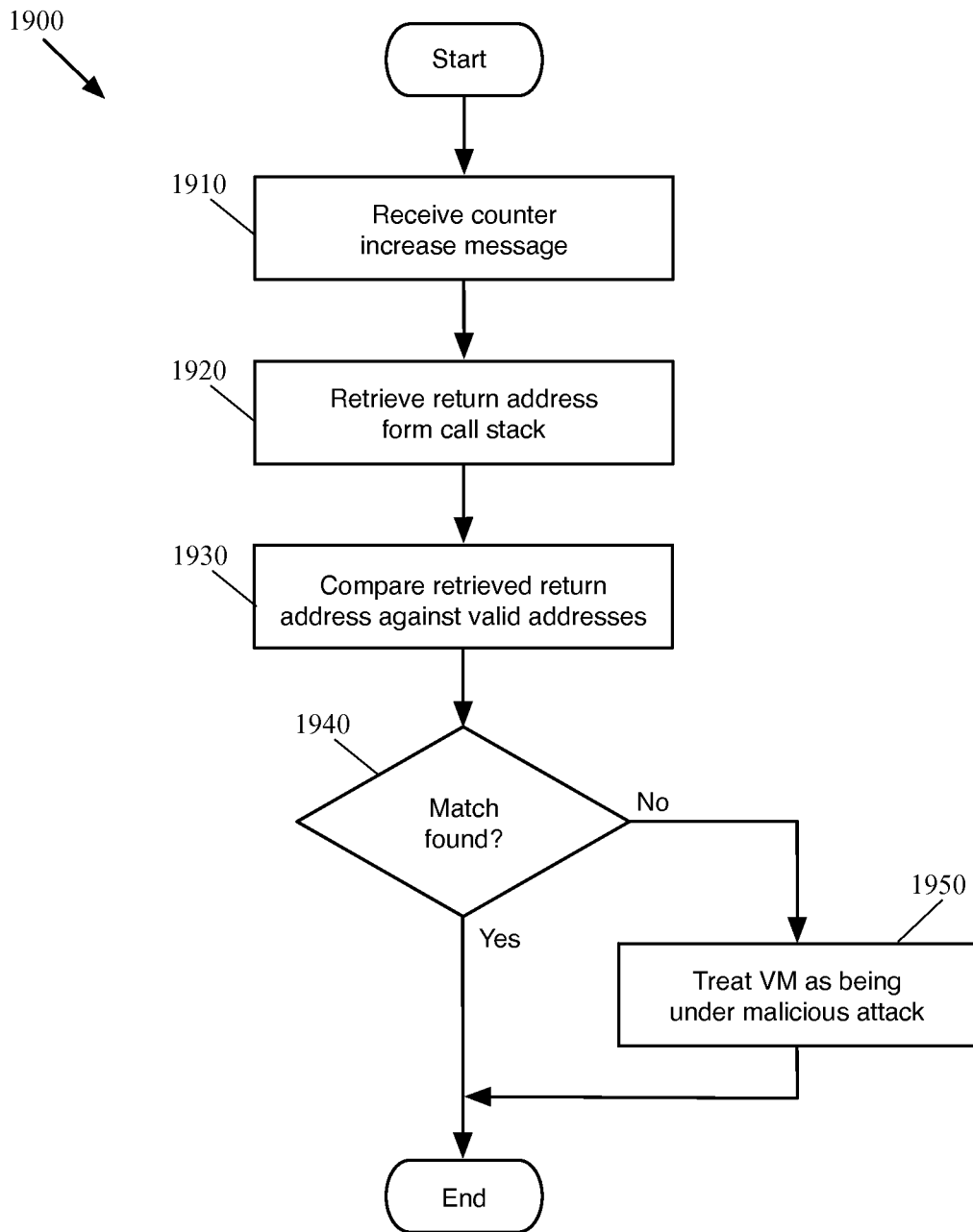
FIG. 19 conceptually illustrates a process of some embodiments that protects a DCN-MFE of a data compute node against a malicious module that imitates the DCN-MFE in sending counter increase messages to the counter check security agent.

FIG. 19 conceptually illustrates a process 1900 of some embodiments that protects a DCN-MFE of a data compute node against a malicious module that imitates the DCN-MFE in sending counter increase messages to the counter check security agent. In some embodiments, the process 1900 is performed by a counter check security (CCS) agent that operates in the hypervisor of a host machine. In some other embodiments, a different security agent that also operates in the hypervisor of the host machine, along with the counter check security agent, performs the process 1900.

The process 1900 begins by receiving (at 1910) a message from the DCN-MFE to increase the current value of a counter that is local to the CCS agent. In some embodiment the message instructs the CCS agent to increase the local value by n when the DCN-MFE transmits n packet out. In some embodiments the current value of the counter is stored in a physical memory of the host machine that is only accessible by the counter check security agent (through a hypervisor that executes the security agent).

The process of some embodiments, upon receiving the message and before increasing the local counter value, retrieves (at 1920) the last return address from a call stack that is maintained by the DCN. The process of some embodiments retrieves the return address by querying a call stack data storage that is maintained by the data compute node. The call stack data storage, as described above, contains the return address after the counter increase function is finished. A module (or program) has several lines of instructions. When an instruction line calls a function to perform an operation, the function has to know the return address in order to pass the control of the processor to the instruction that is after the instruction that called the function. That is, the return address contains a pointer to the address of a subsequent instruction line in the module (or program) that is after the instruction line that calls the function.

As such, when a DCN-MFE (or a malicious module) calls the counter increase function, the return address of a subsequent instruction line of a program of the DCN-MFE (or the malicious module) from which the counter increase function is called, is stored in the call stack (e.g., by the operating system or by the malicious module). Therefore, the process retrieves, from the call stack, the return address that belongs to an instruction of a program that is being executed by the DCN-MFE or by a malicious module that is imitating the DCN-MFE.

In order to ensure that the counter increase function has been called by the DCN-MFE (i.e., the counter increase message has been received from the DCN-MFE), the process of some embodiments matches (at 1930) the retrieved return address against a data storage that contains a list of valid return addresses. In some embodiments, each return address in the list contains a return address of a subsequent instruction after the last instruction of the counter increase function is executed. That is, each return address in the list of valid return addresses contains a memory address that a subsequent instruction pointer of the processor may point to, after the last instruction of the counter increase function is executed. In some embodiments, each time a DCN-MFE is loaded into the memory of the host machine, the security agent running in the hypervisor of the host machine (or another module running in the hypervisor) generates the list of valid return addresses and stores the list in a data storage controlled by the hypervisor.

When the process finds a match, the process realizes that the counter increase message has been received from a legitimate DCN-MFE. The process then ends. On the other hand, when the process does not find a match in the list of valid return addresses, the process determines (at 1950) that a malicious module (which has a different return address for the subsequent instruction) has called the counter increase function and as such treats the DCN as being under malicious attack. That is, in some embodiments, the process notifies the hypervisor of a potential malicious attack on the DCN. In some such embodiments, the hypervisor takes the necessary actions (e.g., terminates the DCN, drops all the packets received from the DCN, etc.).

The specific operations of the process 1900 may not be performed in the exact order shown and described. The specific operations may not be performed in one continuous series of operations, and different specific operations may be performed in different embodiments. Furthermore, the process 1900 could be implemented using several sub-processes, or as part of a larger macro process.

Figure 20:
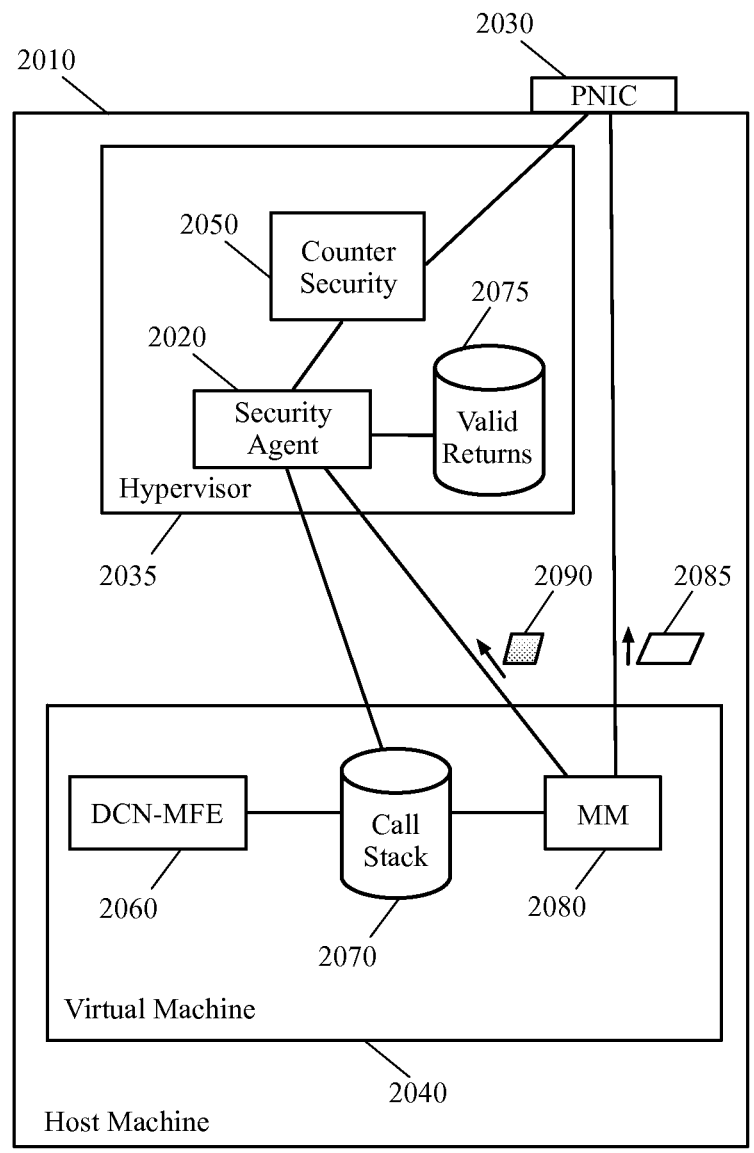
FIG. 20 illustrates an example of a security agent operating in a hypervisor of a host machine along with a counter check security agent in order to protect a DCN-MFE against a malicious attack in the pass-through approach.

FIG. 20 illustrates an example of a security agent operating in a hypervisor of a host machine along with a counter check security agent in order to protect a DCN-MFE against a malicious attack in the pass-through approach. This figure shows a host machine 2010 that includes a PNIC 2030 and a hypervisor 2035. The host machine 2010 also executes a DCN (virtual machine) 2040. The DCN 2040 includes a DCN-MFE 2060 for packet forwarding processing, a call stack storage 2070, and a malicious module 2080 that imitates the DCN-MFE 2060. The hypervisor 2035 includes a security agent 2020, a CCS agent 2050, and a valid return address storage 2075. The PNIC 2030 of some embodiments is a physical network interface controller that exchanges the network traffic between the host machine 2010 and other host machines and/or network elements (e.g., physical external networks, etc.).

The hypervisor 2035 executes the counter check security agent 2050 for protecting the DCN-MFE 2060 against any potential malicious attack in the manner that described above by reference to FIGS. 16-18. However, some determined malicious modules similar to the malicious module 2080 can imitate the counter increase message operation of the DCN-MFE. That is, the malicious module 2080 simulates both of DCN-MFE's operations of sending a packet through a communication channel to the PNIC 2030, and sending a counter increase message to the CCS agent 2050, each time the malicious module sends a packet to the PNIC.

As such, the CCS agent 2050 alone is not able to protect the DCN-MFE against these types of modules. In order to protect the DCN-MFE 2060 against a module such as the malicious module 2080, some embodiments employ a security module 2020 that operates on the communication channel between the CCS agent 2050 and the DCN 2040. As described above though, in some embodiments, the CCS agent 2050 itself performs the operations of the security agent 2020 in addition to the operations that were described above for the CCS agent.

The hypervisor 2035 also populates and maintains a valid return addresses data storage 2075 that contains a list of valid return addresses for the communication channel between the CCS agent 2050 and the DCN-MFE 2060. In some embodiments, each return address that is stored in the data storage 2075 includes a valid return address of a subsequent instruction after the last instruction of the counter increase function is executed. That is, each return address in the list of valid return addresses contains a memory address that a subsequent instruction pointer may point to, after the last instruction of the counter increase function that is called by the DCN-MFE is executed. In some embodiments, each time a DCN-MFE is loaded into the memory of the host machine, the hypervisor (or the security agent 2020 inside the hypervisor) populates the data storage 2075 with the list of valid return addresses.

The DCN 2040 also maintains a call stack data storage 2070 that contains the next return address that the processor should execute after a function call such as the counter increase function call returns. As described above, the executable code of a DCN-MFE includes several lines of programming instructions. When an instruction line in the code calls a function (e.g., counter increase function), the DCN-MFE has to know the address of the following instruction after the function call instruction in order to execute the next instruction after the function is executed. That is, the return address contains a pointer to the address of a subsequent instruction line in the executable code that is after the instruction line that calls the function. The DCN-MFE 2060, or any other executable code that executes in the DCN 2040, uses the call stack data storage 2070 to save the address of the following instruction before the control process switches from the DCN-MFE to the function that is being called.

As illustrated in the example figure, the malicious module 2080 has transmitted a packet 2085 out towards the PNIC 2030, and at the same time, the module has transmitted a message 2090 out to the CCS agent 2050 that instructs the agent to increase its local counter value. However, before the counter increase message reaches the CCS agent 2050, the security agent 2020 operating on the communication channel intercepts the message. In order to ensure that the counter increase function has been called by the DCN-MFE (i.e., the counter increase message has been received from the DCN-MFE), the security agent 2020 queries the call stack storage 2070 to receive the last return address that is stored in this storage.

The security agent 2020 then matches the received return address against the list of valid return addresses that are stored in the data storage 2075. In the illustrated example, since the counter increase function has been called by the malicious module 2080, the last return address that the security module 2020 receives from the call stack storage 2070 is an address pointing to an instruction inside the malicious module code. As such this address does not exist in the list of valid return addresses that point to addresses inside the DCN-MFE code. As such the hypervisor 2035 detects a malicious attack on the DCN 2040 (i.e., on the DCN-MFE 2060 running in the DCN) and takes the required step to protect the DCN against the malicious attack.

In some embodiments, the security agent 2020 uses multiple checkpoints to ensure that a malicious function is not imitating the valid return address method. That is, in some embodiments, the security agent 2020 checks the call stack in multiple points (e.g., when the counter increase function is called, at the end of the function, etc.), to ensure that a determined malicious module has not used the call stack to store a fake valid return address in the stack. Although FIG. 20 illustrates an example of a security agent 2020 that protects the DCN-MFE against malicious attacks in a pass-through approach, one of ordinary skill in the art would realize that the security agent 2020 protects the DCN-MFE in an emulation approach in the same manner that is described above.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
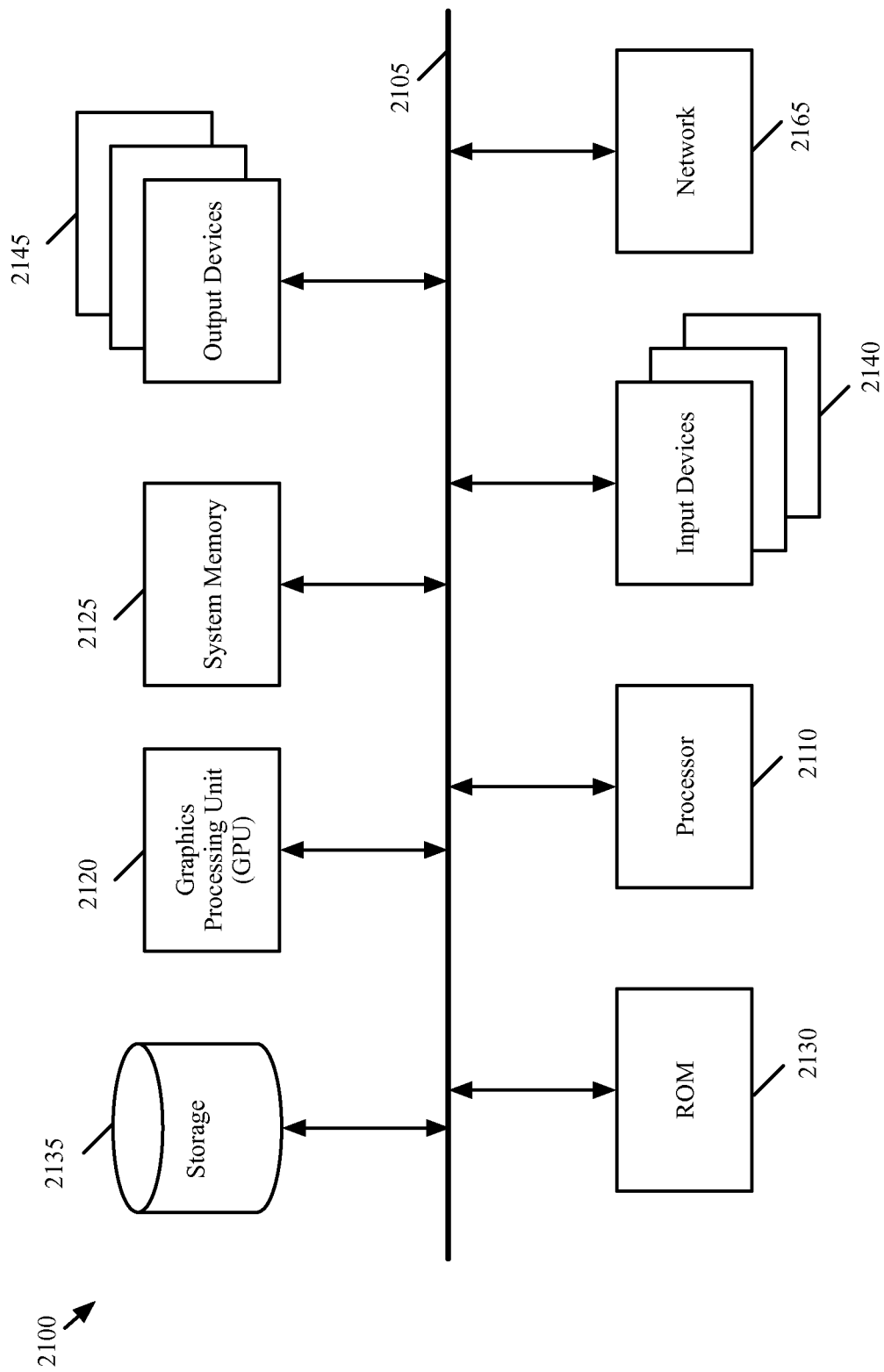
FIG. 21 conceptually illustrates an electronic system with which some embodiments of the invention are implemented.

FIG. 21 conceptually illustrates an electronic system 2100 with which some embodiments of the invention are implemented. The electronic system 2100 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieves instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash memory device, etc., and its corresponding drive) as the permanent storage device. Like the permanent storage device 2135, the system memory 2125 is a read-and-write memory device. However, unlike storage device 2135, the system memory 2125 is a volatile read-and-write memory, such a random access memory. The system memory 2125 stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieves instructions to execute and data to process in order to execute the processes of some embodiments.

The bus 2105 also connects to the input and output devices 2140 and 2145. The input devices 2140 enable the user to communicate information and select commands to the electronic system. The input devices 2140 include alpha-numeric keyboards and pointing devices (also called "cursor control devices"), cameras (e.g., webcams), microphones or similar devices for receiving voice commands, etc. The output devices 2145 display images generated by the electronic system or otherwise output data. The output devices 2145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3, 11, 14, 16, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for securing a managed forwarding element (MFE) that executes on a particular virtual machine (VM) executing in a host computer, the method comprising:

receiving a notification that the MFE is loaded on the particular VM, the MFE for performing forwarding operations to forward packets between the particular VM and a plurality of other VMs;

securing the MFE by isolating, in a physical memory of the host computer, executable code and data of the MFE from executable code and data of other applications that execute on the particular VM; and upon receiving the notification, authenticating the loaded MFE in order to ensure that the executable code and data of the MFE that is loaded on the particular VM is identical to original executable code and data of the MFE.

2. The method of claim 1, wherein authenticating the MFE comprises performing, in a virtualization application of the host computer, a signature verification module that compares a valid hash value of the original executable code and data of the MFE with a hash value of the executable code and data of the loaded MFE.

3. The method of claim 1 further comprising determining that the particular VM is under a malicious attack when the executable code and data of the MFE that is loaded on the particular VM is not identical to the original executable code and data of the MFE.

4. A method for securing a managed forwarding element (MFE) that executes on a particular virtual machine (VM) executing in a host computer, the method comprising:
receiving a notification that the MFE is loaded on the particular VM, the MFE for performing forwarding operations to forward packets between the particular VM and a plurality of other VMs; and
securing the MFE by isolating, in a physical memory of the host computer, executable code and data of the MFE from executable code and data of other applications that execute on the particular VM,
wherein said isolating comprises (i) receiving a plurality of memory mapping tables that maps a physical memory of the particular VM to a physical memory of the host computer and (ii) dividing the plurality of memory mapping tables into first and second sets of memory mapping tables, wherein the first set of memory mapping tables maps physical memory of the particular VM that contains the MFE to a first region of the physical memory of the host computer, and the second set of memory mapping tables maps physical memory of the VM that contains the other applications to a second region of the physical memory of the host computer.

5. The method of claim 4, wherein the plurality of memory mapping tables is received from a virtualization application that executes in the host computer and generates the plurality of memory mapping tables.

6. The method of claim 4 further comprising:
storing the executable code and data of the MFE in the first physical memory region; and
storing the executable code and data of the other applications in the second physical memory region.

7. The method of claim 6 further comprising storing a third set of tables in the first physical memory region, wherein the third set of tables contains memory address entries that point to physical memory pages of the particular VM that are mapped by the first set of tables.

8. The method of claim 6 further comprising storing a particular module in the first physical memory region for passing an execution control of the particular VM between the first and second physical memory regions, wherein an operating system of the particular VM calls the particular module in order to pass the execution control from the second physical memory region to the first physical memory region, wherein the MFE calls the particular module in order to pass the execution control from the first physical memory region to the second physical memory region.

9. The method of claim 1, wherein the MFE implements a logical forwarding element of a logical network that logically connects the VM with a plurality of MFEs executing on the plurality of other VMs.

10. A non-transitory machine readable medium storing a security program executable by at least one processing unit of a host computer, the security program for securing a managed forwarding element (MFE) that executes on a virtual machine (VM) executing on the host computer, the security program comprising sets of instructions for:
receiving a notification that the MFE is loaded on the particular VM, the MFE for performing forwarding operations to forward packets between the particular VM and a plurality of other VMs;
securing the MFE by isolating, in a physical memory of the host computer, executable code and data of the MFE from executable code and data of other applications that execute on the particular VM; and
authenticating, upon receiving the notification, the loaded MFE in order to ensure that the executable code and data of the MFE that is loaded on the particular VM is identical to original executable code and data of the MFE.

11. The non-transitory machine readable medium of claim 10, wherein the set of instructions for authenticating the MFE comprises a set of instructions for performing, in a virtualization application of the host computer, a signature verification module that compares a valid hash value of the original executable code and data of the MFE with a hash value of the executable code and data of the loaded MFE.

12. The non-transitory machine readable medium of claim 10, wherein the security program further comprises a set of instructions for determining that the particular VM is under a malicious attack when the executable code and data of the MFE that is loaded on the particular VM is not identical to the original executable code and data of the MFE.

13. A non-transitory machine readable medium storing a security program executable by at least one processing unit of a host computer, the security program for securing a managed forwarding element (MFE) that executes on a virtual machine (VM) executing on the host computer, the security program comprising sets of instructions for:
receiving a notification that the MFE is loaded on the particular VM, the MFE for performing forwarding operations to forward packets between the particular VM and a plurality of other VMs; and
securing the MFE by isolating, in a physical memory of the host computer, executable code and data of the MFE from executable code and data of other applications that execute on the particular VM,
wherein the set of instructions for said isolating comprises sets of instructions for (i) receiving a plurality of memory mapping tables that maps a physical memory of the particular VM to a physical memory of the host computer and (ii) dividing the plurality of memory mapping tables into first and second sets of memory mapping tables, wherein the first set of memory mapping tables maps physical memory of the particular VM that contains the MFE to a first region of the physical memory of the host computer, and the second set of memory mapping tables maps physical memory of the VM that contains the other applications to a second region of the physical memory of the host computer.

14. The non-transitory machine readable medium of claim 13, wherein the plurality of memory mapping tables is received from a virtualization application that executes in the host computer and generates the plurality of memory mapping tables.

15. The non-transitory machine readable medium of claim 13, wherein the security program further comprises sets of instructions for:
storing the executable code and data of the MFE in the first physical memory region; and
storing the executable code and data of the other applications in the second physical memory region.

16. The non-transitory machine readable medium of claim 15, wherein the security program further comprises a set of instructions for storing a third set of tables in the first physical memory region, wherein the third set of tables contains memory address entries that point to physical memory pages of the particular VM that are mapped by the first set of tables.

17. The non-transitory machine readable medium of claim 15, wherein the security program further comprises a set of instructions for storing a particular module in the first physical memory region for passing an execution control of the particular VM between the first and second physical memory regions, wherein an operating system of the particular VM calls the particular module in order to pass the execution control from the second physical memory region to the first physical memory region, wherein the MFE calls the particular module in order to pass the execution control from the first physical memory region to the second physical memory region.

18. The non-transitory machine readable medium of claim 10, wherein the MFE implements a logical forwarding element of a logical network that logically connects the VM with a plurality of MFEs executing on the plurality of other VMs.

19. The non-transitory machine readable medium of claim 18, wherein the host computer is one of a plurality of host computers of a datacenter, wherein the particular VM is VM of a tenant of the datacenter that is logically connected to a plurality of other VMs of the tenant executing on the plurality of host computers.

* * * * *